United States Patent
Metzler et al.

(10) Patent No.: US 12,380,783 B2
(45) Date of Patent: Aug. 5, 2025

(54) FACILITY SURVEILLANCE SYSTEMS AND METHODS

(71) Applicant: HEXAGON TECHNOLOGY CENTER GMBH, Heerbrugg (CH)

(72) Inventors: Bernhard Metzler, Dornbirn (AT); Barbara Haupt, Walzenhausen (CH); Markus Kächele, Walzenhausen (CH); Bernd Reimann, Heerbrugg (CH); Stefan Martin Benjamin Gächter Toya, St. Gallen (CH); Alexandre Heili, Altstätten (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 236 days.

(21) Appl. No.: 17/561,066

(22) Filed: Dec. 23, 2021

(65) Prior Publication Data

US 2022/0157136 A1    May 19, 2022

Related U.S. Application Data

(63) Continuation of application No. 17/289,700, filed as application No. PCT/EP2018/079602 on Oct. 29, 2018.

(51) Int. Cl.
*G08B 13/196* (2006.01)
*G06F 18/2431* (2023.01)
(Continued)

(52) U.S. Cl.
CPC ... *G08B 13/19613* (2013.01); *G06F 18/2431* (2023.01); *G06N 3/02* (2013.01);
(Continued)

(58) Field of Classification Search
CPC ............ G08B 13/1968; G08B 13/1965; G08B 13/19682; G08B 13/19613;
(Continued)

(56) References Cited

U.S. PATENT DOCUMENTS

| | | | |
|---|---|---|---|
| 5,861,804 | A | 1/1999 | Fansa et al. |
| 6,308,272 | B1 | 10/2001 | Pearce |

(Continued)

FOREIGN PATENT DOCUMENTS

| | | | |
|---|---|---|---|
| CN | 1854626 | A | 11/2006 |
| CN | 103530995 | A | 1/2014 |

(Continued)

OTHER PUBLICATIONS

"Human Detection Using Multimodal and Multi dimensional Features" of Spinello and Siegwart, ICRA 2008.
(Continued)

*Primary Examiner* — Said Bouziane
(74) *Attorney, Agent, or Firm* — Maschoff Brennan

(57) ABSTRACT

Systems and methods for surveillance of a facility including facility elements. The system includes a central computing unit providing a digital model of the facility providing topological or logical or functional relationships of the facility elements, surveillance sensors adapted for surveillance of a plurality of the facility elements and for generation of surveillance data, communication means for transmitting data from the surveillance sensors to the central computing unit, and state derivation means configured to analyse the surveillance data and derive a state of a respective facility element. The central computing unit is configured to record a state pattern by combining states of at least one facility element based on at least one relationship of the facility element provided by the facility model, provide a state pattern critical-noncritical classification model which
(Continued)

considers relationships provided by the facility model, and perform a criticality-classification based on the relationship.

20 Claims, 26 Drawing Sheets

(51) Int. Cl.
    *G06N 3/02*     (2006.01)
    *G06V 20/00*    (2022.01)
    *G06V 20/52*    (2022.01)
(52) U.S. Cl.
    CPC .............. *G06V 20/35* (2022.01); *G06V 20/52* (2022.01); *G08B 13/1968* (2013.01); *G08B 13/19682* (2013.01)
(58) Field of Classification Search
    CPC .... G08B 13/19647; G06N 3/02; G06V 20/35; G06V 20/52; G05D 1/0094; G05D 2201/0209; G06F 18/2431
    See application file for complete search history.

(56) References Cited

U.S. PATENT DOCUMENTS

| | | |
|---|---|---|
| 8,630,741 B1 | 1/2014 | Matsuoka |
| 9,165,455 B1 | 10/2015 | Hutz |
| 9,524,648 B1 | 12/2016 | Gopalakrishnan et al. |
| 9,679,455 B2 | 6/2017 | Jentoft et al. |
| 9,894,327 B1 | 2/2018 | Jacob |
| 10,272,570 B2 | 4/2019 | Storr |
| 10,867,217 B1 | 12/2020 | Madden et al. |
| 11,148,802 B1 | 10/2021 | Sun |
| 11,429,807 B2 | 8/2022 | Pradeep |
| 11,481,571 B2 | 10/2022 | Kiemele et al. |
| 11,636,348 B1 | 4/2023 | Tang et al. |
| 2002/0135484 A1* | 9/2002 | Ciccolo ............ G08B 13/19641 340/573.1 |
| 2003/0164794 A1 | 9/2003 | Haynes et al. |
| 2005/0122914 A1 | 6/2005 | Durso et al. |
| 2009/0027196 A1 | 1/2009 | Schoettle |
| 2010/0017046 A1 | 1/2010 | Cheung et al. |
| 2010/0193626 A1 | 8/2010 | Goossen et al. |
| 2011/0299734 A1 | 12/2011 | Bodenmueller |
| 2012/0095619 A1 | 4/2012 | Pack et al. |
| 2012/0143808 A1 | 6/2012 | Karins et al. |
| 2012/0245844 A1 | 9/2012 | Lommel et al. |
| 2014/0055621 A1 | 2/2014 | Shirani et al. |
| 2014/0300746 A1 | 10/2014 | Adachi |
| 2014/0316616 A1 | 10/2014 | Kugelmass |
| 2014/0320312 A1 | 10/2014 | Sager |
| 2015/0091790 A1 | 4/2015 | Forutanpour |
| 2015/0178383 A1 | 6/2015 | Corrado |
| 2016/0185464 A1 | 6/2016 | Zheng |
| 2016/0239723 A1 | 8/2016 | Ge |
| 2016/0259333 A1 | 9/2016 | Ducharme |
| 2016/0282864 A1 | 9/2016 | Lamm et al. |
| 2016/0345832 A1 | 12/2016 | Pavagada Nagaraja et al. |
| 2017/0092109 A1 | 3/2017 | Trundle |
| 2017/0147007 A1 | 5/2017 | Ducharme |
| 2017/0149883 A1 | 5/2017 | Joshi et al. |
| 2017/0169313 A1 | 6/2017 | Choi |
| 2017/0185872 A1 | 6/2017 | Chakraborty |
| 2017/0301220 A1 | 10/2017 | Jarrell et al. |
| 2018/0005134 A1 | 1/2018 | Kish et al. |
| 2018/0089534 A1 | 3/2018 | Ye |
| 2018/0130196 A1 | 5/2018 | Loveland et al. |
| 2018/0141453 A1 | 5/2018 | High et al. |
| 2018/0188714 A1 | 7/2018 | Cella et al. |
| 2018/0211115 A1 | 7/2018 | Klein |
| 2018/0314897 A1 | 11/2018 | Camilus et al. |
| 2019/0121348 A1 | 4/2019 | Cella et al. |
| 2019/0212730 A1* | 7/2019 | Jones ................... G05D 1/0274 |
| 2019/0220697 A1 | 7/2019 | Kiemele et al. |
| 2019/0220698 A1 | 7/2019 | Pradeep |
| 2020/0089967 A1 | 3/2020 | Velipasalar et al. |
| 2020/0090477 A1 | 3/2020 | Monge Nunez et al. |
| 2020/0108923 A1 | 4/2020 | Smith et al. |
| 2020/0201292 A1 | 6/2020 | Cella et al. |
| 2020/0300637 A1 | 9/2020 | Chiu et al. |
| 2021/0235641 A1 | 8/2021 | Boudreau et al. |
| 2021/0294172 A1 | 9/2021 | Rasmus-Vorrath et al. |
| 2022/0157138 A1* | 5/2022 | Metzler ................. G06V 20/35 |
| 2022/0157178 A1 | 5/2022 | Grace et al. |

FOREIGN PATENT DOCUMENTS

| | | |
|---|---|---|
| CN | 104919462 A | 9/2015 |
| CN | 105023022 A | 11/2015 |
| CN | 105516653 | 4/2016 |
| CN | 105765516 A | 7/2016 |
| CN | 105979203 | 9/2016 |
| CN | 105989683 A | 10/2016 |
| CN | 106774221 A | 5/2017 |
| CN | 106781458 A | 5/2017 |
| CN | 107196953 A | 9/2017 |
| CN | 107293093 A | 10/2017 |
| EP | 3 156 898 | 4/2017 |
| EP | 3522003 A1 | 8/2019 |
| GB | 2546486 | 7/2017 |
| GB | 201600845 A | 7/2017 |
| KR | 101125233 | 3/2012 |
| KR | 101700395 B1 | 2/2017 |
| WO | 2017198696 A2 | 11/2017 |

OTHER PUBLICATIONS

"People Detection in RGB-D Data" of Spinello and Arras, IROS 2011.
"Multi-modal Person Localization and Emergency Detection Using the Kinect" by Galatas et al., IJARAI 2013.
"On the Use of a Low-Cost Thermal Sensor to Improve Kinect People Detection in a Mobile Robot" by Susperregi et al., Sensors 2013.
Georis, B. et al., "Real-time control of video surveillance systems with program supervision techniques," Machine Vision and Applications, Springer, vol. 18, Issue 3-4, pp. 189-205, (Jan. 24, 2007).
Wen, et al., "Real-Time Target Detection and Recognition with Deep Convolutional Networks for Intelligent Visual Surveillance," 2016 IEEE/ACN 9th International Conference on Utility and Cloud Computing, pp. 321-326 (Dec. 6, 2016).
Amato, et al., "Towards Multimodal Surveillance for Smart Building Security," Proceedings, vol. 2, Issue 2, pp. 1-8 (Jan. 9, 2018).
European Search Report dated Mar. 15, 2022 as received in application No. 21213921.
European Search Report dated Apr. 4, 2022 as received in application No. 21213922.
Arbanas et al. "Decentralized planning and control for UAV-UGV cooperative teams" 2018.
CN Office Action dated Mar. 22, 2024 as received in Application No. 202111630089.6.
Chinese Search Report dated Mar. 20, 2025 as received in Application No. 202111627648.8.

* cited by examiner

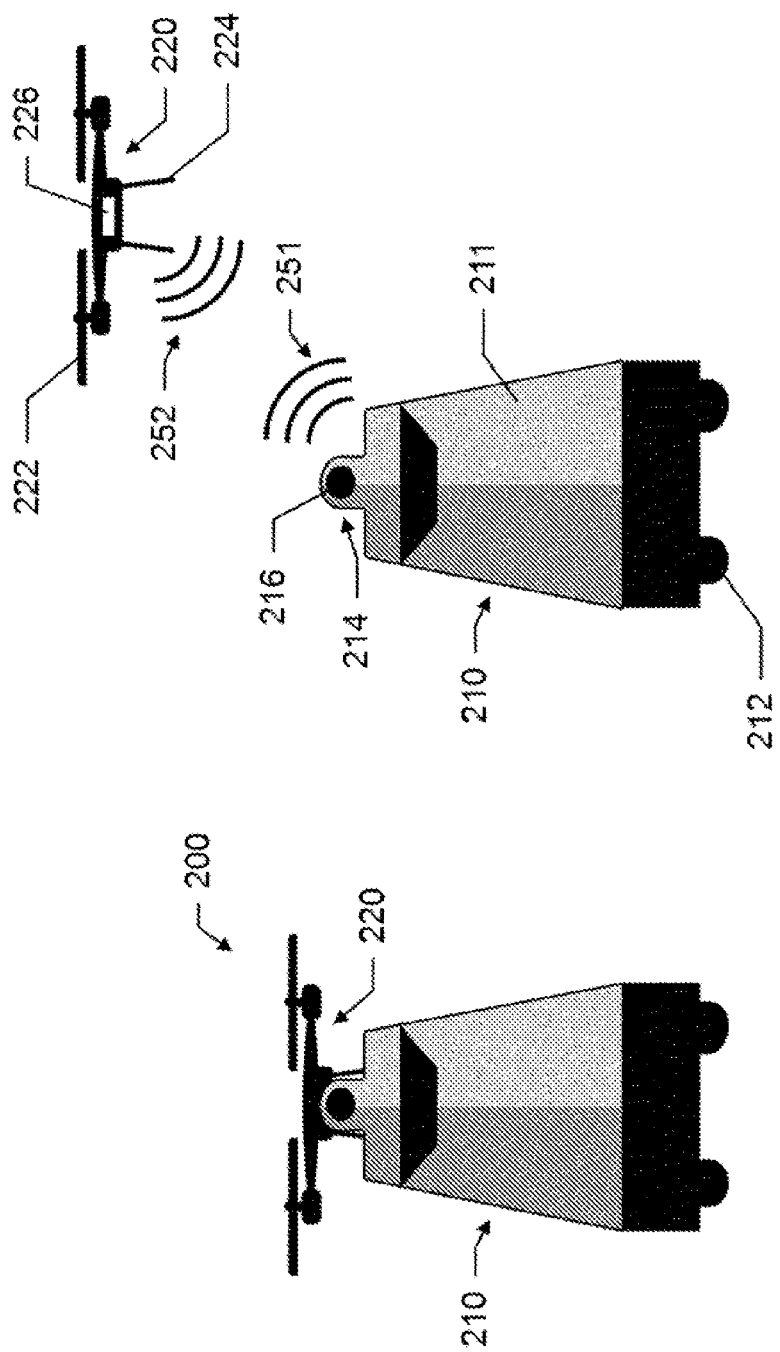

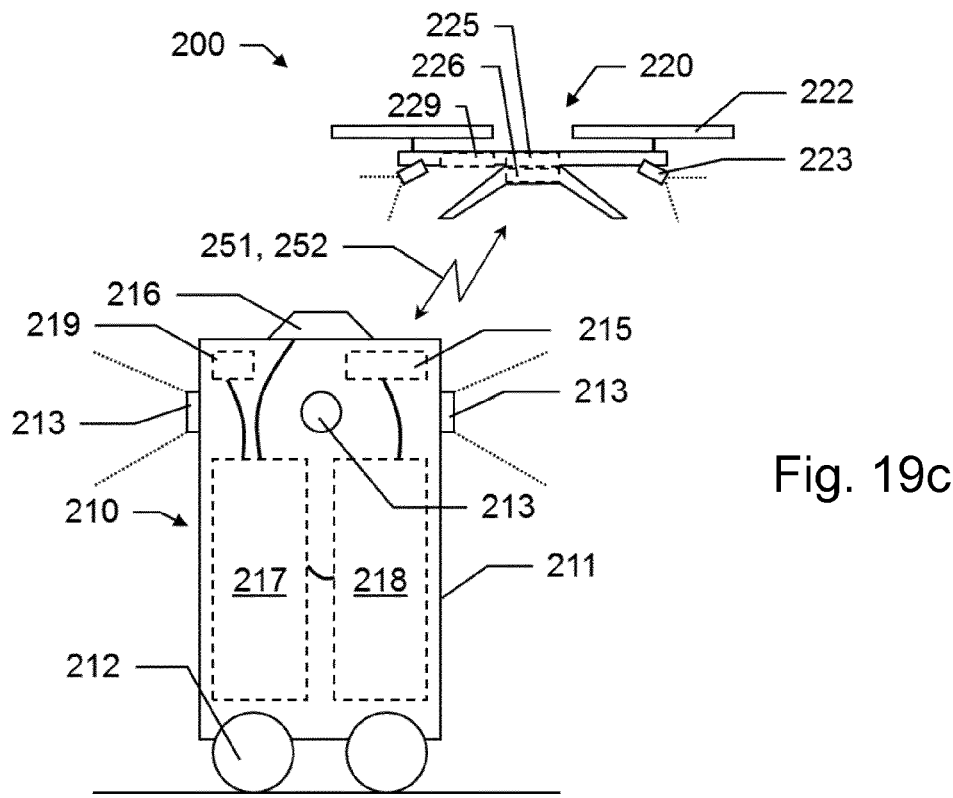
Fig. 19c
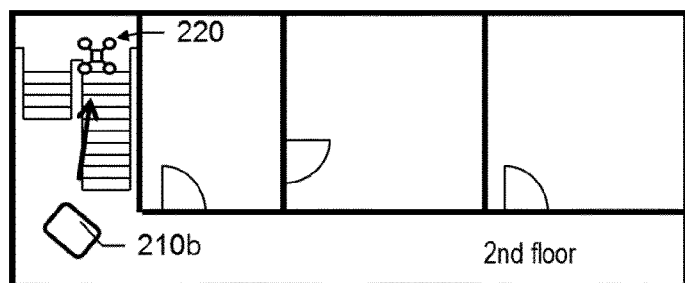
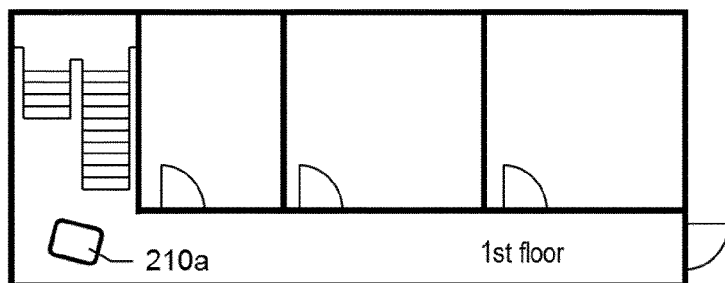
Fig. 20

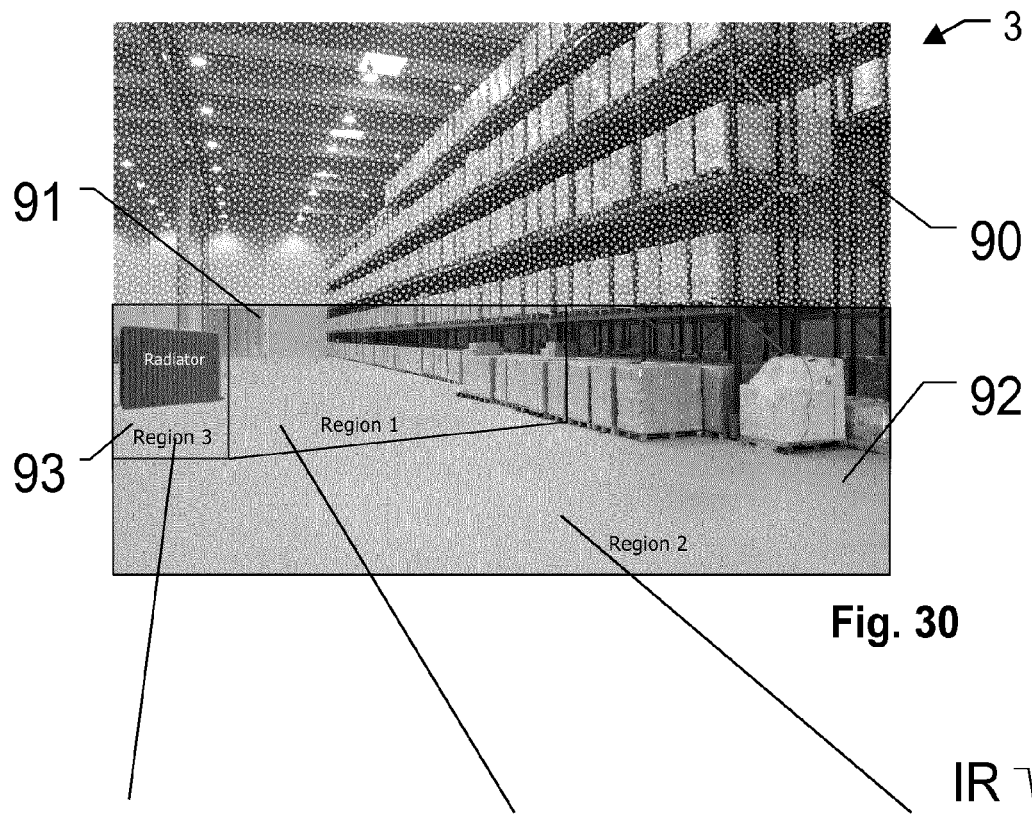
Fig. 30
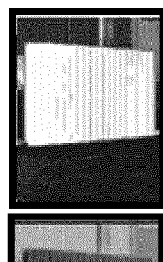
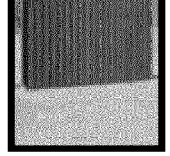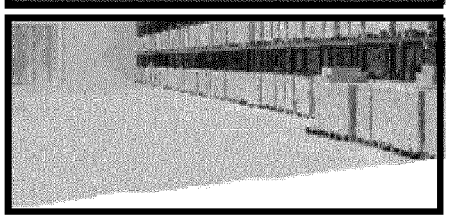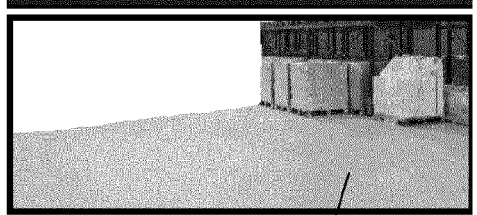
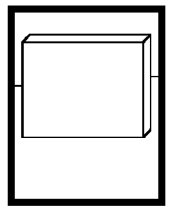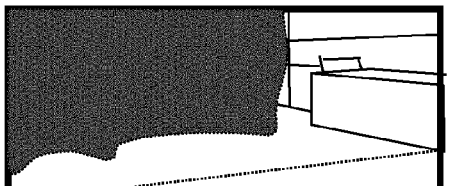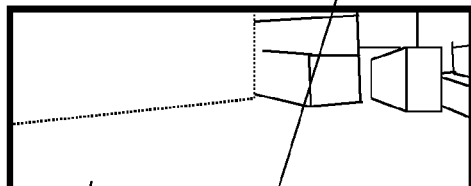
Fig. 31a   Fig. 31b   Fig. 31c

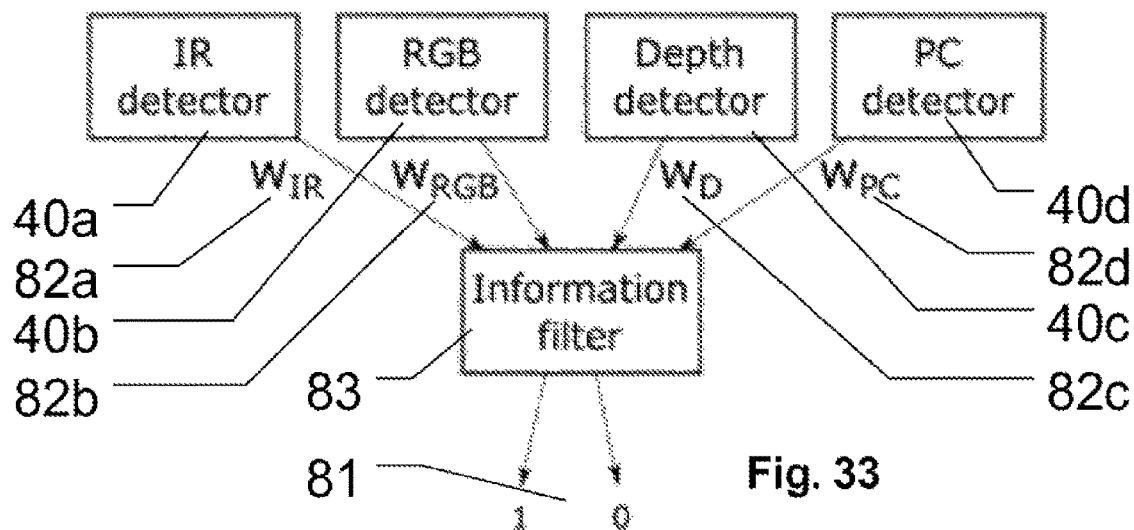
Fig. 33
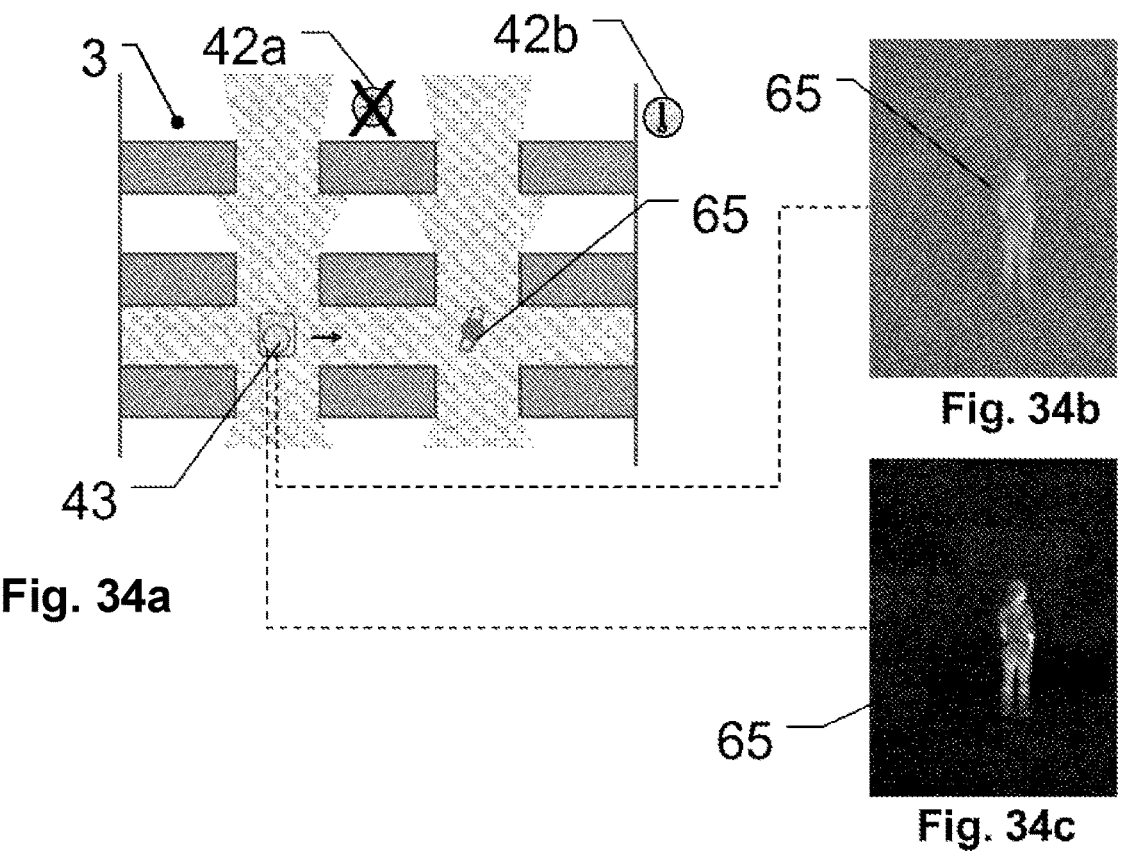
Fig. 34a
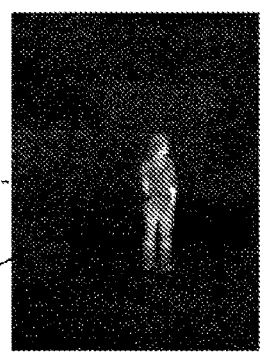
Fig. 34b
Fig. 34c

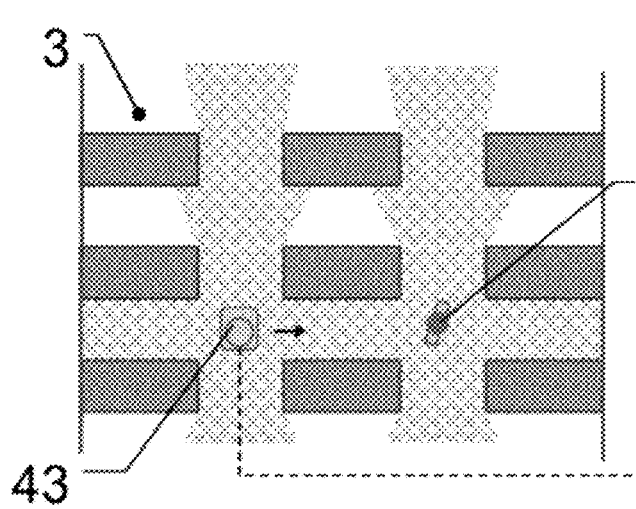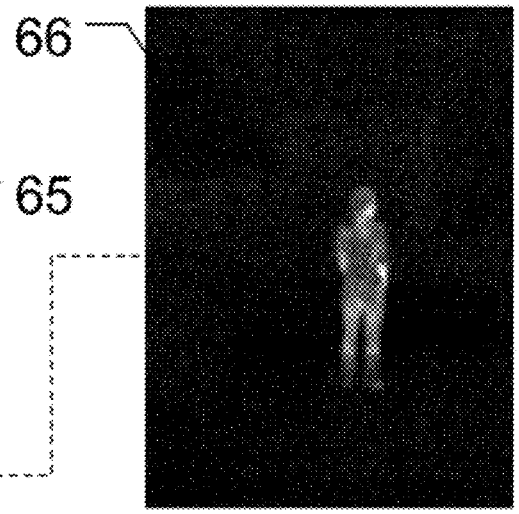
Fig. 40a  Fig. 40b
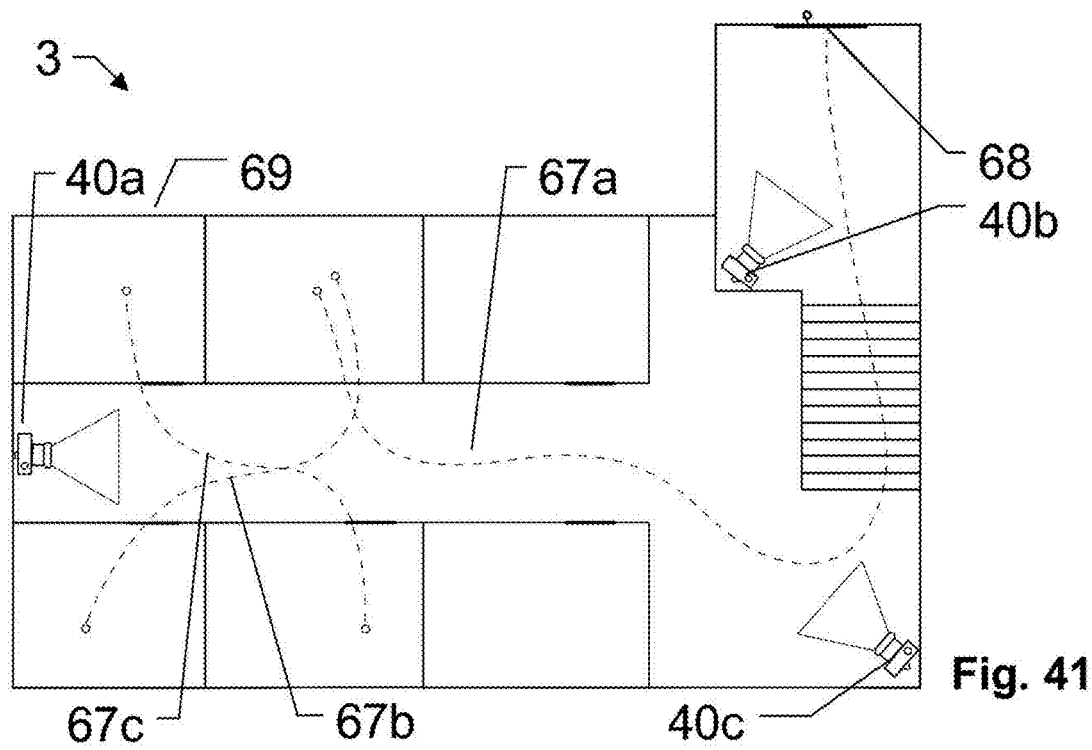
Fig. 41

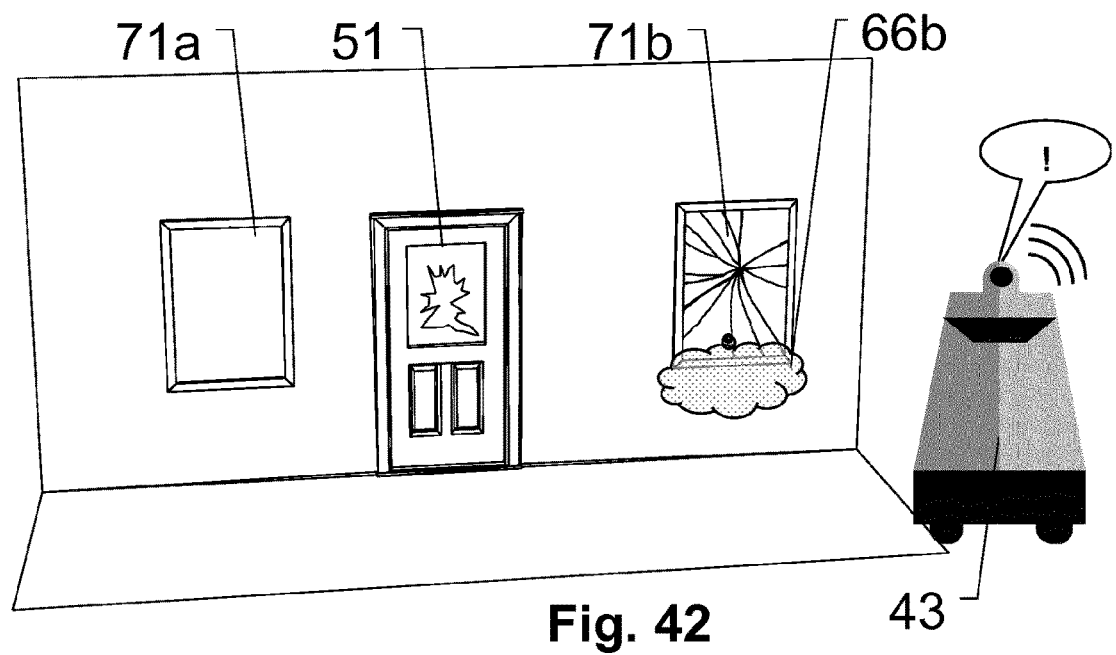
Fig. 42
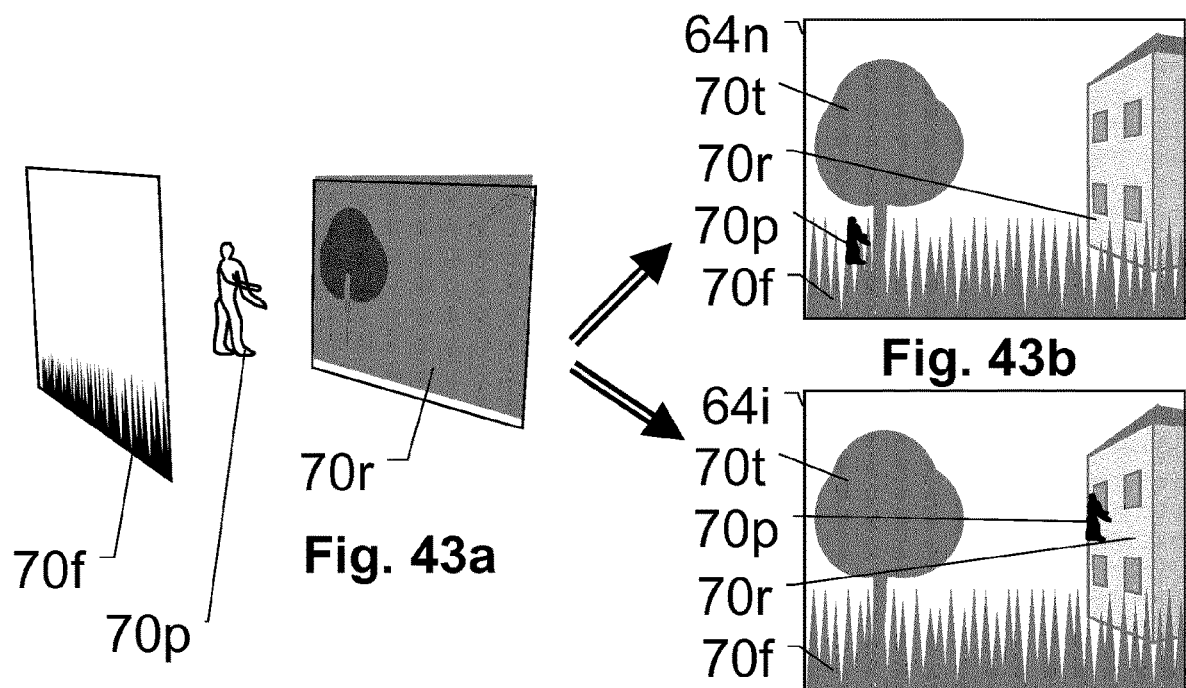
Fig. 43a
Fig. 43b

FACILITY SURVEILLANCE SYSTEMS AND METHODS

CROSS-REFERENCE TO RELATED APPLICATIONS

This application is a continuation of U.S. patent application Ser. No. 17/289,700, filed on Apr. 28, 2021; which is a National Stage Entry of PCT/EP2018/079602, filed on Oct. 29, 2018. The foregoing patent applications are herein incorporated by reference.

FIELD OF THE INVENTION

The present invention pertains to systems and methods of surveillance of a facility such as a building.

BACKGROUND

According to a first aspect, a facility surveillance system for security relevant evaluation of anomalies or an anomalous state of a facility, the facility consisting of facility elements, for example rooms, doors, windows, walls, floors, ceilings, electric installations, plumbing etc. "Facility" is meant in a broad sense, meaning buildings such as a house, a warehouse, an industrial plant or other complex facilities but also a whole property or installations like (big) ships or aircrafts, a construction site, or another kind of a restricted or potentially dangerous area. The facility surveillance system comprises a central computing unit providing a particularly dynamic model of the facility, preferably a building information model (BIM). The facility model provides topological and/or logical and/or functional relationships of at least part of the facility elements, such as indication of location of a particular window, neighbourhood of particular rooms or a particular door giving access to a particular room.

Further, the system comprises a plurality of surveillance sensors adapted for, in particular, continuous surveillance of at least a plurality of the facility elements and for generation of surveillance data comprising surveillance information about the plurality of the facility elements. The plurality of surveillance sensors is configured to provide data about one or more facility elements, either via a respective sensor on its own or two or more sensors generating surveillance data in working relationship, suitable for monitoring or observe a state of a respective facility element, and comprise for example one or more RGB camera, depth camera, infrared camera, microphone, contact sensor, motion detector, smoke detector, key reader, current meter, RIM-camera, laser scanner, thermometer, but may as well comprise input means adapted to allow an input of surveillance data by an operator. Optionally, one or more surveillance sensors are mobile sensors, in particular as part of a mobile robotic platform.

The system further comprises communication means for transmitting data from the surveillance sensors to the central computing unit and state derivaton means for analyses of the surveillance data and derivaton of at least one state. Such a state is for example the position or orientation of a building element, its appearance, including objects associated with a building element (e.g. introduction or removal of an object into or from a room) or any significant difference of surveillance data of the facility element when comparing surveillance data generated at two different times or in the course of time. State derivation means are preferably integrated in the surveillance sensors and/or in the central computing unit. Said otherwise, state derivation means are such means that enable extracting the state of a facility element from the surveillance data relating to the facility element. Such state derivation means are e.g. detectors which detect change from one state to another (for example a sensor which detects opening of a window) or embodied as software such as image processing algorithms which enable determining the state of an object present in the image.

Further, the system comprises recording means for recording a state pattern by combining states of one or more facility elements, based on a topological or logical or functional relationship. In case of one facility element, this relationship is given a priori resp. by combining states of the element that are in a logical relationship (e.g. in the simplest case combining the same surveillance feature/data of the same surveillance sensor of subsequent time points). In case of two or more facility elements, a relationship is e.g. that they are adjoined spatially or are correlated to a common function. The recorder assigns a time stamp to the state pattern, too, e.g. the time of surveillance of one of the underlying states.

Further, the central computing unit is configured to provide a critical-noncritical classification model for classification of recorded state pattern. The critical-noncritical classification model considers time stamps and topological and/or logical and/or functional relationships provided by the facility model and comprises at least one "noncritical"-class of "noncritical" state patterns, and to perform a criticality-classification wherein the recorded state pattern is classified as "critical" or "noncritical" based on the at least one topological and/or logical and/or functional relationship and the at least one time stamp (taking a time associated with the state pattern into account).

Optionally, the central computing unit is configured to provide a normality-anomaly classification model for the recorded state pattern with at least one class being a normality-class denoting a classified state pattern as "normal" and classify a recorded state pattern according to the classification model. Optionally, the classification model is part of the facility model. The central computing unit is configured to perform a normality-classification wherein a recorded state pattern is classified as "normal" or "anomalous" according to the normality-anomaly classification model and to classify a recorded state pattern which has been classified as "anomalous" as "critical" according to the critical-noncritical classification model if a degree of deviation of the anomalous state pattern from the "normality"-class is above a certain threshold, thereby considering the at least one time stamp.

In other words, the system is configured to classify a detected state pattern of the facility as "normal" or not and to check, assess or test of a non-normal state pattern with respect to facility safety/security, i.e. if a state pattern is "critical" or "non-critical".

As another option, the central computing unit is also configured to establish the criticality classification model and—if present—optionally the normality-anomaly classification model, i.e. to start "blank" and generate or create (and if necessary refine) the classification model on its own, e.g. by machine learning.

Optionally, the system's computer is designed such that the criticality classification and optionally the normality classification considers a timetable representing times of human and/or automatic activities associated with the facility, in particular wherein the timetable comprises planned working and/or operating times and/or comprises information about a type of planned activity and/or is embedded in the digital facility model.

As another option, the criticality classification and optionally the normality classification is implemented with at least one of a rule-based system, based on expert knowledge, in particular comprising a decision tree, a Bayesian a decision network, first-order logic, temporal logic and/or a state model with hidden states, a fuzzy logic system, an energy optimisation based system, a rough set based system, a hierarchical decision system, a multi agent system, and/or a data-based system, based on previous generated states and/or state patterns, in particular comprising a decision tree, an ensemble of decision trees, a rule-based machine learning system, an energy optimisation based system, a generative or discriminative probabilistic graphical model in particular comprising a Bayesian network, a Markov random field, a conditional random field, a restricted Boltzmann machine; a fuzzy logic system, a neural network, in particular a deep neural network, in particular a recurrent neural network or a generative adversarial network, a case-based reasoning based system, an instance-based learning system in particular using the k-nearest neighbour method, a kernel method, a system using supervised or unsupervised clustering, a neuro-fuzzy system, a collective classification and/or collective regression based system.

In case a recorded state pattern relates to at least two facility elements, gravity respective classification optionally considers at least one topological and/or logical and/or functional relationship of the two facility elements, based on and/or provided by the facility model.

As another option, the central computing unit is configured to determine a probability for a false positive of a classification, in particular whereby the central computing unit is further configured to trigger acquisition of additional data, in particular data from a database and/or surveillance data by at least one of the surveillance sensors using the communication means, in case the probability is above a defined threshold such that considering the additional data, subsequent classification results in a probability below the defined threshold. Said otherwise, if there is a too high uncertainty or unreliability of a classification, the system retrieves automatically additional data about a state pattern resp. one or more facility elements, such that additional information (e.g. parameters or features) describing the state is available, allowing for a higher certainty of assignment as "critical" or "non-critical" or possibly as "normal" or "anomalous".

Optionally, a state is derived using at least one of detection and/or recognition of persons, detection of open doors and/or windows, detection of fire and/or smoke, detection of abandoned objects, or recognition of activities.

Optionally, in course of an above described classification, there is provided, preferably based on machine learning, verification information for the assignment to one of the classes, in particular at least one of a confirmation of the assignment and/or a rejection of the assignment. Alternatively or additionally, the algorithm is designed to provide change information of the assignment to one of the classes, in particular by at least one of removal of the assignment, and re-assignment to a another class, or provide a definition of a new class, in particular by at least one of modifying an existing class, splitting an existing class into at least two new classes, and merging multiple existing classes into a new class. As another option, the classification algorithm(s) is designed to provide an instruction for removal of a class from a respective classification model, a first selection of the surveillance data to be used for the classification, and/or identification of a second selection of the surveillance data to be ignored for further processing, based on machine learning. As a further option, a feedback loop mechanism is present in which a human operator can validate or discard a notification, this information being fed back to the system once or on a regular basis, for relearning and improving a respective classification model.

Optionally, the system further comprises an update functionality processing the assignment and providing update information for the classification model and/or the facility model.

Optionally, the central computing unit comprises the state pattern recording means. As another option, the analysis of surveillance data of one or more surveillance sensors, at different locations and times, and/or a state pattern is derived using at least one of person re-identification, person tracking, Hidden Markov Model (HMM), Recurrent Neural Network (RNN), Conditional Random Field (CRF), topological and/or logical and/or functional relationships of surveyed facility elements, whereby the relationships are based on and/or provided by the facility model. Considering spatio-temporal relationships of surveyed facility elements allows for an enhanced state deriviation associated with these facility elements, for example to better link surveillance data of two neighboured facility elements together to form a state pattern.

To base the surveillance on a state sequence/pattern has the advantage that more aspects are available which are checked by a classification algorithm, resulting in a profound evaluation. Said otherwise, not a single action or state is regarded on its own, but the context of an action or a string of actions is considered wherefore its classification allows a more insightful or discerning determination of—optionally-anomaly and mainly criticality. If for example a change of a facility element is surveyed as one state and part of a state sequence, it can be verified if a subsequent state of the same or another facility element, which is to be expected because of experience (machine learning) and/or because of logical, functional or topological relationships, indeed is surveyed or not. Using sequences and/or patterns instead of single states allow e.g. to consider behaviour of people at or in the facility which is represented by state sequences and/or patterns. The present disclosure allows to assess how or to what degree a behaviour or procedure concerning the facility and affecting the states of facility elements is unusual or uncommon with respect to security considerations.

Optionally, the facility model comprises sub-facility models representing at least a part of the facility elements and the central computing unit comprises assigning means configured to assign the surveillance data of each facility element to the corresponding sub-facility model, in particular wherein the surveillance data comprises location information and the assigning of the surveying data of each facility element to the corresponding sub-facility model is based on the location information, whereby the location information comprises information about a location of the facility element, of an object or person or of the respective surveillance sensor. Preferably, the location information comprises coordinates in a global or local coordinate system, particularly in a coordinate system of the facility, and/or a designator or a code identifying a pre-defined position or area in the facility, particularly a room.

As another option, the system comprises output means to give out a notification, particularly an alert and/or an order, in case a state pattern indicates a "critical" overall state of the facility, in particular wherein the output is a graphical output within a graphical, particularly three-dimensional, visualization of the facility model and/or the notification comprises multiple options for reaction to the detected state, whereby each option can be rated considering the trustworthiness (probability) of the classification. The latter option means that not only reaction options are presented by the system but these options are also weighted in view of the reliability of the evaluation such that e.g. a user of the system has assistance to better choose out of the possible reaction options.

In a further optional embodiment, the facility model comprises topological facility data and the surveillance data comprises time data. As a further option, a respective state is represented by a combination of features, the features characterizing the state at least with respect to location within the facility topology and time.

Optionally, the respective classification model comprises a database of stored state patterns and the classifying and evaluating of a detected state pattern is based on a comparison with at least one, in particular a plurality, of the stored patterns and a determination of a grade of deviancy between the detected pattern and stored patterns, in particular using a deviation threshold and/or statistical probabilities.

As another option, a criticality and optionally a normality classification model comprises an n-dimensional feature-space wherein a state pattern is represented by an n-dimensional feature-vector, in particular wherein a respective class is represented by a section of the n-dimensional feature-space. A state pattern is then located in the n-dimensional feature-space and its assignment to a class can be evaluated according to geometric principles or machine learning algorithms.

Optionally, the classification model comprises a (deep) neural network, in particular wherein the sequence and/or pattern of states is fed into different units of an input layer of the neural network.

In a further developed embodiment, a state is detected using person recognition and the classifying and evaluation algorithm is configured to classify and evaluate considering an identity or type of a recognized person.

Optionally, the classification is based on a class based on a semantic property, a class based on a topological and/or geometrical property, linear classification, in particular based on Fisher's linear discriminant, logistic regression, naive Bayes classifiers, or the perceptron, a support vector machine, in particular a least squares support vector machine, a quadratic classifier, Kernel estimation, in particular k-nearest neighbour, boosting, decision trees, in particular random forests, sparse grids, deep learning, in particular based on a neural network, particularly a convolutional neural network, and/or learning vector quantization.

Optionally, the central computing unit comprises at least one server computer, particularly a cluster of server computers working as a cloud system, wherein the communication means are adapted to transmit the data to the central computing unit by means of an internet or intranet connection.

BRIEF SUMMARY

Some aspects also relate to a facility security surveillance method for security relevant evaluation of an anomalous state of a facility consisting of facility elements, the method comprising the steps of providing a particularly dynamic model of the facility providing topological and/or logical and/or functional relationships of at least part of the facility elements, in particular a building information model (BIM) and/or wherein the building model comprises sub-building models representing at least part of the building elements, surveilling a plurality of the facility elements and continuously generating surveillance data referring to these facility elements, analysing of the surveillance data and detecting of at least one state thereof, recording a state pattern by grouping states of one or more facility elements such that a state pattern is representative of a sequence and/or pattern of states associated with one or more of the surveilled facility elements, classifying of the at least one recorded state pattern based on a critical-noncritical classification model with at least one noncritical-class for "non-critical" state pattern, wherein the classification is based on based on the at least one topological and/or logical and/or functional relationship and at least one time stamp of the recorded state pattern.

Further, some aspects pertain to a computer programme product comprising programme code which is stored on a machine-readable medium, or being embodied by an electromagnetic wave comprising a programme code segment, and having computer-executable instructions for performing, in particular when run on calculation means of a facility surveillance system, the steps of the method.

A second aspect pertains to a surveillance system for surveillance of a facility, for example surveilling of a property or the interior or exterior of a building, an industrial complex or complex vessel, a construction site, or another kind of a restricted or potentially dangerous area. The system comprises a surveillance robot comprising a body, a drive system or drive unit and an action controller for controlling actions of the robot. The robot may be ground based or be embodied as an aerial vehicle. The system further comprises at least a first surveillance sensor, for example as part of the robot, designed to acquire first surveillance data of at least one object of the property, for example such objects as rooms, doors, windows, persons, electric property installations or mobile property objects such as packages or containers etc.

The first surveillance sensor preferably is a sensor capable of measuring a large area resp. large space. It is preferably embodied as a contactless sensor and comprises for example at least one or more camera (photo and/or video, visible and/or other parts of the electromagnetic spectrum) and/or microphone and/or RIM-camera and/or laser scanner and/or LIDAR and/or RADAR and/or motion detector and/or radiometer.

The system further comprises a state detector designed for evaluation of the first surveillance data and detection of an object's state therefrom. An object's state is for example its position, orientation, colour, shape, nature (e.g. animated or inanimated) or operation state (e.g. on/off, full/empty) etc, or an anomaly i.e. a deviation from a usual situation or state. That means that not each state may be registered as a state but only an abnormal state, e.g. a state not previously monitored.

According to some aspects, the state detector is configured to notice a state ambiguity for a detected state. Hence, the detection unit not only deduces a state associated with an object but also detects or identifies any ambiguity of the detected state. Said otherwise, an ambiguity is determined that indicates, for example a degree of, uncertainty of a state.

The state detector resp. an underlying computing unit is further configured to trigger an action of the robot by the action controller in case an ambiguity is noticed. (If to the contrary the deduced state is estimated as unambiguous resp. if the state detection results in an unambiguous outcome, then the deduced state is considered as certain without the need of triggering said action). Criterion for triggering is optionally indication of ambiguity in that the object's event uncertainty is above a defined threshold; an uncertainty below this threshold is interpreted as an unambiguous detection.

Said triggered action is adapted to generate state verification information about the object, the state verification information being suitable to resolve the event ambiguity.

The state detector is further configured to resolve the state ambiguity considering the state verification information.

Said otherwise, if it is estimated that the state detection is ambiguous, then an action of the robot is triggered which enables the robot to verify (or if applicable falsify) said detected state and therewith resolve any ambiguity. The triggered action results in verification information about the object such that an unambiguous object's state is deduced by the computing unit considering the state verification information.

As a preferred option, the state detector is further configured to plan the action to be triggered such that the action is optimised with respect to said generation of verification information. Based on the first surveillance data, the computing unit determines which of at least two possibly triggerable actions is more effective or best to resolve the event ambiguity. Variables to be optimised are for example ability of the action resp. the verification information generated therefrom to patch, complete, supplement or refine the first surveying data, ability to measure defined state relevant or significant features of the object, level of effort, quality and/or quantity of verification information, and/or time to fully execute action. The determination or choice is thereby based on estimations of values of said variables and/or based on values stored in a robot's database, for instance provided in a machine learning phase in which state ambiguity dependent effectiveness of different actions is learned by the robot.

Said optimisation planning or determination is for example dependent at least one of the object, type or sort of object or object's state, degree of state ambiguity, object's (absolute) position and/or orientation, relative position and/or orientation of robot/survey sensor and object, environmental conditions, quality and/or quantity of first surveillance data and/or time resp. date. Preferably, planning of the action comprises a choice of at least one of acquisition of second surveying data, interaction with the object and/or acquisition of external data as described below.

As an option, the triggered action comprises acquisition of second surveying data of the object by the robot. The second surveying data is optionally acquired by a second surveying sensor of the robot, preferably wherein the first and the second survey sensors are sensors of different sort, for example the first sensor being passive and the second one active or the first sensor being an optic sensor and the second one a haptic sensor. As a further option, the first survey sensor is adapted for rough (and quick) overview surveillance and the second one for fine, detailed surveillance.

As another option, the computing unit is configured to determine with which of the first and at least one second sensor the second surveillance data is to be acquired such that the second surveillance is optimised with respect to generation of event verification information. Said otherwise, the state detector plans which of the at least two survey sensors is the most effective mean for verifying the object's state.

The computing unit is optionally further configured to determine such optimisations also considering further parameters such as available time for the second surveillance. If there is for example an emergency situation (e.g. concluded by the state detector by the detected state, even if it is uncertain), leaving only very limited time for verification and subsequent reaction, then the computing unit chooses a surveillance sensor resp. survey procedure that is optimised with respect to acquisition time and perhaps only second best with respect to measuring accuracy.

As a further option, the triggered action comprises change of acquisition position and/or direction such that the acquisition of the second surveillance data is performed with at least one different acquisition position and/or direction than that of the acquisition of the first surveying data. Said otherwise, the robot resp. its surveillance sensor has a first acquisition position and/or direction when generating the first surveillance data. Before generating the second surveillance data, an alteration of the acquisition position and/or direction of the robot (or at least of the survey sensor) is triggered such that a second acquisition position and/or direction is established, different from the first one.

Preferably, the state detector evaluates from the first surveying data which additional data or information is missing resp. is needed to resolve ambiguity and the second acquisition position and/or direction is chosen by the computing unit such that the additionally needed data (presumably) can be generated when surveying in or with the second acquisition position and/or direction. The second acquisition position and/or direction is thereby optimized with respect to generation of verification information in that the second surveying reveals an optimal amount of second surveillance data about the state.

Optionally, the computing unit provides a database with state relevant features for a plurality of property objects and the acquisition of second surveying data of the object comprises specific surveying of at least one of its state relevant features. For example, the second acquisition position and/or direction is planned, based on a Next-Best-View (NBV)-algorithm, such that one or more of these event relevant features of an object are measurable by the one of the surveillance sensors in the second acquisition position and/or direction.

As a preferred option, the system's computer provides a correlation map correlating state ambiguity with acquisition position and/or direction. Thus, for example the aforementioned change of acquisition position and/or direction is based on the correlation map, e.g. a best view map, providing information about the dependence of deduction ambiguities of a respective object and acquisition position and/or direction, such as best or optimised acquisition positions and/or directions for a plurality of deducible object states, for instance. As further options, the correlation map is based on a defined criterion representing the object's state and/or the correlation map is established by machine learning. In the latter case, the correlation map is e.g. build in a robot's training phase wherein multiple acquisition positions and/or directions and multiple object states observed in a respective position and/or orientation are registered.

Alternatively or additionally to acquisition of second survey data as a triggered action, triggered action for generation of state verification information comprises interaction of the robot with the object such as tactile contact, in particular in order to move the object and/or in order to acquire haptic sensor data of the object, and/or application of material onto the object, in particular application of a liquid and/or paint, and/or output of an acoustic and/or optic signal directed at the object, in particular in case the object is a human being. In other words, the robot interacts in such a way that it can gather information for verification which would not be available without the interaction.

Optionally, the system's computing unit is configured to determine the interaction (e.g. by choosing it from a plurality of possible interactions) such that it is optimised with respect to generation of state verification information. Said otherwise, the computing unit evaluates which interaction is (presumably) most effective to gather information such that the robot's gap in its knowledge of the object's state can be closed.

Advantageously, there is a combination of triggered interaction and acquisition of second surveillance data. For example, the robot first interacts in that it moves the object, e.g. turns it around, and then takes second surveying data, being able to measure event relevant features of the object which were occluded before resp. not accessible at the first surveying and without which the event was not unambiguously deducible from the first surveillance data.

Optionally, the state detector provides a correlation map correlating state deduction ambiguity with interaction position and/or direction, analogue to the previously described correlation map. As further options, the correlation map is based on a defined criterion representing the event and/or is established by machine learning and/or the correlation map comprises best interaction positions and/or directions for a plurality of deducible object states.

As a further option, the interaction is based on a Markov model of object's state. A Markov model is a stochastic model of a randomly changing system, where the system is described by states.

As a further alternative or addition, the triggered action is retrieval of data, in particular about the object, from a database of the surveillance system and/or is third surveillance data of a third surveillance sensor of the surveillance system, the third surveillance sensor not being part of the robot, in particular wherein the triggered action comprises triggering of acquisition of the third surveillance data ("surveillance on demand").

Preferably, the robot is embodied as an unmanned ground vehicle (UGV). Optionally, the UGV comprises an unmanned aerial vehicle (UAV) as a subunit, whereby the unmanned aerial vehicle is detachable from the body (such that it can freely fly at the property) and has a surveillance sensor, e.g. the first and/or second surveillance sensor.

Some aspects pertain also to a surveillance method adapted for a facility surveillance system comprising at least a first surveillance sensor and a mobile surveillance robot. The method comprises the steps of acquiring of first surveillance data with the surveillance sensor, evaluating of the first surveillance data and detecting a state of the property therefrom, determining a state ambiguity of a detected state, in particular by comparison with a predefined ambiguity threshold, triggering an action of the robot in case of a state ambiguity, wherein the action is adapted to generate state verification information about the object, the state verification information being suitable to resolve the state ambiguity, and resolving the ambiguity based on the state verification information.

Further, some aspects pertain to a computer programme product comprising programme code which is stored on a machine-readable medium, or being embodied by an electromagnetic wave comprising a programme code segment, and having computer-executable instructions for performing, in particular when run on calculation means of a central computing unit of a surveillance system comprising a mobile surveillance robot, the steps of the method.

Some aspects provide a surveillance system with a survey robot for deduction of events of a object under surveillance that is advantageously capable of determining an indicator for the (un-)ambiguity of the deduction or detected state and is further capable of taking actions if an ambiguous information about the object's state is determined such that addition information is gathered with which the ambiguity can be resolved. In other words, aspects allow for autonomous evaluation or assessment of an observed state of a surveyed property and automatic remedy or cure of any uncertainty with respect to the observed object.

Further advantageous embodiments enable the robot to plan the action such that the gathering of additional information for verification is performed in an optimised manner. The action that is finally triggered is the one out of at least two possible options that is more effective with respect to generation of such verification information, e.g. such that additional information is best suited to patch the first surveillance data from which the uncertain state is deduced. For example, acquisition of further sensor data (second surveillance data and/or sensor data in context of robot's interaction with the object in question, e.g. data of a robot's arm rotary encoder) is chosen or planned such that the effort for generation of a certain amount of data is lowest and/or the quantity or quality of data is best complementing the existing data about the state or best remedying or repairing the deficits of the existing data. The planning thereby considers for instance choice of sensor, choice of position and/or orientation/direction for measuring resp. interaction or choice of other variables or parameters of a (surveillance) sensor or of the action controller such as measuring accuracy, measuring time or applied power of a robot's actuator.

A third aspect relates to a patrolling system that is adapted to patrol an area of a facility—e.g. of a building such as an industrial plant or an airport or within a container ship, a construction site, or another kind of a restricted or potentially dangerous area- and to perform inspection tasks. In particular, the system is suitable for autonomous surveillance of the area and for detecting and reporting events.

Automated inspection tasks carried out by only an unmanned ground vehicle (UGV) face several problems, for instance:

UGV are limited in their movements by e.g. stairs, road blocks, etc.;
UGV can only inspect objects nearby the ground but not aloft; and
UGV in some environments (e.g. a pit or a gorge) face limited availability of GNSS for determining their position and/or connectivity for receiving/sharing data with e.g. a command center.

Automated inspection tasks carried out by only an unmanned aerial vehicle (UAV) face several problems, for instance:

UAV are limited in weight and hence suffer from
limited operation time due to weight restrictions on batteries,
limited data storage and processing power due to restrictions on HW, and
limited capabilities in carrying payload such as sensors or actuators;
UAV cannot operate in bad weather conditions, e.g. heavy rain, strong winds; and
UAV can face connectivity issues in communicating with e.g. a remote command center.

It is therefore an object to provide an improved mobile surveillance system. In particular, it is an object to provide such a system that combines the advantages of a UGV and a UAV.

According to this aspect, a patrolling mobile surveillance system is therefore adapted as a ground-aerial sensor platform combining at least one UGV and at least one UAV. A combination of UGV and UAV can overcome at least the limitations mentioned above with the following functionalities:

The UGV may act as a launch and recharge platform for one or multiple UAV. The UGV can be equipped with a large battery or with several battery packs in order to recharge the UAV or swap the UAV's batteries. This allows for extended UAV operation times. In bad weather conditions the UGV can provide a shelter for protecting the UAV from rain, wind, etc. Possibly, the UGV can also carry out some of the exploration tasks in times where the UAV can't operate.

The UGV may act as a data storage and processing platform. The UGV provides means for storing the data captured with the UAV and/or means for processing the data. This allows to store/process more data "on the edge" as when only using a UAV.

The UGV and the UAV may act as a joint sensor and/or actuator platform. UGV and UAV can explore and survey objects from complementary point of views. This allows e.g. to combine ground and aerial views of objects. UGV and UAV can inspect the same object but with different sensors, allowing e.g. the UAV to carry out a first rough exploratory inspection of many objects in a wide area but with low resolution and a limited amount of sensors only. The UGV can then take over the measurements of selected objects of particular interest by carrying out their inspection with high resolution and a large variety of different sensors. This gives rise to sensor fusion from data arising by different sensors, from different point of views, in different conditions and at different points in time.

For example, a UAV only has a camera for person detection on board which detects persons with high uncertainty, and a UGV that is equipped with further sensors (such as e.g. an infrared camera) is then sent out to take a closer look. It is also possible that e.g. the UAV carries out inspection tasks which give rise to actions that will be carried out by the UGV, or vice versa. A particular example of this idea is that if a UAV has detected a person, a UGV is given the task of approaching the person and requesting identification (e.g. "asking" for an ID card).

During operations, UGV and UAV can make their sensor information available to each other in real time (or close to real time), thus enabling or improving their positioning. Moreover, the UGV can track the UAV based on a video stream captured with a camera, i.e. determine a direction from UGV to UAV. In case the precision of positioning of the UAV is poor (since there are restrictions regarding weight and it only can carry a very limited number of sensors for positioning) and the positioning of the UGV is good, the direction observation can improve the accuracy of the UAV's position. The tracking system can also be equipped with a distance meter that measures the distance between UGV and UAV. In this case the direction and distance of the UAV relative to the UGV can be determined and the relative position in (X, Y, Z) relative to the UGV coordinate system can be computed. For instance, the UAV can fly ahead and provide sensor data for generating a map for path planning of the UGV.

On the other hand, for navigation purposes, the UGV can be equipped with more sensors, such as e.g. LIDAR (light detection and ranging) and perform for instance LIDAR SLAM (simultaneous localization and mapping) and thus navigate very precisely. Transmitting this information e.g. as a sparse point cloud to the UAV enables a visual SLAM of the UAV.

Further, the UGV and the UAV may act as a joint communication platform. UGV and UAV communicate during operations, enabling e.g. the deployment of new work flows (e.g. a modified mission target and/or path) from the UGV to the UAV, or vice versa. The UGV (or UAV) can receive/transmit data to e.g. a command center if the UAV (or UGV) is not able to do so. In particular, in a scenario with several UGVs (and possibly also multiple UAVs), the UAVs can move from one UGV to the other, e.g. for re-charging and/or sending the data to the closest UGV or the one with the most stable data link.

The term "unmanned ground vehicle" (UGV) should be understood to be not limited to vehicles that stand and move on solid ground, but to include also uncrewed maritime vehicles, such as unmanned surface vehicles (e.g. boats), unmanned undersea vehicle or unmanned amphibious vehicles (e.g. hovercrafts). The UAV for instance can be a multirotor helicopter such as a quadcopter, or a lighter-than-air craft such as an airship.

Some aspects thus relate to a mobile surveillance system (adapted for patrolling a surveillance area, particularly of a building, the system comprising a plurality of sensors, e.g. comprising at least two cameras, wherein the system comprises at least one unmanned ground vehicle that is adapted to move autonomously on a ground of the surveillance area, the UGV comprising a housing enclosing a first battery, first sensor means, e.g. comprising at least a first camera, the first sensor means being adapted to generate first sensor data, and a first computing unit comprising a processor and a data storage, the first computing unit being adapted to receive and evaluate the first sensor data in real time, wherein the system comprises at least one unmanned aerial vehicle, the UGV and the UAV being adapted for collaboratively patrolling the surveillance area, wherein the UAV comprises second sensor means, e.g. comprising at least a second camera, the second sensor means being adapted to generate second sensor data, the UGV comprises a first data exchange module and the UAV comprises a second data exchange module, the first and second data exchange modules being adapted to exchange data; and the first computing unit is adapted to receive and evaluate the second sensor data in real time.

Optionally, the mobile surveillance system comprises a plurality of UAV for patrolling the surveillance area, the first data exchange module being adapted to exchange data (251, 252) with the second data exchange modules of each of the plurality of UAV and/or the first computing unit is adapted to receive the second sensor data of each UAV and to evaluate the second sensor data from the plurality of UAV in a combined holistic analytics approach.

As another option, the computing unit is adapted to generate UGV controlling data for controlling functions of the UGV, particularly in real time and based on the evaluation of the first sensor data and/or the computing unit is adapted to generate UAV controlling data for controlling the at least one UAV, particularly in real time and based on the evaluation of the first and/or second sensor data, wherein the second sensor data is transmittable from the UAV to the UGV via the first and second data exchange modules, and the UAV controlling data is transmittable from the UGV to the UAV via the first and second data exchange modules.

Optionally, the first computing unit is adapted to generate task data comprising instructions for the at least one UAV to perform a task or workflow, wherein the task data is transmittable from the UGV to the UAV via the first and second data exchange module, particularly wherein the task data comprises instructions to perform the task immediately.

As another option, the task data comprises instructions for the at least one UAV to move to a defined position, in particular to a position that is not accessible for the UGV and/or the task data is generated based on the evaluation of the first and/or second sensor data.

Optionally, the system is adapted to perform, particularly fully autonomously, a state detection functionality, the functionality comprising detecting, based on the evaluation of the first and/or second sensor data, a state in the surveillance area. A state comprises for example detecting an intruder present in the surveillance area or more generally any object related state such as its position, orientation, colour, shape, nature (e.g. animated or inanimated) or operation state (e.g. on/off, full/empty) etc, or an anomaly i.e. a deviation from a usual situation or state. That means that not any state may be detected as a state but only an abnormal state, e.g. a state or change not previously monitored.

Optionally, the first computing unit is adapted to perform the state detection functionality based on the evaluation of the first sensor data, wherein, if a state has been detected, the computing unit generates task data comprising instructions for the UAV to move to a position of the detected state and/or to generate second sensor data related to the detected state, wherein the instruction data is transmittable from the UGV to the UAV via the first and second data exchange modules, and the second sensor data related to the state is transmittable from the UAV to the UGV via the first and second data exchange modules.

Optionally, the UAV comprises a second computing unit, comprising a processor and a data storage, wherein the second computing unit is adapted to receive and evaluate second sensor data from the second sensor means, and to perform the state detection functionality based on the evaluation of the second sensor data, wherein, if an state has been detected, state data and/or second sensor data related to the states transmitted to the first computing unit.

As another option, the first sensor means comprise sensors that have superior specifications relative to corresponding sensors of the second sensor means, particularly allowing to generate the first sensor data with a higher resolution than the second sensor data, wherein, if the state or anomaly has been detected, task data is generated comprising instructions for the UGV to move to a position of the detected state or anomaly and/or to generate first sensor data related to the detection.

As another option, the state detection functionality comprises using at least one machine learning algorithm for training a state detection model and/or the at least one machine learning algorithm is provided in the first computing unit, and a state detection model is provided at least to the UAV, wherein the first computing unit is adapted to run the machine learning algorithm to update the state detection model, wherein an updated state detection model is transmittable from the UGV to the UAV via the first and second data exchange modules.

Optionally, the first computing unit comprises a graphical processing unit and is adapted to run the machine learning algorithm on the graphical processing unit and/or the data storage comprises a database for storing data related to detected states.

As another option, the UGV is adapted to transmit data related to the detected events to a remote command center, wherein the data storage is adapted to store the data related to detected events when there is no data connection to the remote command center available, and the stored data related to detected events is transmitted to the remote command center when a data connection is available.

Optionally, the first computing unit is adapted to perform a workflow generation process for generating a workflow for performing a patrolling task in the surveillance area, in the course of which workflow generation process the first computing unit is adapted to generate an optimized workflow for performing the patrolling task, the workflow involving one or more of the UAV, to generate workflow data for each of the involved UAV, the workflow data allowing the respective UAV to perform a part of the patrolling task, and to provide, via the first and second data exchange modules, the workflow data to the involved UAV.

Optionally, the first computing unit is adapted to request and receive, via the first and second data exchange modules, task-specific data of the at least one UAV, wherein the task-specific data comprises information about properties, a position and/or a workload that are associated with the respective UAV, to assess, based on the task-specific data, task-specific capabilities associated with each of the UAV, and to generate the optimized workflow based on the patrolling task and on the task-specific capabilities.

As another option, the first computing unit is adapted to monitor a status of the involved UAV, the status including the UAV's capability to perform the respective part of the patrolling task, wherein, if the first computing unit determines that one of the involved UAV has lost its capability to perform its part of the patrolling task, the first computing unit is adapted to generate an adapted workflow, at least comprising re-assigning the affected part of the patrolling task to one or more of the plurality of UAV, to generate adapted workflow data for one or more of the involved UAV, and to provide, via the first and second data exchange modules, the adapted workflow data to one or more of the plurality of UAV.

Optionally, each of the at least one UAV is equipped with a software agent, wherein each software agent is installable on a computing unit of the UAV or installed on a communication module that is connected to the UAV, and adapted to exchange data with the UAV it is installed on or connected to, wherein, in the course of the workflow generation process, the first computing unit is adapted to request and receive the task-specific data of the UAV from the software agents of the respective UAV, and to provide the workflow data to the software agents of the involved UAV.

Optionally, the UGV and the at least one UAV are adapted for patrolling the surveillance area autonomously and/or the data storage is adapted to store a map of the surveillance area and the UGV is adapted to navigate through the surveillance area based on the map and/or the first computing unit comprises a SLAM algorithm for performing a simultaneous localization and mapping based on the first and/or second sensor data, particularly wherein the sensors comprise at least one LIDAR scanner, in particular wherein the SLAM algorithm is adapted to continuously update a map of the surveillance area, wherein an updated map is transmittable to the UAV via the first and second data exchange modules.

Optionally, for collaboratively patrolling the surveillance area, the UGV is adapted to move along a predefined path, particularly along a sequence of defined waypoints; and the at least one UAV is adapted to explore an area around the UGV, moving within a maximum range around the UGV, particularly wherein the maximum distance is user-defined, depends on a maximum speed of the UAV and the patrolling speed of the UGV while moving along the predefined path, and/or is given by requirements for exchanging data via the first and second data exchange modules.

Optionally, the first computing unit comprises algorithms for encrypting and decrypting the data, and the first and second data exchange modules are adapted to exchange the data encrypted and/or the exchanged data comprises a heartbeat message, wherein the UGV and/or the UAV is adapted, based on the heartbeat message, to identify if a data exchange between the UGV and the UAV is available, particularly wherein upon identifying that a data exchange between the UGV and the UAV is not available, the UGV and/or the UAV is adapted to change its position in order to re-establish a connection for data exchange, in particular to return to a previously position where data exchange was still available.

Optionally, the system comprises one or more radio communication modules adapted to establish a radio connection with a remote command center, particularly by means of a WiFi network or a mobile phone network, and to send and receive data via the radio connection and/or the system is operable from the remote command center by means of data sent to a radio communication module of the system, particularly operable in real time.

Optionally, the UAV comprises a first radio communication module and is adapted to transmit the data received via the radio connection wirelessly to the UGV and/or the UGV comprises a second radio communication module, and the UAV is adapted to transmit the data received via the radio connection wirelessly to the UGV if the second radio communication module cannot establish the radio connection with the remote command center.

Optionally, upon identifying that the radio connection is not available, the UGV and/or the UAV is adapted to change its position in order to re-establish the radio connection, in particular to return to a previously position where the radio connection was still available.

Some aspects also relate to a mobile surveillance system adapted for patrolling a surveillance area, particularly a building, the system comprising one or more radio communication modules adapted to establish a radio connection with a remote command center to send and receive data, and a plurality of sensors, e.g. comprising at least two cameras, wherein the system comprises at least one unmanned ground vehicle (UGV) that is adapted to move autonomously on a ground of the surveillance area, the UGV comprising a housing enclosing a first battery; and first sensor means, e.g. comprising at least a first camera, the first sensor means being adapted to generate first sensor data, wherein the system comprises at least one unmanned aerial vehicle (UAV), the UGV and the UAV being adapted for collaboratively patrolling the surveillance area, wherein the UAV comprises second sensor means, e.g. comprising at least a second camera, the second sensor means being adapted to generate second sensor data, the UGV comprises a first data exchange module and the UAV comprises a second data exchange module, the first and second data exchange modules being adapted to exchange data the remote command center comprises a remote computing unit comprising a processor and a data storage, the remote computing unit being adapted to receive the first sensor data and the second sensor data via the radio connection, to evaluate the first sensor data and the second sensor data in real time, and to generate task data comprising instructions for the at least one UGV and UAV to perform a task or workflow, wherein the task data is transmitted via the radio connection.

Optionally, the UGV and the UAV are connected by means of a cable (with or without a plug), wherein the first battery is adapted to provide electricity to the UAV via the cable; and the first and second data exchange modules are adapted to exchange the data via the cable.

As a further option, the UAV comprises a second battery, wherein the first battery has a bigger capacity than the second battery; the UAV is adapted to land on the UGV; and the UGV comprises a charging station that is adapted to charge the second battery when the UAV is landed on the UGV, and/or a battery exchange station that is adapted to automatically swap the second battery when the UAV is landed on the UGV.

Optionally, the UGV comprises at least one robot arm that is controllable by the computing unit based on evaluated first sensor data, wherein the computing unit is adapted to control the robot arm to interact with features of the environment, particularly comprising: opening and/or closing doors; operating switches; picking up items; and/or positioning a UAV on the charging station.

Optionally, the UGV comprises a plug to be connected with a power outlet, wherein the computing unit is adapted to detect power outlets in the environment based on the first sensor data; and the UGV is adapted to plug the plug into the power outlet, particularly by means of a robot arm, and/or the UAV is a quadcopter or other multirotor helicopter comprising a plurality of rotors, particularly at least four rotors, and a base comprising skids or legs enabling the UAV to land and stand on the UGV.

Optionally, the UAV uses a lifting gas, particularly helium or hydrogen, to provide buoyancy, particularly wherein the UAV is an airship, particularly wherein the UGV comprises a gas tank and a refilling station adapted for refilling the lifting gas of the UAV.

Optionally, the charging station comprises at least one induction coil, wherein the charging station and the UAV are adapted to charge the second battery by means of induction.

Optionally, the mobile surveillance system comprises at least a first UGV and a second UGV, wherein the UAV is adapted to land on the first UGV and on the second UGV and to exchange data wirelessly with the first UGV) and the second UGV).

As another option, the sensors comprise at least one GNSS sensor for use with a global navigation satellite system, the at least one GNSS sensor being provided in the UGV and/or in the UAV, and/or the at least one GNSS sensor is provided in the UAV, wherein a signal provided by the GNSS sensor is transmittable wirelessly from the UAV (220) to the UGV, particularly as a part of the second sensor data.

Optionally, the UGV comprises a space to accommodate one or more UAV, the space providing protection from precipitation and/or wind, particularly wherein the UGV comprises an extendible drawer on which the UAV is landable, the drawer being retractable into the housing of the UGV to accommodate the UAV inside the housing; or a cover which is adapted to cover the UAV when it is landed on the UGV.

Another fourth aspect pertains to a security monitoring system for detection of states of a facility.

In security monitoring systems states are raised by state detectors, i.e. making use of surveillance sensors such as person detectors, anomaly detectors, or special classifiers trained for security applications such as open door or open window detectors. These states may then be filtered by a state filter, which determines if a state is critical, uncritical or previously unknown. A state is for example an object's position, orientation, colour, shape, nature (e.g. animated or inanimated) or operation state (e.g. on/off, full/empty) etc, or an anomaly i.e. a deviation from a usual situation or state. That means that not each state may be registered but only an abnormal state, e.g. a state not previously monitored.

A monitoring site may have its own regularities or characteristic workflows including various kinds of different entities such as human workers or machinery, e.g. wherein workers may have specific access rights to different areas, buildings, or rooms of the monitoring site whereas visitors may only have restricted access. Furthermore, depending on the type of site, e.g. a construction site or a restricted military site, the monitoring site may comprise of potentially dangerous areas, e.g. wherein humans and/or machinery are at risk to be injured or at risk to violate the law, and thus need to be warned when entering these zones. In addition, particularly open sites are subject to varying environmental effects, not to mention that the overall topology of different sites can be quite different.

In other words: it is typically hard to provide a uniform monitoring system for different facilities because some states may only be relevant for a particular monitoring site, e.g. the monitoring site having a specific workflow or local characteristic such as a specific person who tends to start very early in the morning or to work late at night.

Thus, site monitoring still requires the human eye and human judgement, e.g. wherein an algorithm typically alerts an operator to a specific state, and the operator decides, whether a state was indeed critical or not. The method of choice is usually classification or anomaly detection, which alerts the operator in case of a suspicious event. The operator then either discards the alert as irrelevant or takes action, e.g. calling a colleague, the police, or the fire brigade. Thus, the same software usually runs on different local sites wherein a human operator adapts to the specific regularities of each site.

In attempt to automatize such adaption processes by computer implemented solutions many computational challenges are faced.

It is therefore an object to provide an improved security monitoring system which overcomes the above mentioned limitations.

It is a particular object to provide such a system and method that allows for a more versatile and more robust monitoring and alarming system, wherein false alarms are reduced and only increasingly relevant alerts are pointed to an operator's attention.

Those objects are achieved by realizing the features of independent item 79 as defined at the end of the description. Features which further develop the disclosure in an alternative or advantageous manner are described in items dependent on item 79.

The disclosure relates to a security monitoring system for detection of states of a facility, e.g. an indoor and/or an outdoor site such as a building, a warehouse, an industry complex, a construction site, or another kind of a restricted or potentially dangerous area.

For example, such a security monitoring system may comprise at least one surveillance sensor configured to, particularly continuously, surveillance of the facility and to generate surveillance data comprising information about the facility. In particular, such surveillance data may provide information on the state of a particular section of the facility, e.g. wherein the information may be provided essentially directly, i.e. based on a single sensor, particularly without processing the data, and/or two or more sensors may generate surveillance data based on a working relationship.

By way of example, surveillance sensors may comprise a camera, a microphone, a contact sensor, a motion detector, a smoke detector, a key reader, a current meter, a RIM-camera, a laser scanner, a thermometer, but may as well comprise input means adapted to allow an input of survey data by an operator. Optionally, one or more surveillance sensors are mobile sensors, in particular as part of a mobile robotic platform.

The system further comprises a state detector configured to detect at least one state based on surveillance data of a facility, wherein the at least one state is representative of at least one state associated with the facility.

For example, according to one embodiment, the security monitoring system is configured to detect a sequence and/or pattern of states associated with the facility, wherein typical states may be detection and/or recognition of a person, detection of an open door and/or window, detection of fire and/or smoke, detection of an abandoned object, recognition of an activity, and detection of an anomaly A state may be representative of a change of the position or orientation of an element of the facility, e.g. opening a door or window, an alteration of its appearance, including alteration or change of objects associated with the facility (e.g. introduction or removal of an object into or from a room, a person entering the room) or any significant difference of surveillance data when comparing surveillance data generated at two different times or in the course of time. By way of example, state detection means may be integrated in the surveillance sensors and/or in a central computing unit. In particular, state detection may take into account topological and/or logical and/or functional relationships of different entities associated with the facility, and a timetable representing times of human and/or automatic activities associated with the facility, in particular wherein the timetable comprises planned working and/or operating times and/or comprises information about the type of activity and/or is embedded in a digital model of the facility.

Furthermore, the system comprises a state filter configured to carry out an automatic assignment of the at least one state to a class of states, wherein the state filter is configured to assign the at least one state to at least a first class denoting a state as "non-critical", and a second class denoting a state as "critical".

According to some aspects, the security monitoring system comprises a feedback functionality configured to generate feedback information on the automatic assignment, the feedback information being indicative of at least one of a confirmation or negation of the automatic assignment of the at least one state to the first or second class, and a manual assignment of the at least one event to the first or second class. Furthermore, the security monitoring system has a training functionality, particularly based on a machine learning algorithm, configured to receive and process the feedback information and to provide update information for the state filter, wherein the update information is configured to establish the first class and the second class.

Thus, the automatic assignment is dynamically improved and, for example, only requires a "rough" initialization based on little prior information on the facility. In particular, the system dynamically adapts to specific properties of the facility.

It may happen, that an state cannot be assigned to one of the first and second class. In particular, sometimes it may also be difficult for an operator to judge whether a state is critical or not, e.g. in case the state has never occurred before or in case an operator suspects the quality of the surveillance data. The operator may then manually request re-acquisition of at least part of the surveillance data associated with that event or he may request additional surveillance data by additional survey sensors, e.g. by deploying a mobile sensor to the area in question.

Therefore, by way of example, there may be further classes, e.g. wherein the state filter is configured to assign the at least one state to a third class denoting an state as "uncertain". In particular, the feedback functionality may be configured to trigger a re-acquisition of at least part of the surveying data and/or acquisition of additional surveying data in case the at least one state has been assigned to the third class.

Different reactions may be triggered based on different certainty levels of the assignment. For example, in case an state is critical or non-critical with high certainty the system takes automatic action or ignores the state. However, in case the certainty level of the assignment is low, and/or in case the state filter cannot assign an up to now unknown state, an operator has to decide and to take action, e.g. call the police or fire brigade or ignore the event. The system dynamically learns new critical or non-critical events, and thus false alarms are reduced and only increasingly relevant alerts are pointed to an operator's attention.

Alternatively, all critical state (even with high certainty) may have to be confirmed by an operator before an action is triggered.

In addition to a class representing the "non-critical" events for each "critical" state a separate sub-class may be defined, e.g. "fire", "intrusion", etc.

Considering relationships of surveyed elements of the facility allows for an enhanced detection of state associated with these elements, for example to better link surveyed states of two neighboured elements together to form a state. To base the surveillance on state sequences and/or pattern has the advantage that it has more aspects which can be checked by the state detection algorithm, resulting in a more profound evaluation of the classification. Said otherwise, not a single state is regarded on its own, but the context of a state or a string of states is considered wherefore its classification as "critical" or "non-critical" can be evaluated better. If for example an individual element is surveyed as one part of a state sequence, it can be verified if a subsequent state of the same or another element, which is to be expected because of experience (machine learning) and/or because of logical, functional or topological relationships, indeed is surveyed or not. Using sequences and/or patterns of state allow e.g. to consider behaviour of people on the facility, which is represented by states sequences and/or patterns. Thus, the present disclosure allows that the system learns how usual or to what degree costume a behaviour or procedure concerning the facility is.

According to another embodiment, the automatic assignment is based on an n-dimensional feature-space wherein a state—e.g. "person detected" plus metadata such as time, location etc.—is represented by an n-dimensional feature-vector, in particular wherein a respective class is represented by a section of the n-dimensional feature-space, or a neural network, in particular wherein a detected state representative of a sequence and/or pattern of changes associated with the facility is fed into different units of an input layer of the neural network.

In a further embodiment, the security monitoring system comprises a user interface configured to receive an input by an operator of the security monitoring system and to generate a feedback signal carrying the feedback information based on the input, in particular wherein the feedback functionality is configured that a lack of receiving input at the user interface during a defined period of time is interpreted as confirmation or negation of the automatic assignment. The user interface is optionally provided by a mobile device, e.g. a smartphone app, which is part of the security monitoring system and handles the operator input and transmit according data between the smartphone and a further system's computing unit. This enables a remote (feedback) control of the monitoring system.

By way of example, the user interface is configured that an operator of the security monitoring system can manually negate and/or confirm the automatic assignment, manually assign the at least one state to a class of states that is different from the class to which the at least one state has been assigned by the automatic assignment, generate a new class of states, particularly by at least one of splitting an existing class into at least two new classes, e.g. "critical" into "high-critical" and "low-critical", merging multiple existing classes into a new class, and modifying an existing class, and delete an existing class.

According to another embodiment, the security monitoring system is configured for providing a command output, particularly to execute a warning or a security measure, in case the at least one state has been assigned by the automatic assignment to at least one of the second and the third class. Again, such a warning may be transmitted to a mobile device such as a smartphone.

In a further embodiment, the security monitoring system is configured to have a release functionality configured to hold back the command output for at least a defined waiting period, wherein the release functionality is configured for at least one of releasing the command output based on a release signal from a user interface, releasing the command output at the end of the defined waiting period, and deleting the command output based on a stop signal from the user interface. For example, the security monitoring system may be configured that a lack of receiving the release signal during the waiting period is interpreted by the training functionality as confirmation of the automatic assignment and/or that the deleting of the command output is interpreted by the training functionality as negation of the automatic assignment.

Different facilities have specific regularities and a critical state on one site may not be worth mentioning on another site. Thus, site monitoring and the assignment of state into different classes and subclasses still require time-consuming processes and the human eye and human judgement.

Application of machine learning algorithms allows an automation of different processes in classifying measurement data. Such a classification framework, based on a subclass of general machine learning (ML), provides a very efficient "learning approach" for pattern recognition as compared to rule-based programming. Machine learning algorithms can deal with tasks of large complexity, make use of implicit or explicit user feedback, thus becoming adaptive, and provide "per point" probabilities of the classification. This saves time, reduces processing costs and decreases amount of manual work.

In so-called "supervised ML" an algorithm implicitly learns which characterizing properties (i.e. a combination of features) define target properties of events (such as class membership, affiliation to a sub-class, etc.) according to definitions made by the user when labelling training data.

On the other hand, in so-called "unsupervised ML" the algorithm finds hidden structure in unlabeled data, e.g. by finding groups of data samples sharing similar properties in feature space. This is called "clustering" or "segmentation".

Probabilistic classification algorithms further use statistical inference to find the best class for a given instance. Instead of simply determining a "best" class for each instance, probabilistic algorithms provide a probability of the instance being a member of each of the possible classes, wherein normally the one class with the highest probability is selected. This has several advantages over non-probabilistic algorithms, i.e. associating a confidence value for weighting its choice, and consequently, providing an option to abstain a choice when its confidence value is too low.

Usage of machine learning algorithms requires a lot of training data. In case of supervised machine learning also labeling information (i.e. assignment of the object classes to the data) is necessary. The data acquisition, preparation and labeling requires a lot of efforts and time. However, by storing and feeding back the information and decisions of an operator, particularly many operators on many different facilities, to the underlying algorithm in an active learning setting, the algorithmic models are improved and gradually adapted over time.

Thus, according to a further embodiment, the training functionality is based on at least one of: linear classification, in particular based on Fisher's linear discriminant, logistic regression, naive Bayes classifiers, or the perceptron; a support vector machine, in particular a least squares support vector machine; a quadratic classifier; Kernel estimation, in particular k-nearest neighbour; boosting; a decision tree, in particular based on random forests; a hidden Markov model; deep learning, in particular based on a neural network, particularly a convolutional neural network (CNN) or a recurrent neural network (RNN); and learning vector quantization.

Furthermore, a monitoring system locally installed on a particular facility may be part of an extended network of many local monitoring systems running on a plurality of different monitoring sites, each local security monitoring system providing update information to a global event detection algorithm and/or a global event classification model.

On the one hand, such a global algorithm and/or model, e.g. stored on a central server, may then be used to initialize a local monitoring system installed on a new monitoring site. On the other hand, the global algorithm and/or model may be updated by operator feedback similar to local models.

Therefore, during operation time of the local system, the global state detection and/or filter model can be queried by the local security monitoring model in case an event is unknown to the local model, before the operator is prompted to make a decision. Hence, a local model can take advantage of information which has been gathered at other facilities.

Accordingly, in a further embodiment, the security monitoring system comprises at least another state filter, which is specifically foreseen to be used on a different facility and configured to detect at least one state associated with that facility and to carry out an automatic assignment of this state to at least a first class denoting a state as "non-critical", and a second class denoting a state as "critical". Furthermore, the security monitoring system comprises a common classification model, comprising a first common class denoting a state as "non-critical", and a second common class denoting a state as "critical", wherein the security monitoring system is configured that for each state filter the corresponding first class and the corresponding second class are initially established based on the first and second common classes. Moreover, the security monitoring system is configured to generate for each state filter corresponding feedback information on the corresponding automatic assignment, each corresponding feedback information being indicative of at least one of a confirmation or negation of the corresponding automatic assignment of the corresponding at least one state to the corresponding first or the corresponding second class, and a manual assignment of the corresponding at least one state to the corresponding first or the corresponding second class.

Therefore, according to this embodiment, the security monitoring system is configured to provide for each (local) state filter corresponding update information, wherein the corresponding update information is configured to (locally) establish the corresponding first class and the corresponding second class, and the security monitoring system is configured that at least part of each of the (local) corresponding feedback information and/or at least part of each of the (local) corresponding update information is provided as common update information to the common classification model if relevance for the common classification model is recognized, such that the first and second common classes are established based on the common update information. Said otherwise, the system evaluates if the additional feedback or update information is of interest for the common model, e.g. based on known common features different facilities, and if this is the case, it is provided as common update information.

It may be beneficial that the common classification model is updated based on filtering by an operator, i.e. wherein the operator decides to take over the update/feedback to the common classification model. Alternatively, this update can be performed automatically, e.g. based on rules, in particular based on consistency checks.

In addition, a local state filter may be dynamically updated from the updated common classification model, i.e. representing a global state filter. For example, a local operator familiar to local pre-requisites may decide which differences between the global event filter and the local state filter are taken over into the local event filter. Alternatively, this update can be performed automatically, e.g. based on rules, in particular based on consistency checks.

Accordingly, in another embodiment, the security monitoring system comprises a first filter functionality configured to carry out a selection out of the feedback information and/or out of the update information of each state filter and to provide this selection as the common update information to the common classification model.

In another embodiment, the security monitoring system is configured to update each state filter based on at least part of the common update information, namely that for each event filter the corresponding first class and the corresponding second class are established based on the common update information, in particular wherein the security monitoring system comprises a second filter functionality configured to carry out a selection out of the common update information and to provide this selection to at least one of the state filters.

In a further embodiment, also local and/or global state detection algorithms may profit from operator feedback and thus, similar to the improvement on event filtering, also state detection may become more sophisticated over time. Thus, the feedback loop may work in a two-fold way, i.e. providing feedback to the state filter to answer questions like "is the state critical or not", "is action required or not", as well as providing feedback to the state detector to answer questions like "is the triggered event correct", "did the person detection work properly".

Therefore, according to this embodiment, the security monitoring system is configured that at least part of one of the feedback information corresponding to one of the state filters, the update information corresponding to one of the state filters, and the common update information is provided to the event detector as detector upgrade information, namely that detection of future events by the (local) state detector is based on the detector upgrade information. For example, local event detectors may be automatically upgraded based on the detector upgrade information, e.g. as soon as new detector upgrade information is available or based on a defined upgrading interval.

Some aspects further relate to a computer programme product comprising programme code which is stored on a machine-readable medium, or being embodied by an electromagnetic wave comprising a programme code segment, and having computer-executable instructions for performing, in particular when run on a computing unit comprising an state detector and/or a local state filter of a security monitoring system, the steps: detecting at least one event based on surveying data of a facility, wherein the at least one state is representative of at least one change associated with the facility; carrying out an automatic assignment of the at least one state to a class of states, wherein at least two classes of states are defined, namely a first class denoting a state as "non-critical", and a second class denoting a state as "critical"; processing feedback information on the automatic assignment, the feedback information being indicative of at least one of a confirmation or negation of the automatic assignment of the at least one state to the first or second class, and a manual assignment of the at least one state to the first or second class; and providing update information for carrying out the automatic assignment, wherein the update information is configured to establish the first class and the second class.

In automated surveillance systems as described in this document, it is a problem that an automatic an object or person detection, which is relying only on RGB- or IR-picture information from a camera, is not robust enough, in particular under challenging conditions, like at night or in strange illumination situations, in unusual poses, in case of dissimulation, etc.

Several previous works have thus proposed to use multiple signal sources to tackle the object detection problem. For example, with respect to the task of person detection the paper [1]: "Human Detection Using Multimodal and Multidimensional Features" of Spinello and Siegwart, ICRA 2008, proposes a fusion of laser range and camera data. Based on a clustering of the classification based on geometrical properties in range data space, an image detection (HOG features+SVM) is performed on a restricted image area which is defined by clusters obtained from range data. This supposes that calibration parameters of the sensors are available. However, as the range data is used to define a search space for the image-based classifier, out-of-range objects simply cannot be detected.

Or the paper [2]: "People Detection in RGB-D Data" of Spinello and Arras, IROS 2011, suggests a fusion of RGB and depth data obtained from a Kinect-device. The derived depth data is robust with respect to illumination changes—but sensitive to low signal strength returns and suffers from a limited depth resolution. The derived image data is rich in color and texture and has a high angular resolution—but it breaks down quickly under non-ideal illumination conditions. This approach takes advantage of both modalities, thanks to a principled fusion approach called Combo-HOD, which neither relies on background learning nor on a ground plane assumption. The proposed person detector for dense depth data relies on novel HOD (Histograms of Oriented Depths) features. Combo-HOD is trained separately by training a HOG detector on image data and a HOD detector on depth data. HOD descriptors are computed in depth image and HOG descriptors are calculated in the color image using the same window, which requires calibration. When no depth data are available, the detector gracefully degrades to the regular HOG detector. When the HOG and HOD descriptors are classified, the information is ready to be fused using an information filter.

The paper [3]: "Multi-modal Person Localization and Emergency Detection Using the Kinect" by Galatas et al., IJARAI 2013, suggests a combination of depth sensor and microphones to localize persons in the context of assistive, intelligent environments. Two Kinect-devices are used in the proposed system. The depth sensor of the primary Kinect device is used as the main source of localization information, thanks to skeletal tracking (using the MS Kinect SDK). The person is tracked while standing, walking or even sitting. Sound source localization and beamforming are applied to the audio signal in order to determine the angle of the sound source in relation to the device and acquire the audio signal from that particular direction. Nevertheless, one Kinect is only capable of providing the angle of the sound source but not its distance, hampering localization accuracy. Therefore, the second Kinect is introduced and is used solely for sound source localization. The final estimated location of the person is a result of combining the information from both modules. Automatic Speech Recognition (ASR) is used as a natural means of interaction and in addition to the location information for emergency detection.

The paper [4]: "On the Use of a Low-Cost Thermal Sensor to Improve Kinect People Detection in a Mobile Robot" by Susperregi et al., Sensors 2013, describes a fusion of visual, depth and thermal cues. A Kinect sensor and a thermopile array sensor are mounted on a mobile platform. The false positive rate achieved as compared to using any single cue is drastically reduced. The advantage of using the thermal modality is that there are no major differences in appearance between different persons in a thermal image. Besides, the infrared (IR) sensor data does not depend on light conditions, and people can also be detected in complete darkness. As a drawback, some phantom detections near heat sources, such as industrial machines or radiators, may appear. After building the individual classifiers for each cue, they are hierarchically assembled such that their outputs are combined in a tree mode to obtain a more robust final people detector.

GB 2546486, shows a multimodal Building-Specific anomalous event detection and alerting system which a plurality of different sensors.

KR 101125233 and CN 105516653 are mentioning a security methods based on a fusion technique of a vision signal and a radar signal. CN 105979203 shows a multiple camera fusion.

It is therefore an object of a fifth aspect to provide an improved automated surveillance system. In particular, it is an object to provide such a system that automatically detects critical events in particular also with a low number of false-positives and falls-negatives due to misdetections in non-optimal sensing conditions. It is also an object to provide a system which can substantially automatically adapt itself to a specific environment, preferably with lower on-site training effort than in prior art. An aspect therein is also that the system can be machine learned with a substantially lower human interaction than in prior approaches, in particular while still being specifically trained for a specific building or any other monitoring site.

It is also an object to provide an according surveillance system which can handle complex multi sensor and multimodal surveillance applications, in particular wherein contextual dependencies of the modals can be derived substantially automatically with substantially low manual programming effort.

Those objects are achieved by realizing the features of the independent items 93, 104 and 107 as defined at the end of the description. Features which further develop the disclosure in an alternative or advantageous manner are described in items dependent on these independent items.

This aspect, concerns the idea to combine multiple sensors and/or modalities—e.g. like color, depth, thermal imagery, point clouds, etc.—in a smart way for object detection in a surveillance system. Taken independently of each other, each modality has its own strengths. For instance, state-of-the-art image-based detectors rely on rich color and texture information present in RGB images. However, their performance is known to decrease under non-ideal illumination conditions and especially in darkness. In those non-ideal cases, complementary information like a depth map, a point cloud (PC) and/or an infrared (IR) signal can be utilized in determining a presence, absence, classification, state, etc. of an object of interest in a scene in which a classic image detector degrades or fails.

As shown in the prior art described above, known systems therein focus on either:

Applying detection in each of these modalities separately and independently, and then merging the results. A so called parallel approach, e.g. by fusing an output of an RGB-detector with an output of a depth detector, like in U.S. Pat. No. 8,630,741, US 2014/320312, GB 2546486 [2] or others; or Chaining detectors for each modality. A so called series or hierarchical approach, e.g. by starting by clustering of objects in a range data space first, and thereupon using this cluster information to guide a second stage visual detector to the discovered regions of interest, like in KR 101125233, [1] or others.

Another approach, as e.g. presented in US 2009/027196, [4] or others, tries to learn a potentially best hierarchy of detectors from data, using tree structures. Thereby, a single, generic model is learned.

Instead, this aspect proposes to learn a context-aware detector that could follow both a parallel or series architecture, in particular a selectively learned mixture of subsets of those, which is learned on real world and/or synthetically generated training data. On specific aspect therein can be seen in the introduction of context learning in the detection to take advantage of each modality's strength, which is done based on the context that is provided and used in the training and learning. The context which can in particular comprise environment information can therein e.g. comprise a location, an image region, a time of day, a weather information or forecast, etc.

Thereby, the disclosure is more than a simple independent side by side usage or a hierarchical surveillance-sensor approach of prior art, which can overcome many prior art drawbacks and can improve the overall detection rate respectively reduce the false alarm rate, in particular in view of at least partially contradicting surveillance sensor results.

This aspect of an automated surveillance system for an automated detection of states, in particular critical states, abnormalities or anomalies at a facility relates to a utilization of multiple surveillance-sensors. "Facility" is meant in a broad sense, meaning not only e.g. a building but also a whole property or installation such as an industrial plant or other complex facilities like (big) ships or aircrafts. In particular, in a mobile and/or stationary automated surveillance system as it is described in this document, e.g. combined with one or more of the aspects of the other embodiments. Such state detection can e.g. be implemented based on information from a mobile patrolling system that is adapted to patrol an area, like a building to be inspected, but also based on information from stationary surveillance equipment, like surveillance cameras, various kinds of intrusion sensors (e.g. for light, noise, shattering, vibrations, thermal images, movements, etc.) authentication terminals, personal tracking equipment, RFID-trackers, distance sensors, light barriers, etc. In particular, a combination of stationary and autonomous surveillance of the area for automatically detecting and reporting anomalies and/or critical states can be implemented, for example adapted to the specific environment.

The system therein comprises multiple surveillance-sensors, of which at least two are operating in different modalities. So there is at least one first surveillance-sensor for at least one first modality and at least a second surveillance-sensor for at least one second modality, whereby at least two modalities are sensed. The term modalities can herein in particular refer to a sensing of different physical properties being sensed by the sensor, like e.g. sensing visible optical radiation, invisible optical radiation, audible acoustic waves, inaudible acoustic waves, distances, ranges, temperature, geometries, radiation, vibration, shock, seism, etc. The surveillance-sensors can therein be adapted for a surveillance of at least a portion of the property or building and for a generation of real world surveillance data in those multiple modalities.

In the automated surveillance system, the detection of anomalies is derived from a combination of one or more sensings from those multiple surveillance-sensors. For example, such can be done by a computing unit which is designed for an evaluation of surveillance-data, preferably embodying a machine learned evaluation system comprising an automatic detection of anomalies and/or classification of those anomalies (e.g. for being potentially critical or uncritical) or deriving state patterns thereof, such as a machine-learned classifier-unit and/or detector-unit.

According to this aspect, the combination of multiple surveillance-sensors is therein provided by a machine learned system (e.g. implemented in the computing system, like in an artificial intelligence unit), which is at least partially trained on training data which is comprising a contextual information of the property or building, e.g. by a supervised training of an artificial intelligence system.

In the detection of anomalies during the regular usage of the surveillance system, the combination is thereby chosen from at least a subset of the surveillance-sensors, which combination is derived according to a machine learned dependence on the contextual information. The contextual information can therein comprise a real world sensor measurement value derived by dedicated context-sensor, derived by an evaluation of specifics of one or more of the surveillance-sensors from the same or from another modality, or derived by an abstracted virtual state model of the building or property in the automated surveillance system, e.g. comprising an electricity state, a lighting state, a heating state, an occupation state, etc.

In other words, it relates to an embodiment of a machine learned combination of multiple sensors of different modalities in an automated surveillance system. The learning therein can be based on the training data which comprises context information that can e.g. result in a classifier which is classifying the surveillance-sensor modalities into different contextual classes. During surveillance, the sensed modalities are then chosen to be evaluated in the learned way, in consideration of the actual on site context. This embodiment thereby learns contexts, where varying types of detectors with different modalities are best suited. For example, with respect to contexts like spatiotemporal segments or clusters, lighting, temperature, etc., an optimal detector and/or classifier combination is learned from the training data for those contexts. Based on this learned context specific optimal detector and/or classifier combination, an automatic detection of states or state patterns and/or a classification of critical states can be derived by the security system, based on the real world surveying data from the plurality of survey sensor—in awareness of a context-condition. There can be at least one dedicated context sensor for deriving information on a physical context-condition of the building or property or of an internal state of the surveillance system.

Besides a binary selection of one or more of the survey sensor to be evaluated, there can also a weighting of the results from the multiple survey sensors which is resulting in a combination according to which a security state is determined. The training results in a classification of a survey sensors usability can thereby depend on the context-condition like an environmental condition, for example by a machine learned classification of a strategy for the evaluation of one or more of the survey sensors based on the content-condition.

According to some aspects it can be learned how and when to interpret a surveillance-sensor in a specific context, like when a certain environmental condition applies, or a spatial context to which a certain classifier has to applied (which classifier might be inappropriate for another context). For example, people are only to be detected on a floor level, whereas open windows or doors are not detected in a floor level plane but are in general substantially vertical. Or it can e.g. be learned that visual images are primarily evaluated under certain lighting conditions, like in a temporal context of daytime or in an environmental context of lights turned on. Another example is that IR-images are primarily used when lights are off, whereas depth images can be used independent from the lighting context. Another example can be the context of an occupation state of a monitored room, e.g. which the surveillance system is aware of by tracking the in and out of people or by people trajectory mappings, etc. By providing such occupation context information in the training data, the system can e.g. learn that e.g. a presence detector or motion sensor can provide useful security information to raise security alarms in case of a room with an "empty" occupation state, whereas its information is not highly useful if the room is occupied by one or more people. The surveillance system can learn such sensor evaluation strategies from the training data and it is not required to manually program and modify complex dependencies for each case and site to reflect complex, large and site specific conditions.

The combination from above can therein be chosen from at least a subset of the surveillance-sensors by a machine learned weighting function for the modalities, in particular wherein the weighting function can comprise weighting factors for the modalities which are depending on the contextual information. An information filter can then derive one or more security states based on the contextually weighted results from each of the multiple surveillance-sensors.

The weighting factors can for example be clustered by a classifier that is machine learned on the training data which comprises the contextual information.

The classifier or detector can therein also be at least partially trained on training data with contextual information, which training data is at least partially synthetically generated and derived form a virtual model, in particular like describe in detail elsewhere in this document. The modalities can therein e.g. at least comprise at least a visual picture modality, an infrared modality and a depth modality. In an embodiment multiple of the modalities from the different sensors can be combined into a single dataset, by which dataset the machine learned system is trained respectively which is then evaluated at runtime of the surveillance system. Those modalities are therein in particular derived by different sensors, which can e.g. be arranged at different locations, with different points of view, with different fields of view, with different resolutions, etc. This combining can therefore especially comprise a (preferably numerically applied) compensation or correction for those differences in point of view, field of view, resolution, etc.—for example to achieve a substantially pixel to pixel accurate matching of the different modalities in the combined data set. In other words, the combining of the different modalities into a single dataset can comprises geometric transformation of the data of at least one of the modalities, which is done in such a way that the combined modalities are referenced to single common coordinate system of the single dataset. In particular, the modalities can be combined with a pixel-to pixel-correspondence of the modalities that is established by numerical transformation of the sensed modality data, e.g. a multi-channel image. For example, a visual RGB-image modality and a depth modality, captured by nearby but separate sensors, can be combined to a Red-Green-Blue-Distance-image (RGBD) or Hue-Value-Distance-image (HVD) as single dataset.

In an exemplary embodiment, the modalities from different sensors can be captured with is an offset in position and/or orientation between sensors and/or the sensors can have different field of view, like in case of a visual image sensor mounted next to a depth sensor, which can result in differing offsets, focal length, distortions in the data captured for the same scene. In a combination of those modalities into one dataset, a pixel-to-pixel correspondence can be established by applying transformation or image processing to one or more of the modalities. For example, a generation of a four channel RGBD image by combining pixel-to-pixel correspondence RGB data from the visual RGB sensor and depth data D from the depth sensor into one image with four channels can thereby be established. In another example, a color conversion if the visual image from RGB to HSV (hue, saturation, value) can be established, which can then be combined with the depth data D to an "image" of three channels, like a HVD (hue, value, depth) "image" by omitting the saturation channel information and replacing it by another modality in form of a depth channel from another sensor—wherein an according transformation of the depth data has to be established to fit with the view of the RBG data. For representation to a human, such a HVD "image" has apparently to be converted to a graspable representation, but an artificial intelligence system or machine learned detector and/or classifier can work directly and efficiently on such HVD-data. The combined RGBD or HVD image can be fed directly into an event detection/classification algorithm, in particular to a convolutional neural network, e.g. for detection and/or recognition of persons, for detection of open doors and/or windows, for detection of fire and/or smoke, for detection of abandoned objects, for recognition of activities, for detection of anomalies like people running, sneaking, creeping, tiptoeing, etc.

The contextual information can at least partially be derived from a first of the surveillance-sensors, in particular wherein the contextual information which is comprised in a weighting of a first modality is at least partially derived from another second modality that is different from the first modality, on which first modality the first surveillance-sensor is operating on.

The contextual information can also be at least partially derived from a specific environmental sensor configured for sensing the context information. The contextual information can also be at least partially derived from an internal, virtual state-space-status of the surveillance system.

The contextual information can for example comprise one or more of:
- a lighting context (like day, night, artificial and natural lights, illumination sensors, brightness and/or contrast of a camera image, etc.),
- a temperature context (like a thermal camera image, a temperature sensor, an inside and/or outside temperature, a heating system state, etc.),
- a temporal context (like a chronometer, a working days and hours calendar, a lunar and/or solar calendar, etc.) and/or
- a vibration or seismic context, an audio context, etc.

The contextual information can therein be partitioned and/or segmented into classes by a training of a machine learned classifier which is configures for filtering the surveillance-sensors evaluation dependent on the contextual information. Therein the results of the evaluation of the different surveillance sensor can be filtered, or the actual evaluation of a surveillance sensor can be deactivated or specifically reconfigured based on the contextual information. For example, by deactivating a sensor-evaluation in a specific context, computation time and energy can be saved.

In an embodiment, also a spatial prior & temporal filtering for data sequences can be applied. For example, in video data, spatiotemporal consistency can be exploited to. For instance, in the detection, the system can restrict the search space for an object based on its previous known location(s) and a motion model. Such restriction is not only usable to reduce the search space, but also to temporally fill in gaps in the detection results due to misdetections, obstructions, lack of coverage, etc. In an embodiment with a mobile data acquisition platform like a robot or a drone, a movement of this platform can also be compensated for, e.g. by using ego motion estimation techniques or the like.

In another embodiment, aspects can be implemented with using an output of one detector and/or classifier from a first surveillance sensor of a first modality as input for an annotator for another second surveillance sensor for the same or another modality. This can be embodied in a fully automated annotation and/or can also comprise annotation by operator feedback. This principle can also be embodied in an augmenting of a training database by information from another detector and/or classifier or from the operator, whereby the detectors and/or classifiers accuracy can be improved over time by supplemental training based on this information—which can thereby be achieved in an at least partially automated process.

For example, to avoid tedious annotations from which to learn detectors and/or classifiers for all modalities, in particular when those annotations are not automated and require manual user-interaction, a training procedure can be started by applying one first detector, preferably one for which pre-trained models are available, like e.g. a state-of-the-art open source RGB-detector or another pre-trained detection and/or classification system. The output of this first detector can then be used to select regions which were detected by this first detector to extract features from other modalities by a second detector, like e.g. from a depth-sensor, an IR-sensor, a point cloud sensor, etc. Besides the region, also a classification information from the first detector can be supplied to the second detector which can be used to train and/or test the second detector. This process can involve at least partially human feedback to filter out possible false positives, but can also be partially or fully automated by a computation system, in particular for detections with sufficiently high detection probabilities. Also, the principles of Generative Adversarial Networks (GANs) can applied, for example embodied as deep neural network architectures comprised of two nets which are pitting one against the other—which pitting is also referred to as being adversarial.

Such a learning system according to this inventive aspect can for example be embodied with using a first annotation-output from a first detector and/or classifier as training input for a second detector and/or classifier of the same or of a different modality. This can provide information of first detection and/or classification of a new instance of a newly detected object to a human supervisor for verification, while handling all subsequent detections of the same instance automatically, in particular in view of a motion model for the object as discussed above. Beside new objects, also objects which are suddenly missed or got lost in a detection or tracking can be provided to a human operator for confirmation or for supervising the training routine. In the training, it is another possibility of this aspect to deliberately insert also false negatives (misdetections) in the training data, which can be done either automatically and/or manually, for example for improving robustness and/or fault tolerance and avoid over-training. Once, based on the results from the first detector additional detectors have been learned for other modalities, those can in turn also be used reversely as annotators to improve the pre-trained models which were used in the first detector, for example in one or more iteration loops, to improve the system in a preferably automated way.

This disclosure also relates to an automated surveillance method for a machine learned detection of an anomalous state of a building or property. In an embodiment the method can comprise at least the steps of:
- deriving multiple surveillance data from at least two surveillance sensors for the building or property, which surveillance sensors are operating in at least two modalities;
- deriving at least one contextual information at the building or property, in particular an environmental information by a dedicated context-sensing means or from one of the surveillance sensors or from an internal state of the surveillance system;
- combining data from one or more of the surveillance sensors for the detection of a critical state with a machine learned automated information filter which is established by a training on training data which comprises the contextual information.

In other words, the surveillance sensor data of different modalities can be classified according to the contextual information in a machine learned automated information filter, for being critical or not and/or with an evaluation of gravity of a state pattern.

In an embodiment, such can comprise training a detector and/or classifier (at least partially) on training data which comprises the contextual information—e.g. in order to achieve a detecting of one or more anomalous states and/or classifying the state or anomaly to be in certain class of anomalies and/or potentially to be critical—which are comprised in at least a portion of the training data. In particular, this can be done with a machine learning of an artificial intelligence unit.

Also comprised can be a deploying of such a detector and/or classifier to a computation unit for analyzing of real world surveillance data from at least two sensors at the building or property. Thereby, a detecting a potential presence of an instance of the anomalous state within the real world surveillance data can be established and/or a classifying of this state to be critical or noncritical, in particular based on the critical or noncritical classification model in which different modalities are weighted according to a real world contextual information derived at the building or property at the time of surveillance. As mentioned, the weighting can be learned by a, in particular supervised, machine learning.

In an embodiment, such can comprise a deriving of a parallel and/or hierarchical evaluation structure for the data from the surveillance sensors, based on the machine learning in a plurality of contexts. An embodiment of a hierarchical evaluation can e.g. be first hierarchical stage of evaluating an image of visual sensor and (in particular only) if this image is dark (e.g. at night) then go to the next hierarchical stage which takes an image with and IR camera which is evaluated instead or additionally. Therein, in particular with a weighting or parameterization of the parallel and/or hierarchical evaluation structure by machine learning of context dependent weighting factors can be established.

The machine learned automated information filter can thereby be configured by machine learning for a contextual information dependent combining of the at least two modalities, in order to derive a detection of an anomalous or critical state.

This aspect can also comprise a method for deriving a machine learned automated surveillance system which can e.g. be embodied in a computation unit of a surveillance system. This deriving can comprise an automatic classifier and/or detector for security issues based on at least two surveillance sensors operating in at least two different sensing modalities. Therein a training of the automatic classifier and/or detector comprises providing training data which at least partially comprises contextual environmental information corresponding to the training data. The training data can in particular be or comprise real world training data from the surveillance sensors. Based on this training data, a combining of the at least two different sensing modalities is machine learned, which combining can at least partially segment the different modalities according to the contextual information.

The combining can e.g. be established by a hierarchical and/or parallel structure for merging the at least two surveillance sensors detections. Therein, the structure and/or a weighting of the different sensing modalities can be derived by the machine learning and being dependent on the contextual information.

Aspects can be embodied as a computer program product comprising program code which is stored on a machine-readable medium, or being embodied by an electromagnetic wave, which is comprising a program code segment, and having computer-executable instructions for performing the steps of the method described herein, in particular for those method steps which comprise computation of data, numerical determinations, scripting, operating an artificial intelligence unit or the artificial intelligence unit itself, respectively a configuration of the artificial intelligence unit, etc.

A sixth aspect is an automatic detection of abnormalities or states, which can also be combined with an assessment and rating of the state for being critical or not. Such abnormalities can be implemented based on information from a mobile patrolling system that is adapted to patrol an area, like a building to be inspected, but also based on information from stationary surveillance equipment, like surveillance cameras, various kinds of intrusion sensors (e.g. for light, noise, shattering, vibrations, thermal images, movements, etc.) authentication terminals, personal tracking equipment, RFID-trackers, distance sensors, light barriers, etc. In particular, a combination of stationary and autonomous surveillance of the area for automatically detecting and reporting events can be implemented, which events can then be classified to derive a critical or uncritical surveillance state. In case of a critical state, an appropriate action can be automatically triggered or proposed to human security personnel. All of which can for example be adapted to the specific environment under surveillance.

In security applications to date, human operators still play a vital role and such automated inspection tasks are quite rare. The automatics are often prone to error, so they can at most assist a human operator, but hardy act autonomously. Be it either a guard who patrols the area or an operator who monitors security cameras, human intelligence has been virtually indispensable in cases where high security risks are present. Automated mobile security systems try to support the human operators via modules that were specifically trained to detect persons, open doors or misplaced packages, etc. If such automated systems are used at all, those modules have to be prepared meticulously. First, a considerable effort is put into data acquisition. The dataset which is used to train an automatic decision maker to differentiate right from wrong has to contain plenty of variations in terms of embodiments of the event, appearance and recording position realized in hundreds or thousands of data samples, for example due to the countless possible surface properties, lighting conditions, partial obstructions, etc.). For security applications, this means an extensive on-site data recording and interactions with the critical elements (such as doors that have to be captured in various stages of openness, etc.). Even if such an effort is taken into account, it is still very challenging for such an autonomous system to achieve a reasonable generalization of an automatic decision maker to objects and events beyond those used for the training on the test site. Generally, only what was seen during the training process can be accurately detected by the deployed model for an automatic detection and/or classification, but it is very challenging or virtually impossible to cover all possible aspects during training. The variations of possible persons, open doors or misplaced packages, etc. e.g. in the case of a warehouse scenario, in particular in possible combinations are too multifaceted, but can be vital for example in detecting a misplaced package in a public area which might be used for a bomb attack.

It is therefore an object of this aspect to provide an improved automated surveillance system. In particular, it is an object to provide such a system that automatically detects states and/or automatically classifies states to be critical or not, in particular also with a low number of false-positives and false-negatives, and which can also handle rarely occurring or singular states.

According to this aspect, an automatic system for detecting security states is provided. This system can at least partially comprise artificial intelligence or machine learning approaches for a detection and or a classification of security states. A vital aspect of the idea is to support the training process of a decision making systems for security applications using synthetically created examples of rare but critical states, in particular for high risk security applications. A state can therein comprise one or more surveillance data sets, optionally in combination with additional information like time, location, etc. In order to accurately detect such critical states, the decision maker or classifier has to be sufficiently trained to detect those. As collection of data of those rare states in sufficient quantities is not only time consuming but sometimes simply impossible, comprises an approach to augment a training data set with artificially generated samples or positive samples that are altered to reflect malicious behavior. Positive samples can therein be samples of no critical states—which are then virtually transformed to artificially generate critical states. Those artificially generated critical states, e.g. comprising open doors or unauthorized building access, can be provided to train a decision maker, for example embodied by an artificial intelligence system, which can e.g. comprise classifiers such as neural networks, support vector machines or other models. The method can furthermore be used to pre-train classifiers and decision layers for multi-modal classifiers—which are then deployed to on-site systems.

For example, an embodiment of a surveillance system for an automated detection of anomalies at a facility, such as a property, building, power plant, industrial plant and so on. The system comprises at least one surveillance sensor adapted to survey at least one or more elements of the facility and for a generation of real world surveillance data comprising information about the facility. It also comprises a computing unit configured for an evaluation of the real world surveillance data and for an automatic detection of states, comprising a machine-learned detector component. Therein, the detector component is at least partially trained on training data, which is at least partially synthetically generated and derived form a virtual model of the facility and/or of at least one of its elements.

For example, an embodiment of a surveillance system for an automated detection of anomalies at a facility. The system comprises at least one surveillance sensor adapted to surveillance of at least one or more elements of the property or building and for a generation of real world surveillance data comprising information about the property or building. It also comprises a computing unit configured for an evaluation of the real world surveillance data and for an automatic classification of states, comprising a machine-learned classifier. Therein, the classifier is at least partially trained on training data which is at least partially synthetically generated and derived form a virtual model.

In another embodiment, both of above embodiments can be combined. For example, with a sensors sensing real word data and an artificial intelligence computation system configured for a detecting of specific states (such as e.g. opened/closed doors, presence/absence of people, etc.), for example by applying person detection, object detection, trajectory detection, or another event detection algorithm, for example applied to image data from a camera. According to this aspect, the detection is therein at least partially trained on syntactically generated events which are at least partially derived from a virtual model. There is also an artificial intelligence computation system configured for a classifying of states based on one or more of the states, which states can in particular be classified with respect to being critical or not. Therein the states can also comprise data from multiple sites or a history of states, but also on contextual data like illumination, room temperature, time, etc. According to this aspect, the artificial intelligence computation system is therein at least partially trained on training data which is synthetically generated based on a virtual model by which a huge amount of events and states is substantially automatically simulated, preferably in a wide variety of options, environmental conditions, etc. On a critical states an alarm or automatic reaction can be triggered, e.g. by rule based or expert system.

An anomaly to be detected as an event in the surveillance system can therein be simulated in the virtual model, wherein multiple instances of training data are generated with a variation of at least one environmental parameter in the virtual model.

The surveillance system can comprise an automatic classification unit, comprising a machine learned classifier configured to classify at least one of the events into different states, in particular to classify at least a critical or a non-critical state information of the property or building. Therein, the machine learned classifier is at least partially trained on training data which is at least partially synthetically generated and derived from the virtual model by which multiple instances of the states are simulated. In particular, the classifier can be trained on a simulation of a plurality of virtual scenes of critical and/or noncritical states which are provided in the virtual model. The training data for the classifier can e.g. comprise a state information of the building, property or building element, which comprises at least one synthesized state together with a supplementary context information comprising at least a time information, a location information, etc. In an embodiment, the training data for the classifier can comprise a sequence of states or a pattern of states, which is virtually synthesized by the virtual model and used to train the classifier, in particular wherein the sequence of states or a pattern of states is defined to be critical or noncritical.

In other words, the aspect relates to a surveillance system for an automated detection of anomalies at a property or building, which anomalies can e.g. be comprised in an objects state of an object such as the property or building. The surveillance system therein comprises at least one survey sensor adapted for surveillance of at least one or more portions or building elements of the property or building and for a generation of real world surveying data comprising information about the property or building, preferably but not necessarily in a continuous or quasi continuous manner. It further comprises a computing unit designed for an evaluation of the surveying data and an automatic detection and/or classification of anomalies, comprises a machine-learned classifier and/or detector, which can be embodied as a dedicated classifier unit and/or detector unit. Such a computing unit can be embodied as a central computing unit or as distributed system of multiple units. According to this aspect, the classifier or detector is therein at least partially trained on data that is at least partially synthetically generated and derived form a virtual model, preferably substantially automatically by a computation unit.

For example, such can comprise a numerical rendering of a digital representation or model of an event or abnormality. In particular, the computation unit can therein provide a classification and evaluation algorithm configured to classify and evaluate a detected state, wherein a normality-anomaly classification model comprises at least two classes of states, at least one class being a normality-class denoting a classified state as "normal" and at least another class being an anomaly-class denoting a classified state as "anomalous", as described in detail elsewhere. Preferably, meta information regarding the class of states within the training data is also comprised in the partially synthetically generated training data when it is derived from the virtual model.

Therein, the synthetically generated training data can e.g. be derived by numerically rendering virtual images from the virtual model.

The synthetically generated training data can therein comprise a plurality of instances of training data, derived with variations of parameters of the virtual model and/or with variations of parameters of the generating. In particular, those variations can reflect environmental parameters like varying illumination and representation parameters like varying field of view, etc. The virtual model can therein comprise a digital 3D-model of at least a portion or object of the property or building and/or a physical model of the property or building or of an object or portion thereof. For example, such a portion can comprise instances of specific objects of surveillance or can be embodied as such an object, like e.g. a door, a window, a corridor, a staircase, a safe, a cash-desk, a keyboard, a ventilation shaft, a gutter, a manhole, a gate, etc.

The surveillance sensor can e.g. comprise at least one camera providing a digital picture as real world surveying data, which camera can for example be embodied as a visual 2D picture camera, a range-image camera, an infrared-camera, or some combination of those.

As mentioned, the surveillance sensor can in particular be embodied in a mobile surveillance robot for surveying of the property or building or embodied with stationary surveillance equipment located at the property or building, or in a combination of both.

Therein the synthetic training data can partially also comprise some real word pictures. The synthetic training data can also comprise amended real word pictures which are augmented by synthetically generated numerically rendered virtual security alerts derived from the virtual model. For example, a real world picture can be augmented to virtually depict a security related anomaly of an object, like something broken, etc.

The training data can especially at least partially comprise real world surveillance data from the sensors, which can be at least partially augmented by virtual data that is synthetically generated by a computer.

In an embodiment, the classifier can also be embodied as a pre-trained generic classifier which had been trained at least partially on synthetic training data and deployed to the automated security system, which is then post-trained by the real world surveying data of the property or building, for example in a commissioning phase and/or during use of the automated security system.

Some aspects also comprise a surveillance method for detection of an anomalous event of a facility consisting of facility elements in an automated security system.

Therein one step is a providing of a virtual model of at least one of the facility elements. Based thereupon a deriving of at least one synthetically generated training data from the virtual model is established by a computation unit and according software. The result is used for a training of a detector and/or classifier which is done at least partially based on the synthetically generated training data, which detector and/or classifier can then be used for detecting of states and/or classifying of an anomalous state which is comprised in at least a portion of the synthetically generated training data. Such can also be described as a machine learning of an artificial intelligence unit, at least partially based on the virtually generated training data.

By deploying the detector and/or classifier to a computation unit for analyzing real world surveillance data from at least one sensor at the building or property, a detecting of a potential presence of an instance of an anomalous state within the real world surveying data can be established, in particular combined with applying a normality/anomaly classification model as described elsewhere.

The deriving of the at least one synthetically generated training data can therein comprise a plurality of variation of the virtual model, in particular a variation of parameters of its building elements and/or of the representation of its building elements.

Specifically, some aspects therein concern a training method for a computation unit of a surveillance system according to this application, which comprises an automatic classifier and/or detector for security issues based on at least one survey sensor. Therein, the training comprises a synthetic generating of virtual training data by virtually deriving the training data from a virtual model, and a training of a classifier and/or detector which is done at least partially based on this training data which is at least partially synthetically generated. The result of the training, e.g. a trained classifier and/or detector or their configuration data, can then be used on real world data from the survey sensor for detecting security alerts.

In the example of one possible embodiment with surveillance cameras, the virtual model can be a 3D-model of the object targeted by the surveillance, the synthetically generated training data can comprise numerically rendered images derived from the 3D-model, and the real world data from the survey sensor comprises a real world picture of a site from the surveillance camera.

Some aspects can therein in particular be embodied as a computer program product comprising program code which is stored on a machine-readable medium, or being embodied by an electromagnetic wave, which is comprising a program code segment, and having computer-executable instructions for performing the steps of the method described above, in particular those method steps which comprise computation of data, numerical determinations and rendering, scripting, training of an machine learning system or of an artificial intelligence unit, running an machine learned system or an artificial intelligence unit, etc.

BRIEF DESCRIPTION OF THE DRAWINGS

The invention in the following will be described in detail by referring to exemplary embodiments that are accompanied by figures, in which:

FIGS. 17a-b show a first exemplary embodiment of a combined ground-aerial sensor platform system;

FIGS. 19a-c show a second exemplary embodiment of a combined ground-aerial sensor platform system;

FIG. 20 illustrates a patrol of a combined ground-aerial sensor platform system having two ground vehicles;

FIG. 30 shows an exemplary embodiment of a warehouse to be surveyed in different contexts;

FIGS. 31a-c illustrate examples of different modalities in real word surveillance data from the warehouse of FIG. 1;

FIG. 33 shows a second example of a context based machine learning result or structure for a surveillance system;

FIGS. 34a-c are illustrating an example of a context learning surveillance system with multiple modalities;

FIGS. 40a-b illustrate a virtual model of a patrol of an autonomous surveillance vehicle and IR-view of a synthetically generated intruder;

FIG. 41 shows an example of a floor plan with a surveillance of trajectories of a person;

FIG. 42 shows an exemplary embodiment of a virtual model and rendering of a security event, which can also be augmented to a real world picture; and FIGS. 43a-b show an exemplary embodiment of a synthetic training data generation.

DETAILED DESCRIPTION

The diagrams of the figures should not be considered as being drawn to scale. Where appropriate, the same reference signs are used for the same features or for features with similar functionalities. Different indices to reference signs are used to differentiate between different embodiments of a feature which are exemplary shown. The terms "substantially" is used to express that a feature can, but in general is not required to be realized exactly up to 100%, but only in such a way that a similar or equal technical effect can be achieved. In particular slight deviation, due to technology, manufacturing, constructional considerations, etc. can occur, while still within the meaning of the scope. The term "at least partially" subsumes embodiments, in which the thereby declared following feature is used exclusively for its purpose in the sense of the application (in the meaning of "fully")—as well as embodiments, in which the thereby declared following feature is comprised but can be embodied conjoint with other options to derive a similar or equal purpose in the sense of the application (in the meaning of comprising or partially).

FIGS. 1 to 8 relate to a facility surveillance system with a plurality of survey sensors and "critical-noncritical" classification of recorded state patterns.

Figure 1:
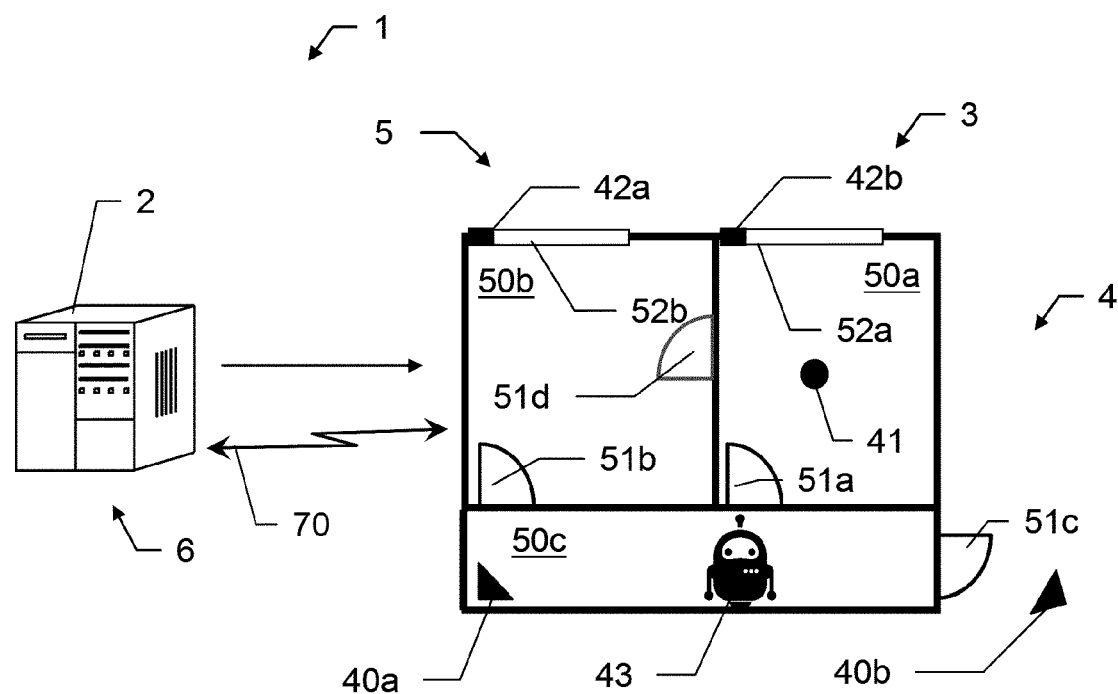
FIG. 1 shows a first exemplary embodiment of a building surveillance system 1.

In FIG. 1, a first exemplary embodiment of a facility surveillance system 1 is depicted.

The system 1 comprises a central computing unit 2. The central computing unit 2 is a single server computer 2—as shown- or for instance a cluster of servers, a cloud or similar means. The central computing unit 2 provides a model 3 of the building, e.g. an office building or a warehouse, to be surveyed; in the example the building consists of one floor with three rooms 50a-50c and the building model 3 is illustrated as a topological 2D-representation. The facility model 3 provides relationships of the facility elements, such as topological relationship of room 50a to room 50b, logical relationship of room 50c connecting door 51c to room 50b or functional relationship of door 51a giving access to room 50a (50a-c, 51a-d, 52a, 52b. Preferably, the building model 3 is embodied as a building information model (BIM).

The system 1 comprises further a plurality or multitude of surveillance sensors 4 which are adapted for surveillance of a plurality of elements 5 of the building. In the example, the building elements 5 and the surveillance sensors 4 are for reasons of simplicity illustrated within the 2D-representation of the building model 3. Such building elements 5 are for example the rooms 50a-50c, the doors 51a-51d, the windows 52a and 52b, but can comprise for example also building installations such as electric (light) installations or workstations or computer networks. The surveillance sensors 4 are distributed at or inside the building and comprise for example cameras such as cameras 40a, 40b, in particular adapted for person recognition or identifying, Range-Image-cameras, laser scanners, motion, light, infrared, thermal or smoke detectors such as detector 41, ampere or volt meters (for example for detecting if a light source or another electric installation is switched on or off or for monitoring the overall power consumption of the building), contact sensors such as a beam interruption detector or magnetic contact sensor (such as sensors 42a, 42b adapted to detect if windows 52a, 52b are open or closed), thermometers, hygrometers, key readers and input means allowing an input by an operator. A survey sensor 4 can be installed in the building to work autonomously or be operated by an operator. A building element 5 can be surveyed by a single surveillance sensor 4 or by more than one surveillance sensor 4, e.g. with respect to different properties of the building element 5 (for example by two cameras with different viewing angles or by one camera and an IR-sensor). The surveillance data of the surveillance sensors 4 comprises for example color images, depth images, thermal images, video, sound, point clouds, signals from door sensors, elevator or key readers and is transmitted to the central computing unit 2 by communication means (symbolized by arrow 70), for example per cable and/or wireless and/or via internet. The surveillance data is assigned to the (sub-)object of the building model corresponding to the respective building element 5, and stored in a database of the central computing unit 2.

The surveillance sensors 4 are installed at fixed positions and/or are mobile as for example a surveillance drone or the surveillance robot 43 as depicted, which serves as a mobile station for several of the surveillance sensor types mentioned above (e.g. camera, microphone, IR-sensor etc). The location or position of each surveillance sensors 4 resp. the location of the building element 5 the sensor 4 surveys is known by the central computing unit 2 wherefore in case of a mobile surveillance sensor 43 the surveillance sensor 4 transmits its location data to the central computing unit 2 by the communication means 5. In the present example, the location of the surveillance sensors 4 is integrated or put into the building model 3.

The system 1 further comprises state derivation means 6 for derivation of states at or within the building, e.g. if a person is present and/or light switched on or off in room 50*a* at time T1, the door 51*c* is open at time T2 and closed at time T3, etc. The state derivation means 6 can be integrated in the surveillance sensors 4, for example the ones embodied as contact sensors 42*a,b* or the surveillance robot 43, which detect e.g. a motion as an event on itself. In the present example, the state verifier 6 is integrated in the central computing unit 2, analysing the stream of surveillance data for example of a camera 40 and detecting thereof (significant) properties or changes in the video or image stream as states, particularly detecting such a state as a person in a building element (e.g. one of the rooms 50*a-c*) or an object like a suitcase or parcel introduced into room 50*c* and thus in the image or video of the camera 40*a* surveying the room 50*c*. As another example, a surveillance sensor 4 is situated at or integrated in a light switch and the state investigator 6 detect if light is (switched) on or off, controlling the light (or electric current) of the building element "room" or "light switch". As the examples show, a state represents for instance at least one physical property of a building element 5 such as the temperature of a room 50*a-c* or orientation/position of a window 52*a,b* or a door 51*a-e* as well as at least one property associated with a building element 5 for instance in the form of a change of its environment or content, e.g. a person leaving or entering a building element "room 50*a*". Instead of handling specific states, the system can also manage unspecific states which are just indicating whether a building element 5 is in a normal or abnormal state. The state can be "semantic", e.g. person detected, door-open, etc. or also refer to at least one simple change in the data, e.g. a significant difference between a point cloud or an image of a sub-object acquired some hours ago with a point cloud or image acquired now. The states can be structured hierarchically, e.g. a person detected in a corridor can stand still, walk, run, crawl, etc, describing for example instead of an even "Person detected" "Running person detected", "Walking person detected", etc.

States are combined or grouped together, considering the topological and/or logical and/or functional relationships or links of the building elements. Such combined states form state pattern. A state pattern may be formed from states at different times of one and the same building element, e.g. the state of door 51*c* at time T1, T2 and T3. Alternatively or additionally, a state pattern is formed by grouping or recording states of at least two building elements, whereby the states are derived from surveillance data generated at the same time or at different times. For example a state pattern is the state of window 52*a* combined with the state of the light in room 50*a* at one time T1, window 52*a* and room 50*a* are topologically related. As another example of a state pattern, the state of door 51*c* "open(ed)" is linked to the state of the light in room 50*c* ("on" or "off" resp. "turned on" or "not") and the state "open(ed)" or "closed" of one or both doors 51*a*, 51*b*, as these three building elements 51*c*, 50*c* and 51*a,b* are in topological relationship as well as in a functional/logical relationship as a person entering door 51*c* will (normally) turn on the light in room 50*c* and then also open one of the doors 51*a,b*. The state pattern thereby has at least one time stamp, e.g. the time of one of its underlying states or the time of beginning and/or end of the state sequence.

The central computing unit 2 further provides a critical-noncritical classification model and a classification algorithm for classifying the detected state pattern with respect to criticality of state patterns or state sequences to answer the question if a recorded state pattern is to be considered as critical or not with respect to safety considerations. The criticality-classification is thereby based on the at least one topological and/or logical and/or functional relationship and the at least one time stamp of the respective state pattern.

To give a very simple example, if door 51*c* is opened and no person is subsequently (or was previously) seen by camera 40*a* in room 50*c*, this pattern of state "door 51*c* open" and state "no person in room 50*c*" (or: "no person in room 50*c* near door 51*c*") is classified as critical as—according to the logical relationship of room 50*c* and door 51*c*-a person should enter (or leave) room 50*c* when opening door 51*c*. An example a little more complex is that only then a state pattern comprising the state "door 51*c*" open is assigned to "critical" if none of the two cameras 40*a* and 40*b* before or after the detection of open(ed) door 51*c* detect a person. In other words, there is a higher "hurdle" than in the previous example as the state "no-person detected/present" by only one camera 40*a* (40*b*) is still classified as noncritical, and only the "verification" of "no person" by the second camera 40*b* (40*a*) results in classification as "critical". The first example will result in more assignments as "critical", with the risk of more false or unnecessary classifications and respective alarms, the second example with a more elaborate underlying state pattern is more complex but more robust.

The criticality classification using state pattern is further exemplified with reference to the following figures.

FIGS. 2*a-d* show an example of classifications. All three figures show classification models 7 embodied as an n-dimensional feature-space. For reasons of simplicity, the feature-space is a 2-dimensional state-space, however, state-spaces of higher dimensions are preferred. States patterns are represented by n-dimensional vectors within the feature-space.

Figure 2A:
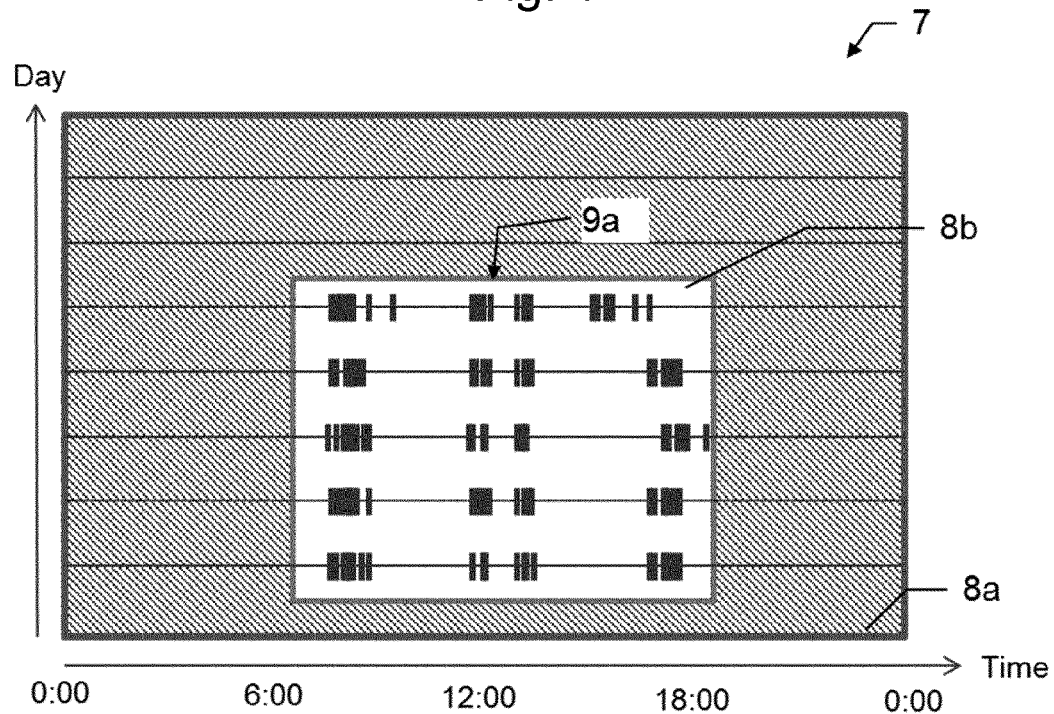
FIG. 2*a-d* illustrate an example of a classification and evaluation.

FIG. 2*a* shows a normality-anomaly classification model 7 as provided by the central computing unit with two state pattern classes 8*b* and 8*a*. The first class 8*b* is a normality class for state pattern classified as "normal" and the second class 8a is for events classified as "anomalous" or "abnormal". From the start, the two classes are predefined, for example as shown based on state patterns 9a is illustrated as a small line for reasons of readability) of states according to a database with stored or pre-defined states or entered by a human operator or according to a planned timetable, referring to planned activities in the surveyed building. Alternatively, the central computing unit does not provide a predefined classification model but is designed to establish a classification model based on detected events without using a predefined one. In the example, state patterns 9a are at least primarily classified with respect to day and time. I.e. a state pattern is recorded with day and time of occurrence. In addition, topological information may be included.

Figure 2B:
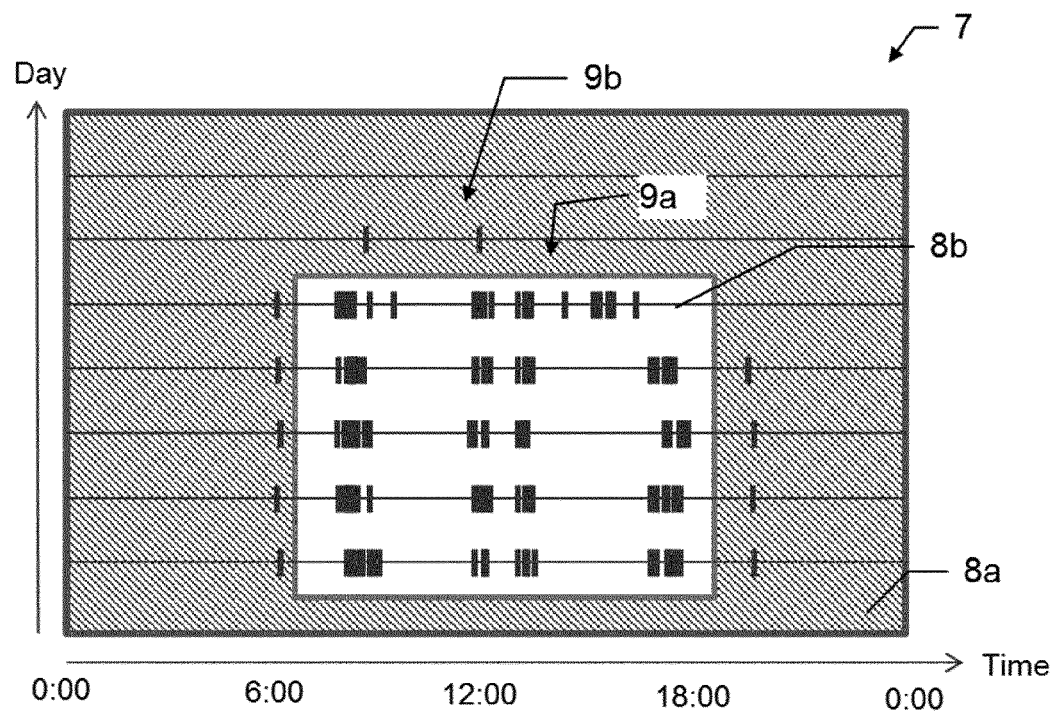

In FIG. 2b, further state patterns 9b are recorded with respect to day and time, and inserted in the 2D-feature-space. In FIG. 2b, the state patterns 9b are not yet (finally) classified with respect to normality, as the computing unit is in a learning phase. The classification model 7 resp. an underlying classification algorithm are preferably trained resp. updated by machine learning algorithms, e.g. Support Vector Machines, Random Forests, Topic Models or (Deep) Neural Networks.

Figure 2C:
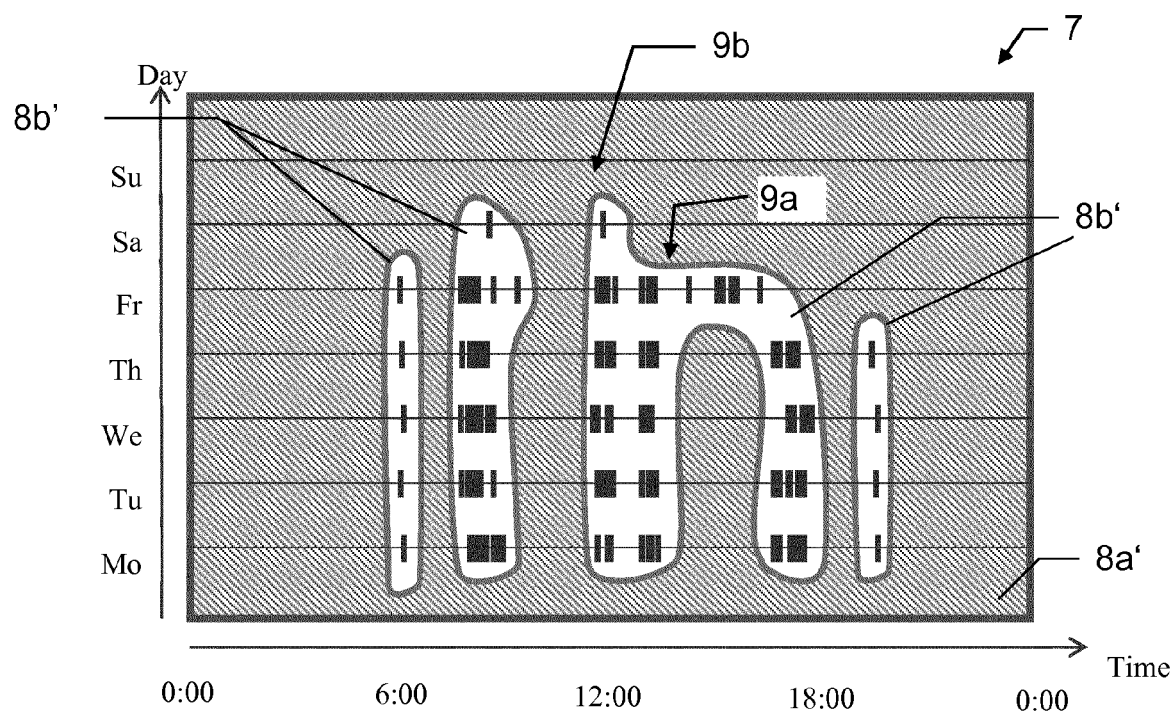

In FIG. 2c, the final normality-anomaly classification model at the end of the training phase is illustrated. Compared with the starting normality-anomaly classification model, the "normal" and "anomalous" classes have been refined to classes 8a' and 8b'. The computing unit has e.g. learned, that an occurrence of a state pattern 9a/9b at 6:00 is "normal" (except for Saturday and Sunday) as well as at some times on Saturday. On the other hand, on Monday to Thursday, a recording of respective state pattern at some time in the afternoon, previously classified as "normal" in the starting classification model, would now be classified as "anomalous".

Figure 2D:
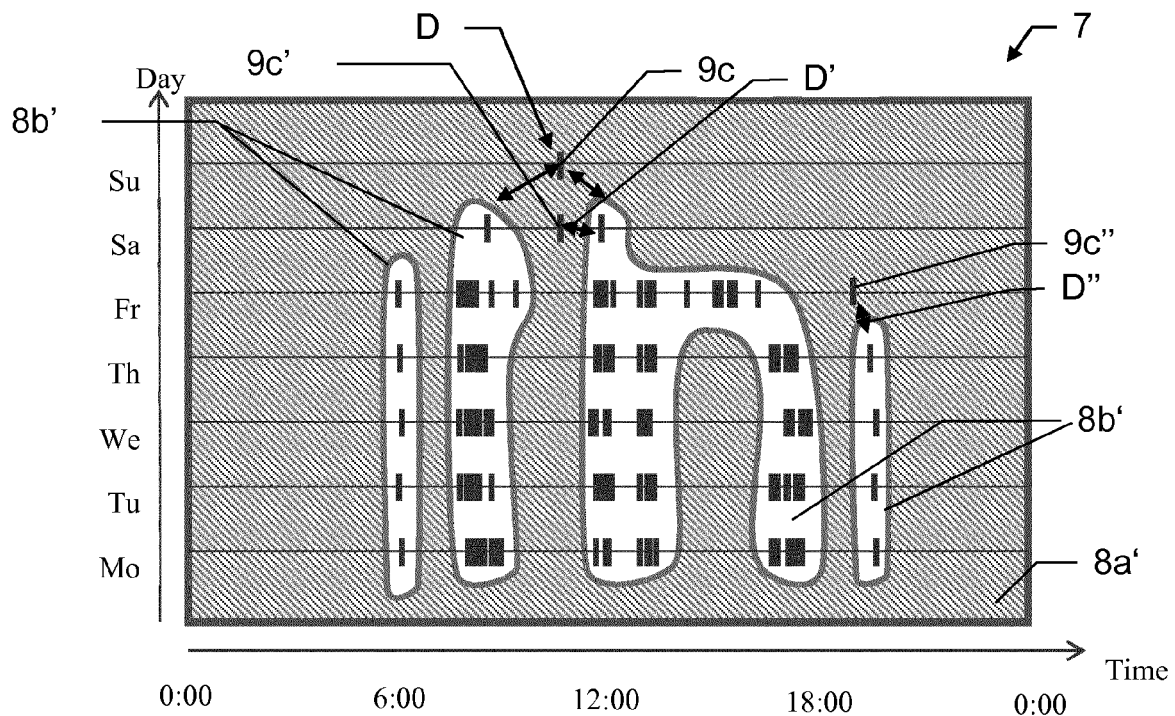

FIG. 2d shows the final step of classification with respect to criticality of state pattern. The state pattern assigned to a "normal" class in the previous normality-anomaly classification are classified as "noncritical". The recorded anomalous state pattern 9c, 9c', 9c" have been are classified as "anomalous" states according to their properties lying outside the "normal"-classes. Now the central computing unit evaluates how grave the occurrence of these state pattern 9c, 9c', 9c" is, hence if they are "critical" or not with respect to security aspects of the surveyed building. For the evaluation of the criticality, the degree D, D', D" of the deviation of a respective state pattern 9c, 9c', 9c" from the "normality"-class 8b' is determined as basis for evaluation.

In the example, the degree of deviation D' and D", considering the features—and therewith topological and/or logical and/or functional relationships provided by the facility model—of the state pattern 9c' and 9c" is low, in this simplified example expressed by short distance/arrows to the (border of) "normality"-class 8b'. Thus, these two events 9c, 9c" are considered by the computing unit according to the critical-noncritical classification model relying on degree of deviation as "non-critical".

On the other hand, the degree D of deviation from the normality-class 8b' of the state pattern 9c is determined as high or significant. As the divergence D is considered relevant, i.e. falling into a "critical" class of the criticality classification model, the state pattern 9c is classified as "critical".

Optionally, the system then reacts to the detected "critical" event, e.g. by giving out a user alert or notification, preferably with instructions or options for reaction and/or embedded in a 3D-visualization of the building model.

Thus, the surveillance system first determines if a surveilled state pattern as a potentially security relevant state is "anomalous" (not a normal state pattern) and then determines if such an "anomaly" has to be seen as "critical" or not. This procedure with criticality classification including a normality classification provides an enhanced security system, enabling a more reliable and robust evaluation of building states, e.g. reducing false positive alerts.

As said, the classifications are based not simply on one single states/changes or alteration of a building element 5 but on a sequence and/or pattern of states of one or multiple building elements 5 (cf. FIG. 1). Said otherwise, the system 1 is adapted to interpret at least two survey data from one survey sensor 4 at two different times or two survey sensors 4 at the same or at two subsequent times. As a simple example, a state pattern represents the sequence "door 51a opened" and "window 52a closed", using the survey data of both the camera 40a and the contact sensor 42a,b (cf. FIG. 1). For the detection of such sequences and/or pattern of states, algorithms like Hidden Markov Models (HMMs) or Recurrent Neural Networks (RNNs) or Conditional Random Fields (CRF) can be applied as will be further outlined below.

This sophisticated approach of using state patterns representing related sequences and/or pattern of building element conditions has the advantage that the greater the complexity or the number of parameters/features/dimensions of a state pattern is, the more robust is the evaluation of criticality, e.g. the great number of parameters a state pattern possesses is advantageous for determining a degree of deviation D, D', D" from the "normality"-class as criterion for criticality.

In the preferred case of state patterns relating to two or more building elements, the gravity evaluation considers topological and/or functional and/or logical relationships of these building elements, thus even more test criterions for "critical" or not of a state pattern are available, resulting in an even broader evaluation basis. This is further outlined with respect to the following FIG. 3.

Figure 3:
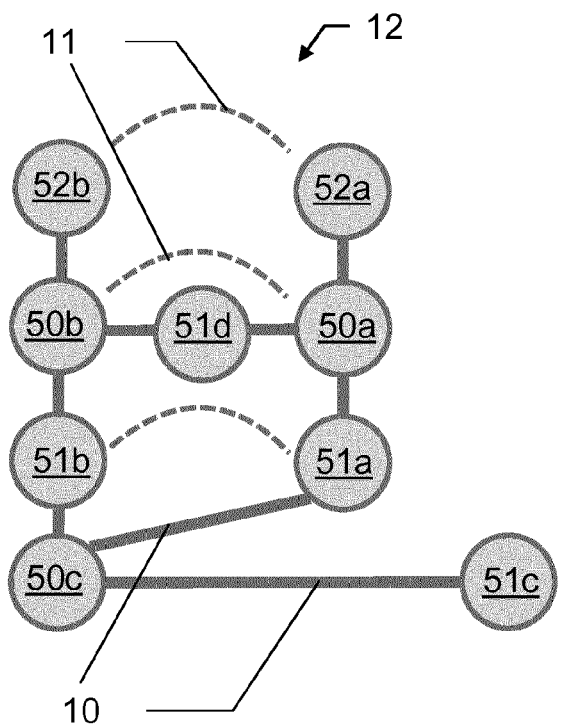
FIG. 3 shows a topological or logical representation of a building model.

FIG. 3 shows a topological or logical representation 12 of the building as part of the building model, in form of a graph. There are dashed lines 11 indicating a neighborhood relationship, i.e. a dashed line between doors 51a and 51b indicates that door 51a is next to 51b. The solid lines 10 represent connections, i.e. a person could follow these edges to go from one room 50a-50c to another. According to these logical or topological relations, if—as an exemplary procedure—a person would like to go at some time at night into room 50a and open the window 52a from outside the building, he would enter the building through the entrance door 51c, activate the light in room 50c and walk along the room (corridor) 50c, through door 51a, activate the light in room 50a and open the window 52a. This flow of connected actions is then expressed as a state pattern, detected using the surveillance data of cameras 40a,b, light detector 41 and contact sensor 42a at window 52a. As can be seen, not all of the actions or building elements need to be recognised/surveyed by the surveillance system to form a state sequence representative of and indicating the underlying procedure as described above.

Any criticality of state patterns and/or sequences and thus an critical overall state of the building can be detected with a greater robustness compared to "single" states. As an example, it is assumed that the above described sequence serves as basis for a criticality class. Now if at night only the state "window 52a opened" would be regarded, this would according to a simple surveillance system/model result in classification as "critical" as opening a window at night often indicates an intruder such as a thief. Instead, the state "window 52a opened" is packed into a chain of surveyed incidents, grouped together as an state pattern to be classified and evaluated. If an state pattern similar to the flow of actions described above is detected, than the recorded state pattern, comprising the state "window 52a opened", is classified as "non-critical", even if it might be classified in an optional normality-classification model as "anomalous".

If any significant deviation is evaluated, for example window 52a and door 51a are opened, but no light is detected by light detector 41, than there is a high degree of devation from "normal" and the detected pattern is not only classified as "anomalous" but "critical", too (as can be seen from this example, a state pattern may also comprise a zero element such as "no light detected" or no change where a change normally would be surveyed resp. is to be normally expected in view of known event sequences and/or patterns). This means not every "anomalous" state pattern will be classified as "critical". The other way round, every state pattern classified as "normal" might be classified as "non-critical", as some state pattern might be detected regularly but nevertheless impose risk to the building. Criticality can be tested without considering normality-anomaly or considering normalitiy-anomaly with further making critical-non-critical distinction in between these classes.

The classification is effected considering the topological or logical links as provided by the model 12 as an additional parameter or feature, too. Any state relating to at least two building elements 50a-52b is evaluated in that it is checked if the relation fits to the known relationsships between these building elements 50a-52b or not. Thus, the classification becomes even more reliable.

Within even more sophisticated approaches, not only a time stamp of the state pattern resp. a time stamp associated with one of the underlying state, but also the points of time of the single happenings constituting a state pattern are considered. For example, the time interval between "door 51c opened" and "door 51a opened" is determined and it is evaluated to what degree this time interval of a detected pattern deviates from previously measured time intervals or not and/or might be a criterion for criticality in itself, e.g. when the time intervall depasses a certain time limit. Such a consideration of a time intervals enhances the probability of a rightful classification as "critical".

As another example, a typical pattern might be created by a cleaning person, since he is cleaning one room after the other. It can be expected that—in case the rooms 51a, 51b have almost the same size—the cleaning of the rooms 51a, 51b takes more or less the same time, which we call CT. Hence, a sequence acquired with door sensors only could look as follows: 51a (door open)—[CT later] 51a (door closed), 51d (door open)—51d (door closed)—[CT later] 51b (door opened), etc. Instead of a door sensor system, the mobile security robot 43 (cf. FIG. 1) could patrol along the corridor 50c detecting persons or objects or open/closed doors. The patrol of the robot 43 could lead to the following state pattern, e.g. when patrolling from the entrance to the end of the corridor 50c at the time when the cleaning person is in room 50a: 51c (door closed)—51a (door open)—[moving into room 50a] 50a (person detected) [continue patrol, moving out of room 50a]-51b (door closed). The idea is to combine all the detections from different sensor systems to generate such a state sequence, e.g. to combine the input of the door sensors with the input of the mobile surveillance robot 43.

Moreover, in addition to person detection, other useful information can be derived from computer vision and machine learning algorithms, e.g. person recognition, tracking, and re-identification, which can be leveraged for instance to extract trajectories through person tracking (e.g. in the corridor 50c monitored by a surveillance camera 40a), then classify and evaluate these trajectories as normal vs. abnormal. As another option, recognition of a person or a category of persons e.g. using a surveillance camera 40b for identifying cleaning staff who have authorized access to a building in the evening and who can be recognized from their colored uniforms or using high resolution cameras, for performing biometric person recognition from facial and/or iris features can be implemented.

Also, an option is re-identification of a person appearing across a network of surveillance cameras 40a, 40b, e.g. a person is detected entering by surveillance camera 40b. A few moments later, a person is detected leaving the room 50a by the camera 40a. Re-identification can help in determining whether it is the same person or not, and thus if the room is still occupied or not or a person is detected and tracked in corridor 50c, an appearance model for that person is learned from these data, a person is detected and tracked outside the building at door 51c, the re-identification tries to match the appearance descriptors and estimates whether it is the same person seen in corridor 50c previously.

Moreover, state pattern can also be detected including by monitoring the power consumption as previously mentioned, as turning on the light or a computer workstation in a room 50a-50c leaves a fingerprint in the overall power consumption of the building. Although, this survey data cannot be assigned to a specific room 50a-50c directly, an assignment can be possible in combination with other survey data, e.g. it is detected that a person enters room 50b and immediately after that a small increase of the power consumption is detected. This indicates that the person in room 50b has switched on the light or a workstation. A person entering a room 50a-50c during night and not switching on the light could indicate that the person might be an intruder, therefore such a state has a high probability to be classified as "anomalous" and "critical".

Figure 4:
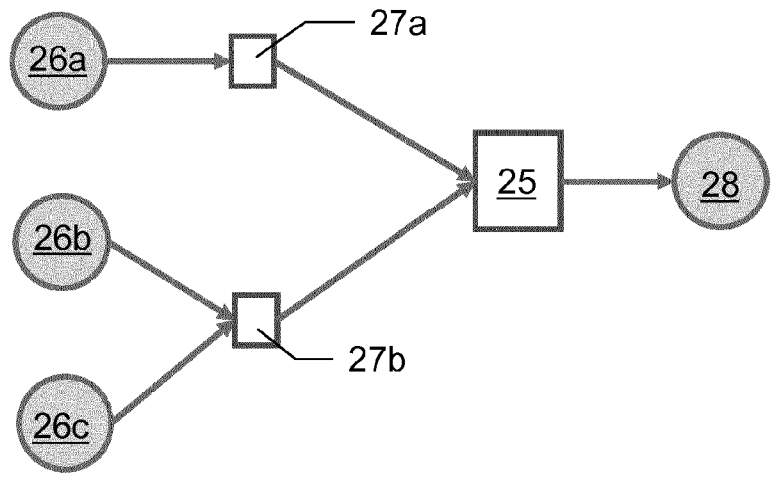
FIG. 4 illustrates another example of a classification and evaluation.

FIG. 4 shows an example of classification of a sequence and/or pattern of states of one or multiple building elements. From surveillance data 26a of a first survey sensor, e.g. an image from a surveillance camera 40a (cf. FIG. 1), a first state 27a is determined, e.g. "person detected". From surveillance data 26b and 26c of two different sensors, e.g. a color image and a depth image captured from mobile security robot 43, and/or from one sensor at different times (see also description relating to FIG. 6 below) a second change or state 27b of building element is derived, e.g. "door 51a open". Both states 27a and 27b are fed into classification model 25. The outputted classification result 28 of the classification model 25 indicates the overall state of the surveillance object, evalutated e.g. with probabilities of 80% "uncritical"-20% "critical".

Figure 5:
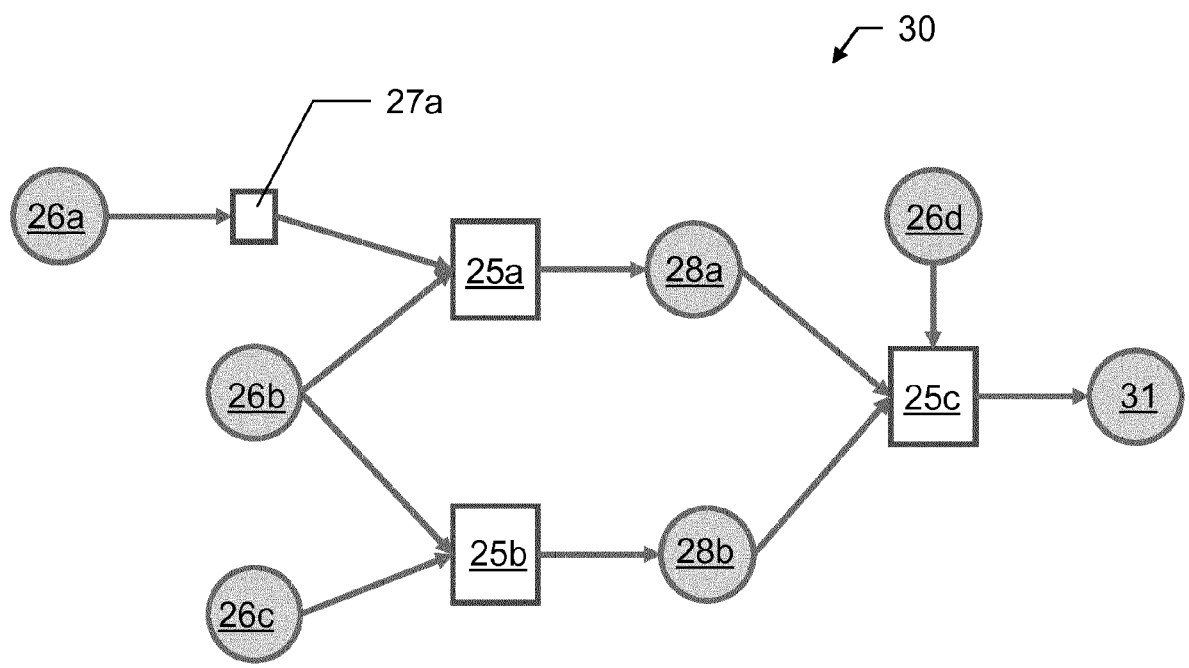
FIG. 5 illustrates another example of a classification and evaluation.

In FIG. 5, a more complex example of classification with classification model 30 of a sequence and/or pattern of states of one or multiple building elements is shown. From surveillance data 26a of a first building element, e.g. a door, an installation, a corridor, etc, a state 27a is derived. This state 27a is together with data 26b input of classification sub-model 25a which delivers as output 28a of the sub-model 25a a state of a first building element. Data 26b and data 26c (e.g. survey data and/or data from a database), relating to a second building element, are fed into sub-model 25b to determine a state 25c of the second building element 2. The states 28a and 28b of both building elements as well as additional surveillance or database data 26d are input for classification sub-model 25c which classifies and evaluates inputs 28a and 28b and finally outputs the classified state pattern 31—"critical" or "non-critical"—of the surveillance object.

Figure 6:
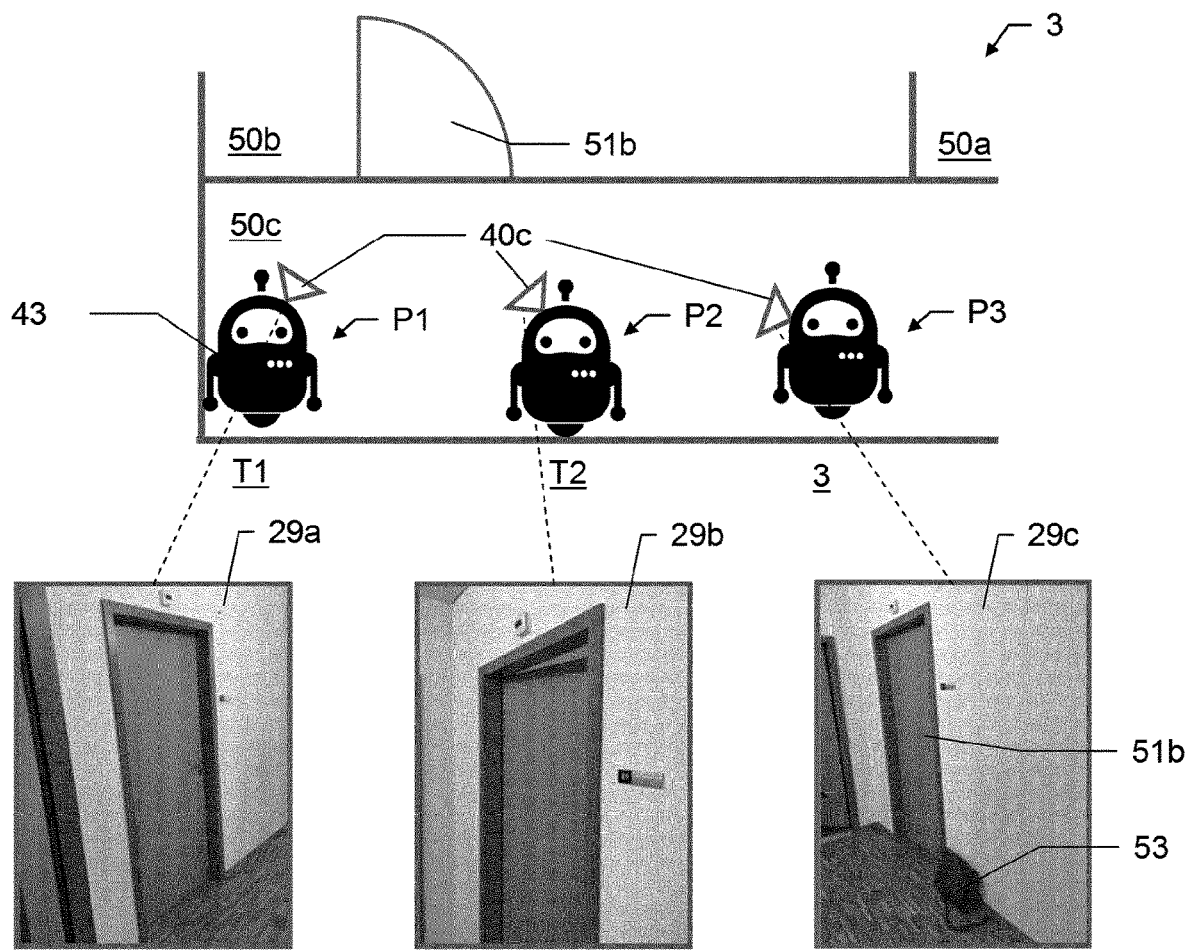
FIG. 6 shows an example for state detection.

In FIG. 6, part of the building model 3 with part of rooms 50a-50c and door 51b is shown together with the mobile survey robot 43, whereby the model also illustrates three different positions P1-P3 of the survey robot 43, representing its position within the building (resp. corridor 50c) at three different times T1, T2, T3. Also shown is a surveillance camera 40c, being one of the surveillance sensors of the robot 43. At each time T1-T3, the camera 40 is directed at the door 51b and takes a first image 29a at time T1, a second image 29b at time T2 and a third image 29c at time T3.

Image processing of images 29a and 29b by the state derivation means (of the robot 43 and/or the central computing unit) reveals that at time T1, door 51b is closed whereas at time T2 door 51b is open, thus the state (pattern) "door 51b open(ed)" is detected and can be classified and evaluated resp. fed into a classification model as described with respect to FIG. 4 above.

State detection with respect to images 29a and 29c exposes the state "bag placed next to door 51b (in between the times T1 and T3)". In a simple surveillance system wherein only this single state is classified, the detection of the bag 53 most probably results in classification as "critical" and giving out an alert. However, the bag 53 might not impose any risk to the building. In the more sophistaced approach wherein this detection is part of a pattern of detections or a state pattern, the classification can be evaluated with a much higher level of trustworthiness, e.g. as in that a lot of survey/image data of door 51b is collected over time (e.g. a whole day, a week or month), enabling the classification algorithm to learn—for instance by machine learning algorithms—the normal and thus uncritical state pattern associated with an object 51b like door 51b.

If for example a bag 53 or a particular bag (recognized with sufficiently detailed image processing) is repeatedly present, then its detection could be classified as "normal". Or, if as part of the corresponding state pattern, it is surveyed that the bag 53 is placed at a not normal time, but by a person recognized as building staff, a classificiation as "anomalous" but "non-critical" will happen.

If however a bag 53 is placed repeatedly but at a time very different to "normal" detection time or if a bag 53 is dropped off by an unidentified person, then the corresponding event is classified not only as "anomalous" but as of high gravity.

The normal state can be derived from a detected action, e.g. door 51b closed at time T3, etc. or from the state determined from survey data directly, e.g. in image 29c the door 51b seems to be in the same "closed" state as in image 29a. This state similarity could be determined from depth and/or point cloud data analysis, for example.

Figure 7:
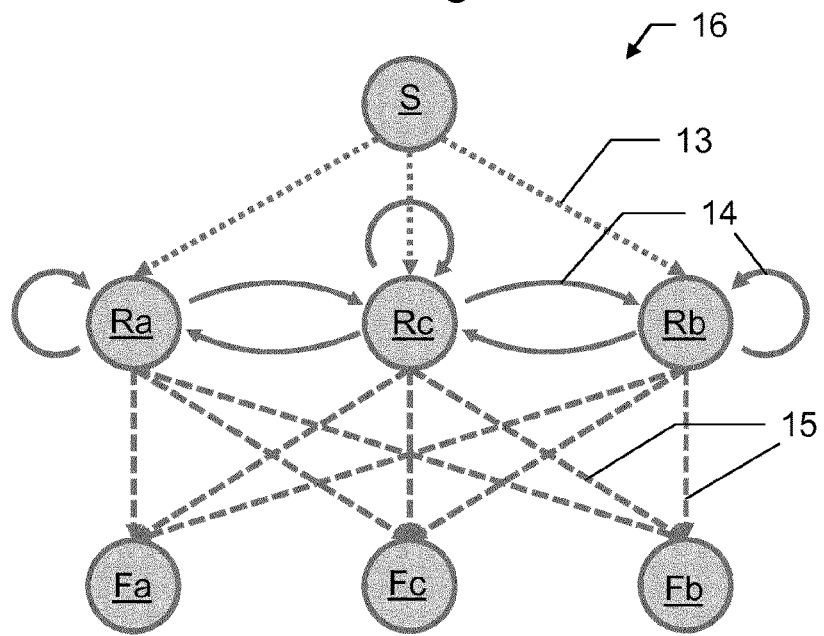
FIG. 7 illustrates another example of a classification and evaluation.

FIG. 7 shows an example of classification of a state pattern, using a Hidden Markov Model (HMM) 16. In case a person enters the building trough the entrance door 51c (Start S), the Hidden Markov Model 16 is applied to determine whether the person is in the corridor 50c or in room 50a or room 50b (cf. FIG. 1), using start probabilities 13 for the states Ra: "Person inside room 50a", Rc: "Person inside corridor C" and Rb: "Person inside room 50b", interconnection probabilities 14 and emissions probabilities 15 for Fa: "Door 51a opened", Fc: "Person detected in corridor 50c" and Fb: "Door 51b opened". Moreover, the HMM 16 can evaluate to what degree the behavior of this person corresponds to a typical pattern or is atypical, thus determining probabilities for assignments of the corresponding pattern (representative event) to a "critical" or "non-critical" class.

Figure 8:
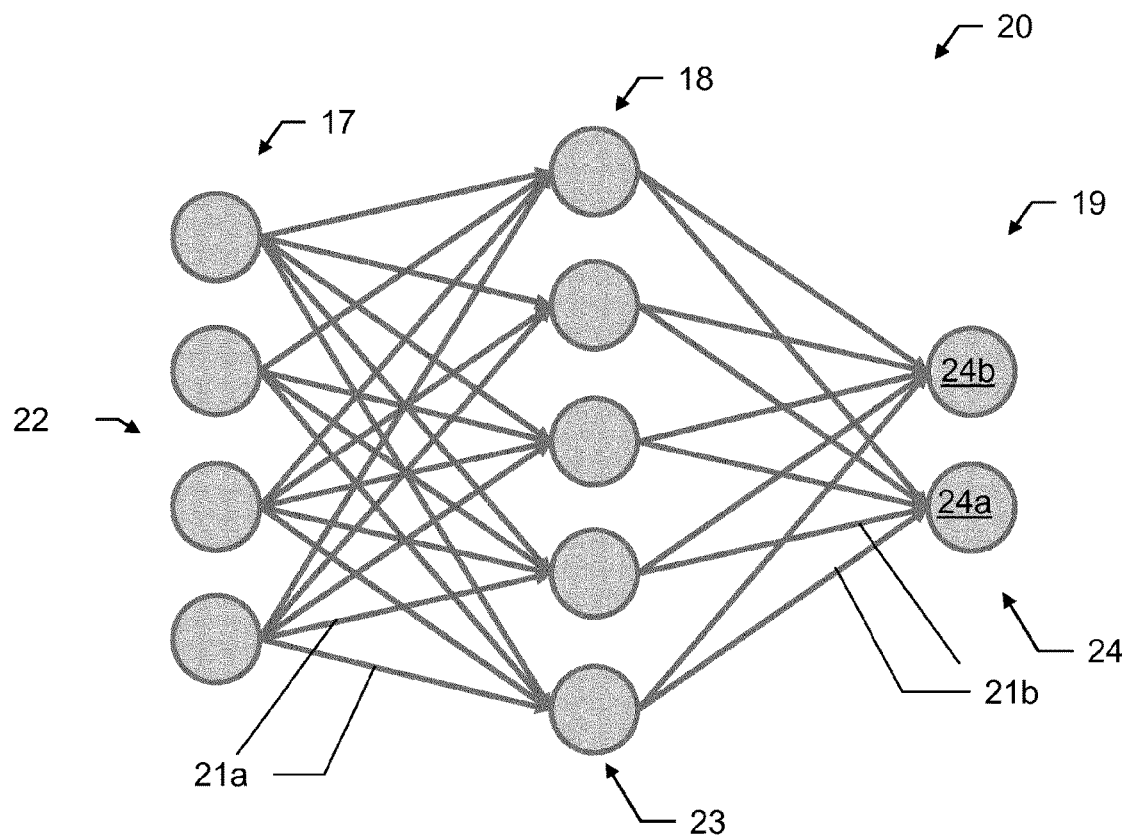
FIG. 8 illustrates another example of a classification and evaluation.

FIG. 8 shows an example of classification of a state pattern, using a Neural Network 20. The Neural Network 20 comprises an input layer 17, a hidden layer 18 and an output layer 19. Each layer 17-19 has a set of units 22, 23, 24. The arrows 21a, 21b indicate the weights between the units 22-24.

Surveillance data, e.g. person detected, door open, etc. underlying a detected sequence or pattern is fed into the input layer 17, for example together with some other data, e.g. the day of the week, location information, etc. Moreover, topological, functional or logical relationsships of the building model 3 as shown in FIG. 3 can be input into the neural network 20, e.g. door 51d connects room 50a with room 50b, door 51a is next to door 51b, etc.

The units 24 in the output layer represent whether the object is in a uncritical condition (unit 24b) or critical condition (unit 24a), e.g. in probabilities 80% for nono-critical and 20% for critical. In a more complex model, the output layer 19 can contain units 24 for single building elements, indicating whether a particular building element is in a normal or abnormal state.

Classification can also be a combination of several concepts, e.g. a HMM, a Neural Network, etc. A sub-method for instance might indicate whether a detected person is an employee, a visitor, or an intruder, with e.g. a person detected on corridor 50c at 8:00 (high emission probability for an employee), a person detected on corridor 50c at 10:00 (high emission probability for an employee or a visitor) or a person detected at 2:00 (high emission probability for an intruder). The output of this algorithm, i.e. a detected person at 8:00 is an employee 80%, a visitor 17%, or an intruder 3% can be input for another step where this information is combined with other state/state pattern or sensor data.

FIGS. 9 to 16c relate to a surveillance system with a surveillance robot and ability to resolve state ambiguity.

Figure 9:
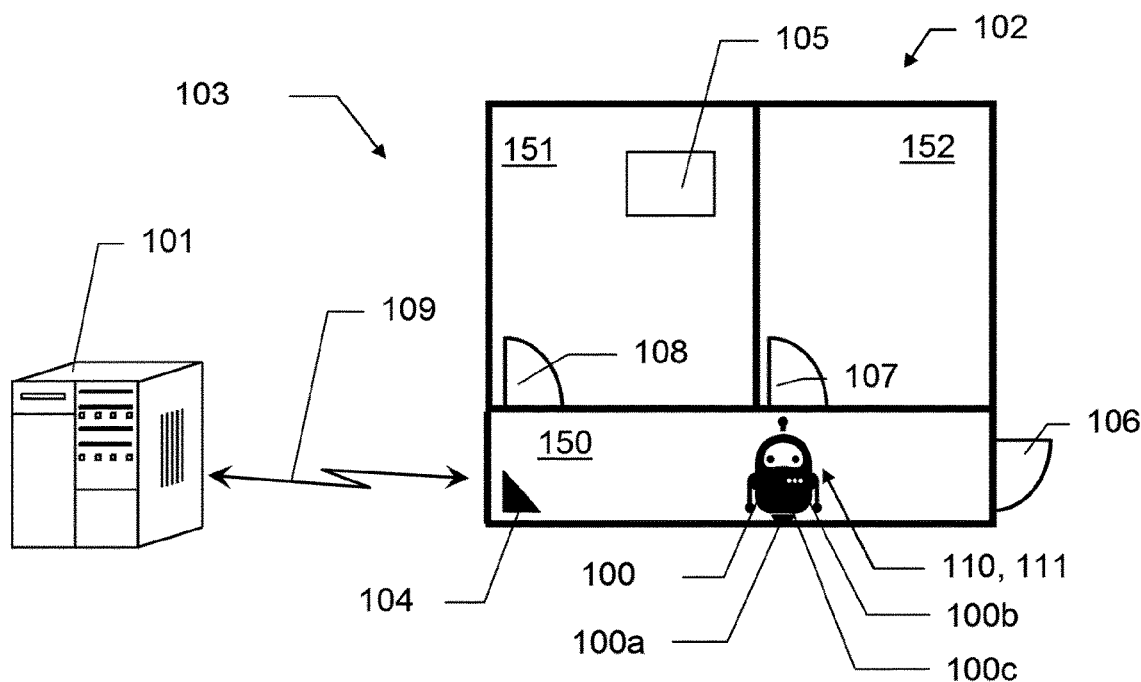
FIG. 9 shows a first exemplary embodiment of a surveillance system.

FIG. 9 depicts a surveillance system 103 with a mobile surveillance robot 100 for surveillance of a facility 102. The facility 102, for example an office building or a warehouse, comprises three rooms 150, 151 and 152, entrance door 106 and two room doors 107, 108 and other facility objects such as a box or container 105 within room 151. The robot 100 is in the example embodied as an unmanned ground vehicle (UGV) and comprises a body 100b, a drive unit 100a, a computing unit 100c and in the example at least a first and a second surveillance sensor 110 and 111 for acquisition of survey data. At least the first surveillance sensor 110 is embodied as a contactless sensor, adapted for large-area or large-scale measuring. The surveillance sensors 110, 111 are for instance embodied as one or more video cameras, IR-cameras, laser scanners or motion detectors, but may for example also comprise survey sensors such as a smoke detector or sensors serving for person identification such an ID card reader or key reader. Advantageously, the two surveillance sensors 110, 111 are of different type, for example two cameras covering different parts of the electromagnetic spectrum or a sensor pair comprising a passive sensor such as a heat or IR-sensor and an active sensor emitting measurement signals (e.g. Radar or Lidar). The first and the second sensor 110, 111 may also differ with respect to measuring accuracy, e.g. the first sensor 110 being designed for rough but quick surveillance and the second sensor 111 being designed for fine, detailed surveillance.

The robot 100 comprises further an action controller (not shown) for controlling any actions of the robot 100 such as moving or acquisition of survey data. The robot 100 is configured to patrol autonomously within rooms 150-153, thus continuously changing its position and orientation, whereby it may also survey the exterior of the facility 102. Its task is to check the state of the property 102/of objects 150-152, 105, 106-108 of the property 102 such as the state of the doors 106-108 or of the container 105, resp. to detect security relevant events associated with the property 102/objects 150-152, 105, 106-108. For example, the robot 100 is configured to check if a door 106-108 is open(ed) or closed or to determine the position and/or appearance of the container 105. As further example, the robot 100 has to check if windows are open(ed) or closed, if heating are turned on or off, if water tap is leaking or not or any other security or safety related event of property 102.

The computing unit 100c has a state ambiguity identification and remedy functionality to notice or identify an ambiguity of a detected state and optionally take actions for generation of state verification data suitable for resolving the ambiguity and deduce an object's state for certain.

For example, the state detector gets some sensor input from surveillance sensors 110, 111 and/or 104, e.g. an image and determines based on a person detection algorithm applied onto that image whether there is a person in room 150, there is no person, or it is uncertain. Actually, a person detector could tell that the probability is 51% that there is a person and 49% that there is no person. Since the difference is very small, i.e. below a predefined threshold, it would tell that it is not certain and that there is an ambiguity to be resolved by performing an action for collection of additional information about the person resp. about room 150.

The robot 100 may be fully autonomous and in itself constitute a (complete) surveillance system or—as shown in the example—be part of a (primary) surveillance system or net 103, comprising a central computer 101 and as shown in the example at least a further, third surveillance sensor 104. The third survey sensor 104 may be part of another surveillance robot or is an immobile sensor as shown, for example a camera 104 installed in a corner of room 150 as illustrated. The system 103 comprises communication means for communication (indicated by arrow 109) of the survey devices 104 and 100 with each other and/or the central computer 101. The central computer 101 is a single server computer 2—as shown- or for instance a cluster of servers, a cloud or similar means. The means for detecting states and/or noticing a state ambiguity (resp. the computing unit 100c) can be situated at the robot 100, at the central computer 101 or another unit of the system 103 or can be distributed over two or more system components.

Figure 10:
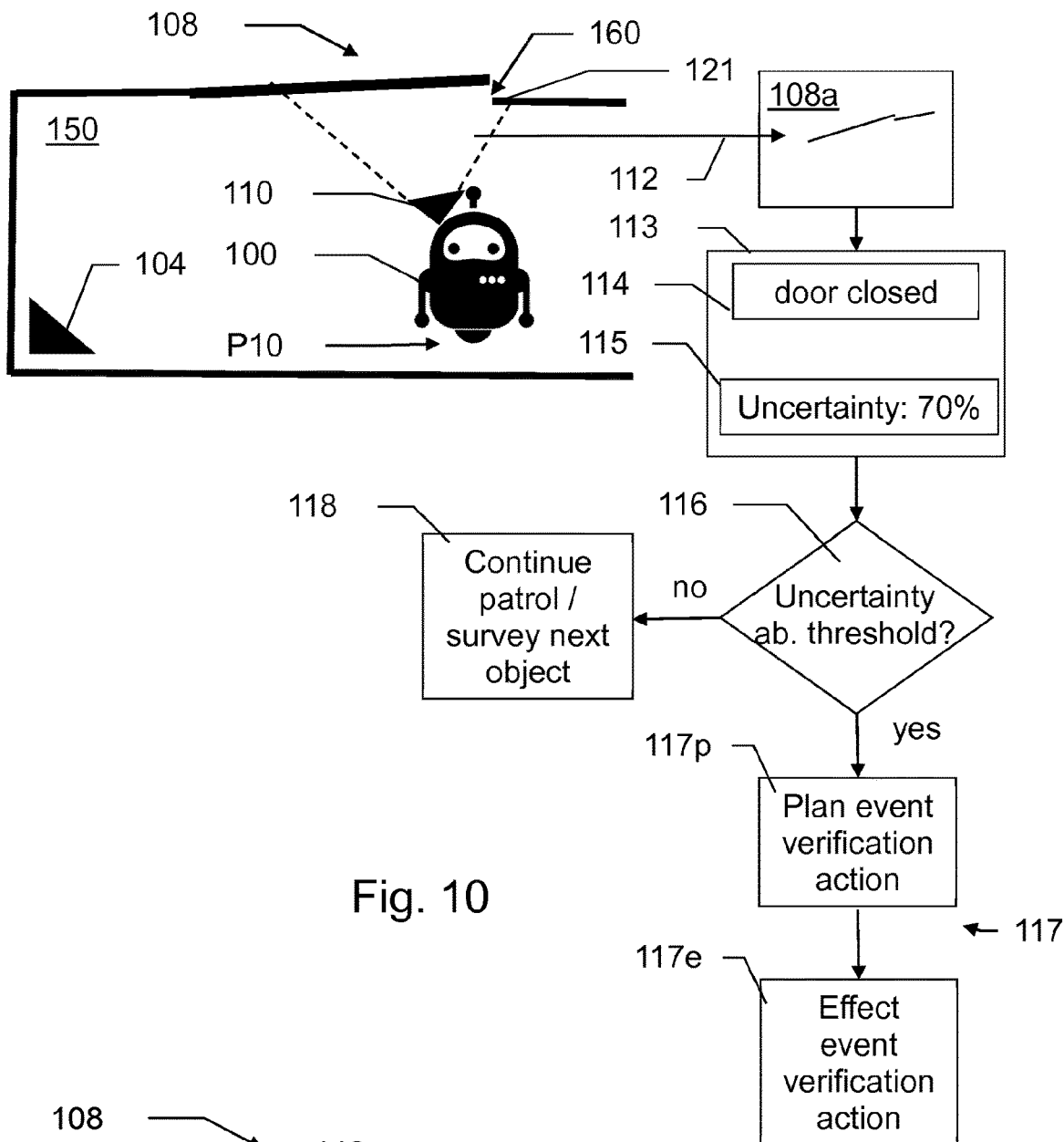
FIG. 10 illustrates a survey procedure.

In FIG. 10, a surveillance procedure of robot 100 is illustrated. Shown is a section of room 150 of the building is shown, comprising door 108 and a flow diagram. At step 112, the surveillance robot 100 acquires with the first sensor 110 first surveying data 108a of door 108 at acquisition position P10. The first sensor 110 is in the example embodied as a camera and the surveying data 108a is an image of part of door 108 and the part of the adjacent wall.

At step 113, the surveying data 108a is evaluated by the robot's computing unit and a state 114 of door 108 is deduced; in the example the deduction 113 results in the state: "door 108 closed". In addition, the computing unit determines an uncertainty 115 of the deduction 113 of the door's state 114, the uncertainty 115 serving as an indicator for the ambiguousness of the state 114 resp. of its deduction. In other words, it is estimated to what degree the deduced state 114 in fact corresponds to the true state of door 108.

In the example, the door 108 is in fact nearly, but not completely closed; a small opening or gap 160 is present. From the robot's 100 resp. its camera's 110 viewpoint P10, the opening 160 is hardly viewable and therefore, image processing of image 108a, the image 108a acquired at acquisition position P10, by the computing unit allows only ambiguous deduction of the door's state, with a high uncertainty for the detected state 114, in the example expressed as a value of uncertainty or (probability of) ambiguity of 70%.

At step 116, it is checked if the determined uncertainty 115 is above a defined threshold. If the result is "no", i.e. there is low uncertainty and the detected state 114 can be seen as correct or unambiguous, than the robot 100 continues its patrol resp. goes on to the next object to be surveyed (step 118). However, if the ambiguity indicator 115 is above the threshold ("yes"), then the computing unit triggers an action 117, the action 117 being adapted to verify the state of door 108. The triggered action 117 is e.g. acquisition of another image of door 108 at a second imaging position, different from the first position P10, interaction of the robot 100 with door 108 (for instance trying to push door 108 in order to test if it can be opened without using its lever) or retrieving additional data about door 108 by another device, for example retrieving an image of door 108, taken by surveying camera 104, all of which will be explained in detail below.

In other words, the detected state 114 can be seen as a preliminary deduced state. If the detection at step 113 is assessed as credibly (low uncertainty) then the state 114 detected at step 113 is considered as the final result. If the deduction at step 113 is assessed as unclear or ambiguous (high uncertainty), the deduced preliminary state is verified by verification action 116 of robot 100 in order to resolve the ambiguity ascertained at step 113.

Of course, the state of door 108 needs not to be determined yet in step 113 in a way that an output "door 108 closed" is explicitly generated by the computing unit but only to such an extent that an assessment or rating of the deduction 114 is possible. In other words, no plain decision about the real state of door 108 is needed at step 113 but an evaluation of the surveying data that allows for a judgement of the (un-)certainty of the evaluation aiming at the deduction 113 of the door's state 114.

In the example, the determined ambiguity is resolved based on action 117 using a two-step process 117p, 117e. Before an action 117 is triggered, the computing unit plans in step 117p the action to be triggered and effected in step 117e with respect to effectiveness for resolving event ambiguity 115. In view of the object 108, the detected event 114, the ambiguity indicator 115, the first surveying data 108a or further conditions such as equipment of the robot 100 or environmental conditions, there is normally more than one possible action 117 for generating verification information. In the planning step 117p, the generation of verification information is optimised in that the most effective or best action 117 is chosen from the variety of possible actions 117.

As said, this decision procedure considers for example the detected state 114 in that to a specific state in question of a specific object or type of object 108, a specific best action is assigned, e.g. as predefined in an event-action-assigning database or computed by the computing unit based on the first surveillance data 108a. As another option, the first surveillance data serves as criterion for the choice of action to trigger, e.g. that a choice for first or second survey sensor to be used for generation of second surveying data or choice of measuring resolution depends on a magnitude of missing data points of the first survey data. Preferably, the planning step 117p based on more than one criterion, e.g. on a multitude of criteria such as sort of object 108, degree of ambiguity and number of verification data points to be acquired. Further examples for optimisation of verification information generation are given in the figures below.

The present disclosure has the advantage that the mobile surveillance robot 100 can handle unclear or ambiguous survey situations or object states of the property to be surveyed, which exists a good many times in reality. Ambiguous detections or deductions of events 114 are for example result of indeterminate or vague conditions of an object such as door 108 in between two or more possible states or object conditions/states/events previously unknown to the robot 100. Ambiguous deductions can further be the result of unfavourable conditions for survey data acquisition such as poor light conditions, inauspicious robot position P10 when generating surveillance data or perturbing environmental influence The robot 100 is enabled to take actions to compensate such drawbacks and provide certitude about an object's event.

Compared to time consuming solutions wherein the robot 100 investigates the state of each object 108 in detail from the first, a quick survey throughout the property can be advantageously effected, wherein only those objects 108 are surveyed in detail and with higher effort in time which states are assessed as needing review according to the results of the prior quick surveillance. In other words, the robot 100 skims over the objects under surveillance and selects by way of the evaluated results of these glances those objects which need in depth investigation (instead of depth investigation of all objects or the inability of depth investigation at all).

Figure 11:
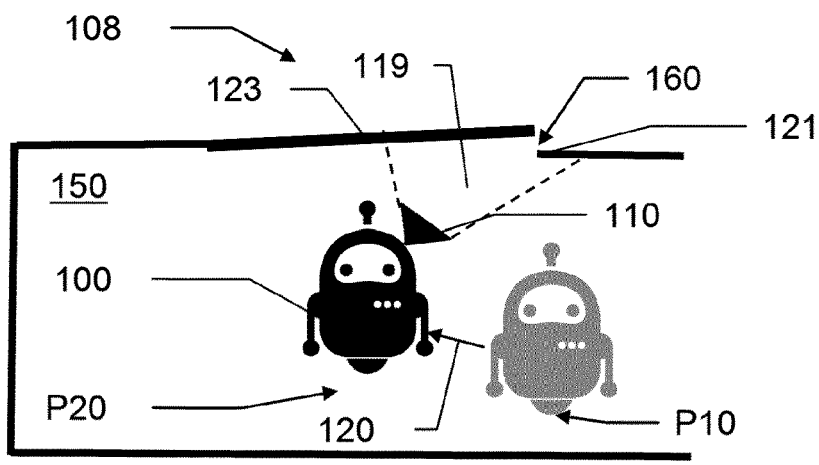
FIG. 11 illustrates a first example of an action triggered in order to verify the state of an object.

FIG. 11 illustrates a first example of an action triggered in order to generate verification information of an object. The action triggered 120 is a change of the survey position of the robot 100 from the initial position P10 in which the first survey data was acquired (cf. FIG. 2) to a new survey position P20. In addition, the orientation of the first surveillance sensor 110 is changed such that a new field of view 119 results. All in all, the acquisition position and orientation P20 is changed such that the state of the door 108 can be deduced without any ambiguity, thus verifying the underlying state. In position and orientation P20, the opening 160 of door 108 can be much better perceived compared to the original position P10 because of viewing direction pointing at the edge between door 108 and wall/door frame 121 and a position close to the gap 160. Said otherwise, the robot's or system's computing unit resp. the state detector triggers the robot to enhance or optimise survey position and/or alignment (of the entire robot or at least of the survey sensor in question) for surveying door 108. A second image as second surveying data is taken in position P20 as verification information. Considering this verification information, the computing unit deduces that the true state of door 108 is "open".

In other words, if the robot 100 is uncertain or unsure about the door state as detected based on the first surveillance data, then the robot 100 plans a different position P20 wherefrom the door state can be better observed (e.g. more effective or optimised in that the positions allows better or best generation of surveying data of door 108 with respect to higher resolution, higher sensor signal/less noise or with less disturbing/obstructing environmental influence) or wherefrom additional or other parts and/or features of door 108 are surveyable, which are suitable for state verification.

In particular, if the door plane 123 or door frame 121 is obstructing the door gap 160, the robot 100 moves back and approaches the door 108 from an optimised (viewing) angle to get a closer look to the door gap 160. Advantageously, the robot 100 repeats this action, establishing a third survey position and/or orientation and so on, until the door state is recognized with high certainty. As an option, it sends then a notification to the central computing unit (cf. FIG. 1).

The acquisition position and/or orientation for generation of such state verification information is optionally determined analogue to a next-best-view method (NBV) known in the art. The goal of the next best view planning is to recognize state relevant features with high certainty (wherefore it is not necessary to recognize or survey the door 108 as a whole). In the example, a relevant feature might be the lock of door 108 and/or edges of the door panel 123 or the adjacent wall 121 or presence or form of a shadow or light cone. Preferably, the computing unit of robot 100 provides a database with event relevant features of a plurality or multitude of objects of the property to be under surveillance.

Optimized or best acquisition positioning and/or orientating is for example machine learned by the robot 100 by correlating robot position P10 or P20 with object state. One or more criterion is defined for the object state, which is then optimized with respect to the robot position P10, P20 or robot's waypoints, e.g. for a scheduled surveying patrol. For example, the door state is defined by the size of the door gap 160. In the training phase, many robot positions or waypoints P10, P20 are sampled around the door 108, where the door 108 has many different opening angles resp. many differently sized door gaps 160. From all robot positions for a defined door opening angle, the best robot position P10, P20 is defined. From these data, a best view map is learnt. This can be done for various objects and various object states. For example, if the robot is performing a task at a patrol's waypoint No. 2 and there is some ambiguity detected, there could be in the planning some alternative waypoints defined, e.g. No. 2a, No. 2b, etc.

More general, a mapping correlating survey sensory input and states has to be learnt. If assuming a quasi-static environment, then the change in the sensory data is due to the robot's 100 own movement. Therefore, the mapping to be learnt is between change in survey sensory data and object state ambiguity. Considering such differential survey sensory input allows a more object independent mapping, i.e. the robot 100 might be empowered to investigate not only door gaps 160, but gaps in general.

Figure 12:
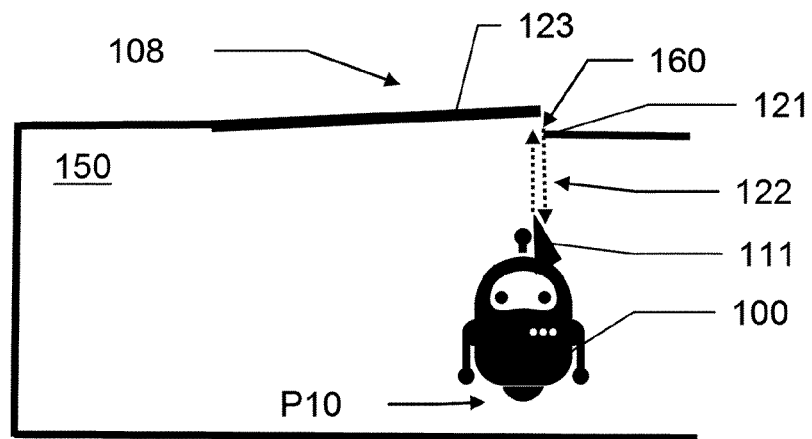
FIG. 12 shows another example for an action triggered in order to resolve state ambiguities.

FIG. 12 shows another example for an action triggered in order to resolve state ambiguities. In the example, second surveillance data acquisition of door 108 is triggered using second survey sensor 111 of the robot 100. In contrast to the first surveillance sensor which is for instance a camera with relatively limited resolution, the second sensor 111 is for fine surveillance. Triggering a second surveying with the second surveillance sensor 111 instead of second surveillance with the first surveillance sensor 110 can be the result of choosing the more effective of both surveillance sensors 110, 111 for resolving ambiguity. For instance, evaluation of the first surveillance data reveals that the measurement resolution is too low to deduce the state of door 108 unambiguously, thus the second surveillance sensor 111 is chosen as it enables higher measurement resolution than the first surveillance sensor 110.

In the example, the second sensor 111 is an active surveillance sensor, emitting a measurement signal 122, specific targeting the boundary door/wall 121 (resp. part of door plate 123 and door frame 121) and receiving signal 122 reflected therefrom. Such a second sensor 111 is for example a laser scanner or a laser based distance meter.

The verification information available by the fine measurement of second survey sensor 111 is for example a high resolution 3D-point cloud, representing the door-wall edge. Such a 3D-point cloud provides detailed information about the state of door 108. As an alternative, two precise distance values for the distance from the robot 100 to the door panel 108 and the distance from the robot 100 to the wall resp. frame 121 are provided by measurements with the second survey sensor 111 embodied as a laser distance meter. Comparing these two values gives a high certainty indication if door 108 is still closed or has been opened. Hence, the 3D point cloud or the two precise distance values allow for detection of the state "door open" with very low uncertainty or without ambiguities. Analogue to the procedure described with respect to FIG. 3, a correlation map for second surveillance data acquisition position and/or orientation and object state is optionally established resp. stored in a database of the robot's computing unit.

As an alternative example for state verification by acquiring second surveillance data, the surveyed object is a person within the surveyed building which identity is to be surveyed. If its identity could not be unambiguously determined by analyzing the first surveying data (an image or video) captured by the first camera 110 (cf. FIG. 2), then his or her identity is verified using second surveillance sensor 111 which is a high resolution camera with enhanced ability of person identification. As another option, the second surveillance sensor 111 is for a key reader, whereby the triggered action comprises requesting the "uncertain" person to insert or show an identification key and reading out the key. Such a surveillance robot 100 resp. surveillance system can provide the advantage e.g. of an office building wherein the staff members do not have to identify themselves when entering the building (e.g. producing an identity card at a key reader fixed next to an entrance door) but can enter without this cumbersome procedure, because the robot 100 surveys all persons en passant, e.g. acquiring first surveillance data per camera, inside the building while patrolling the building and only in case of an identity which cannot be unambiguously derived of the first surveillance data, producing an identity card for verification information is needed.

Figure 13:
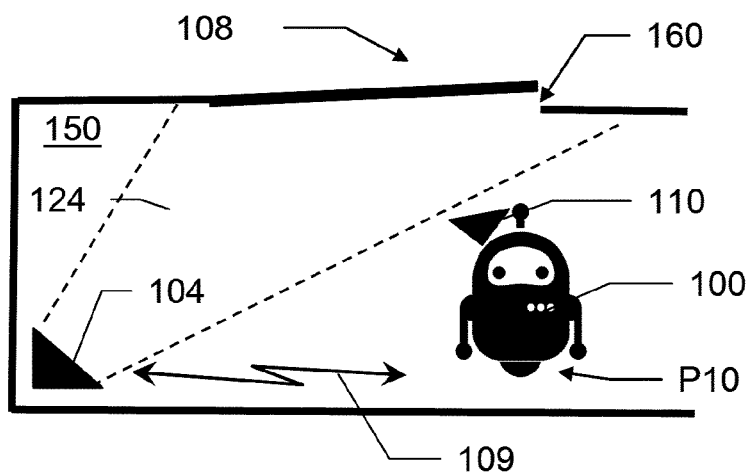
FIG. 13 shows another example for an action triggered in order to resolve state ambiguities.

FIG. 13 shows a further example of a triggered action in case of an uncertain object's state. In the example, the triggered action is retrieval of external additional information about the object. In the example, the robot 100 is part of a surveillance system, the surveillance system comprising the third surveillance sensor, survey camera 104 installed at a corner of room 150 (cf. also FIG. 1). Due to its position, the camera 104 has a better field of view 124 with respect to door 108 than the robot at its current position P10, hence an image taken by camera 104 as third surveying data allows for better detection of an opening 160 of door 108. Per communication means 109, the robot 100 either loads a survey image of door 108, the image automatically taken by camera 104 in form of a picture stream taken at regular intervals, or the robot 100 commands or triggers the camera 104 to take an image this current instant (for example in case a third surveillance sensor 104 has long acquisition intervals or is in sleeping mode).

The third surveillance data, the image of camera 104, provides verification information with which the state of door 108 is unambiguously deduced. The door gap 160 is identified with low uncertainty, thus the survey robot 100 has verified that the door 108 has been opened.

Other forms of external verification data actively retrieved is for example data from a database stored in a central computing unit of a surveillance system including the survey robot 100. For instance in case a box 105 is detected which in a previous round of patrol of robot 100 was not present in room 151 (cf. FIG. 1), then the robot could "ask" the central computing unit if there is data available about delivery of such a box. If the robot retrieves confirmation data that box 105 is registered or duly delivered, then the event "box present in room 151" can be confirmed as "ok", if no data is available in the database about box 105, then the object's state is deduced as "risky" and e.g. an alarm is outputted. Alternatively or additionally, in case of an ambiguous or "risky" state of box 105, a further action is triggered for further verification of the state, e.g. fine or detailed surveying of the object with a surveillance sensor of robot 100 analogue to the additional survey procedure described above and/or interaction of the robot 100 with the object is triggered, analogue to the interaction procedure described below.

Other data is data provided by a human operator of a surveillance system. For example, the robot 100 reports to a human operator that a detected state has a high degree of uncertainty and the human operator gives the robot 100 additional data about an event or about the concerned object or transmits data with instructions for further action of the robot 100, up to the point that the human operator takes temporarily control of the robot 100 or of some of its systems like one of its surveillance sensors 110, 111 by transmitting control commands.

Figure 14:
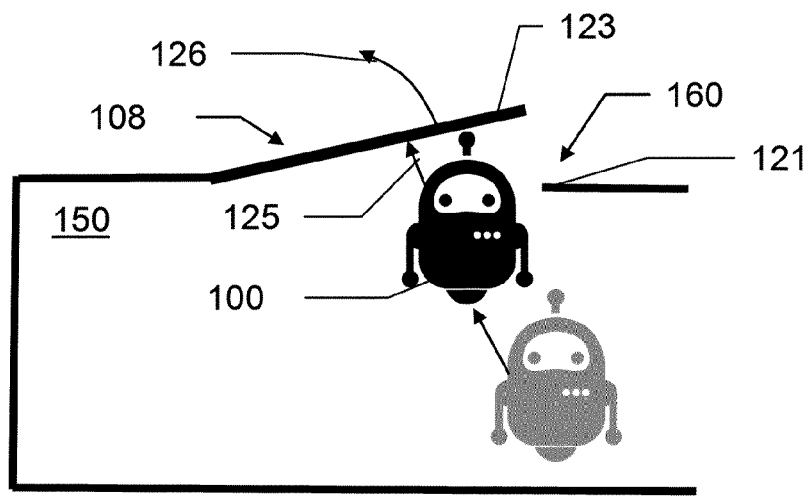
FIG. 14 shows another example of an action to resolve state ambiguities.

FIG. 14 shows another example of an action to resolve state ambiguities. In the example, the surveillance robot 100 interacts with the object, the door 108, to verify whether the door 108 is open or closed/shut. In a simple approach as shown, the robot moves towards door 108 (indicated by arrow 125) and pushes door leaf 123 (without pushing the door handle). If the door leaf 123 can be shoved and door 108 pushed open, then it is verified that the door 108 was not entirely closed. If the door leaf 123 resists, as it is put it into the door lock, this serves as verification information for the state "door closed".

Such an interactive behaviour is for example learnt by correlating robot action with object state. Analogue to the triggered surveying action as described above, a criterion is defined for the object state. For example, the state of door 108 is defined by being able to push the door 108 by a certain amount. In the training phase, many points of action and directions of action are sampled around the door 108, where the door 108 has many different opening angles. For each door opening angle, the best action point/direction is defined, i.e. where to push the door 108 and in which direction for best/most indisputable verification information resp. for best (lowest) action effort. From these data, a best action map is learnt.

In the simplest case, the action map is "move forward". If the robot 100 bumps into the door 108 and no resistance is detected, then the door 108 is expected to be open. Possible resistance is for example detected with a sensor of the robot's drive unit and/or with a touch or haptic sensor at the robot's front or an arm of the robot 100.

Action maps can be learnt for various objects and various object states. Actually, one could again assume a quasi-static environment and then learn the change in sensory input and the inter actions to be performed to infer a certain object state.

A suitable representation can be Markov decisions processes to control the robot 100. A Markov model is a stochastic model of a randomly changing system, where the system is described by states. The state is measured through input data of robot's sensors and change in state is dependent on the robot's movements. If the logical relationship between the states is known, then the robot 100 can predict the outcome of any movement and, therefore, predict the object state.

In case of a surveillance robot 100 equipped with adequate manipulation tools, an interaction with an object the state of which is to be inferred may also comprise pushing or turning buttons, taps or knobs of an object such as a knob of door 108. In some cases, such more detailed or rangy action can be more suitable to verify an event associated with an object the more simple approaches described above.

A further example (not depicted in FIG. 6) for an interaction for generating state verification information is an output of an acoustic and/or optic signal directed at the object by the robot 100. The signal is such that it is (probably) suitable to provoke a reaction of the object. For instance, the object is (meaning also that it is suspected by the robot 100 to be) a human being. Then the acoustic or optic signal is e.g. a message (text) displayed on a screen of robot 100 or spoken by a robot's speaker, animating the human being to react. Another example for a triggered acoustic signal is blowing a robot's horn or siren which is likely to lead to some sort of movement of the human being which is observable or detectable by the robot 100 and serving as verification information for verifying a state. This is e.g. useful if the uncertain state is uncertainty about the nature of the object, i.e. if the object is a human being (or an animal) or an object (like a human-like statue) without the ability to move. Or the surveillance robot 100 can verify if the detected state is a "person lying on the floor unconsciousness" (showing no reaction) or not (reacting e.g. by turning head or opening eyes). Also, the type of reaction detected by the robot 100 can serve as certifying the state. If there is indicated an ambiguity in the way that the state of a human being is uncertain as "intruder" (or "staff member/visitor") then the robot 100 gives out an alarming signal. If the robot 100 observes that the human being reacts by running away then this could serve as verification information for the event "intruder" (preferably not the only verification information as also legal staff might run away because of fright).

As the above examples already indicate, the generation of verification information comprises optionally a combination of interaction of the robot 100 with the object and subsequent acquisition of second surveillance data (for example surveying the reaction of a human being to an interaction of the robot with the human being).

Figure 15A:
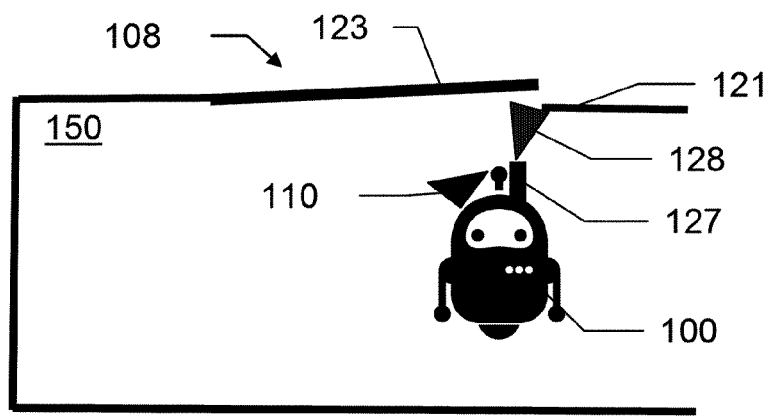
FIG. 15a,b shows another example of an action to resolve state ambiguities.

FIGS. 15*a,b* give another example for such an action sequence of interaction and surveying for state verification. In the example, the first surveying of door 108 with the first surveillance sensor 110 goes along with detection uncertainty if door 108 is "closed" or "opened" because the first surveying data, for example a picture taken with a camera as surveillance sensor 110, is quite noisy or of low contrast.

To generate verification information, the robot 100 first interacts with the door 108 in that it applies a (volatile) paint 128 by a nozzle 127 onto part of door 108 resp. onto the boundary door panel 123 and wall 121, as shown in FIG. 15*a*. The paint 128 is chosen such that it enhances contrast. Alternatively, the paint 128 is for example black light or UV-ink (fluorescent paint).

Figure 15B:
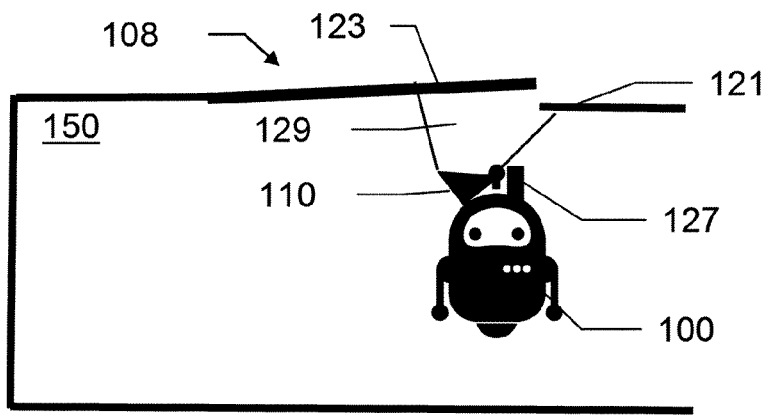

Then, as depicted in FIG. 15*b*, the robot 100 acquires second surveillance data using the surveillance sensor 110, e.g. a second image of door 108 which now has low noisy, allowing for a detection of the door's state with no (or little) uncertainty resp. ambiguity. If for example the robot 100 has applied black light ink, then a picture is taken as second surveying data while illuminating of door 108 with UV-light 129 of a UV-light source of robot 100.

Further examples for such material application are paint or liquid which enable to highlight the surface of an object such that the surface structure can be surveyed unambiguously or which highlight an object's contour or shape.

Figure 16A:
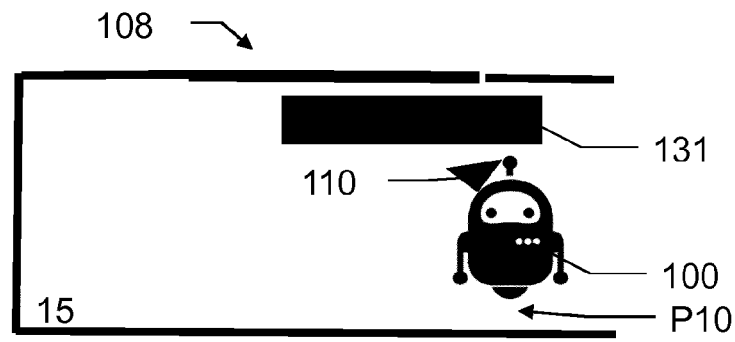
FIG. 16a-c illustrate another example of triggered action in order to resolve state ambiguity.
Figure 16B:
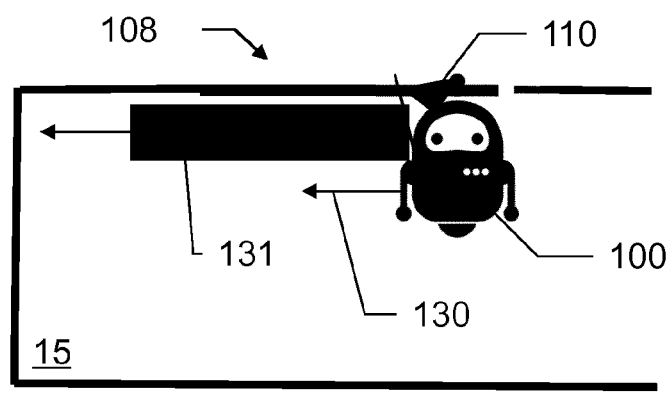
Figure 16C:
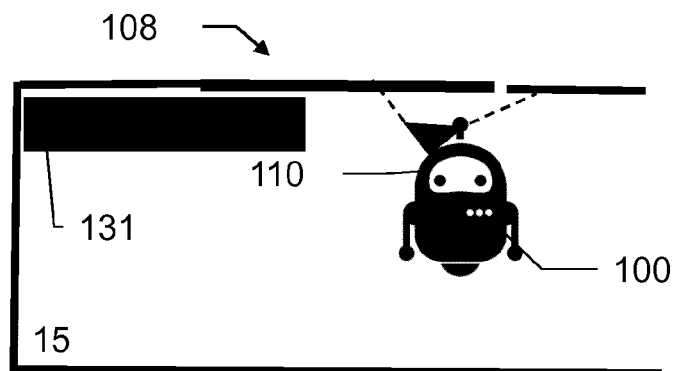

FIGS. 16*a-c* illustrate another example of triggered action in order to resolve state ambiguity. In the example, the robot 100 acquires first surveillance data of door 108 with sensor 110. As shown in FIG. 16*a*, due to a further object 131 present in room 150 and in between robot 100 and door 108, the first surveying data is distorted and the determination of the door's state uncertainty reveals the event detection is highly uncertain. If for example the first surveying data is an image of door 108, the perturbing body 131 is also imaged, overlaying features of door 108 which are necessary to determine unambiguously the door's state.

FIG. 16*b* depicts that first an interaction with the object, door 108, is triggered in that the perturbing object 131 is pushed aside by robot 100 (indicated by arrow 130) in order to improve or free view of the robot 100 towards door 108. As can be seen, triggered interaction can also comprise interaction with a further object (perturbing body 131) dependent on the object to be surveyed (door 108).

FIG. 16*c* shows the further triggered surveillance action. Now that the object 129 is put away from door 108 by way of the triggered interaction, robot 100 acquires second surveying data, e.g. a second image, of door 108 with the survey sensor 110. As the perturbing body 131 is not any more hampering the deduction of the door's state, the state can be deduced (closed) with low or no uncertainty based on the second survey's data resp. the state verification data.

FIGS. 17*a* to 25 relate to a patrolling system that is adapted to patrol an area, e.g. a building. In particular, the system is suitable for autonomous surveillance of the area and for detecting and reporting anomalies.

In FIGS. 17*a* and 17*b*, a first exemplary embodiment of a combined ground-aerial sensor platform system 200 is depicted. The system 200 comprises an unmanned ground vehicle (UGV) 210 and an unmanned aerial vehicle (UAV) 220.

FIG. 17*a* shows a drone 220 as the UAV being positioned on top of an automotive robot 210 as the UGV, whereas FIG. 17*b* shows the drone 220 flying separate from the robot 210.

The robot is equipped with wheels 212 or other means that allow moving the robot 210 on the ground, e.g. tracks or legs. The robot 210 comprises a housing 211 which houses the interior components and is shaped to allow the drone 220 to land on the robot 210. The robot 210 preferably can be adapted as a launch and recharge platform for the drone 220. In this embodiment, the housing 211 comprises a bulge 214 on top of the robot 210 which comprises a charging station 216 for the drone 220 that allows charging the drone 220 while it is landed on the robot 210, e.g. by means of induction coils.

Alternatively, the UGV 210 may comprise a battery exchange station, wherein a number of battery packs for the UAV 220 are provided, and a battery of the UAV 220 can be automatically replaced by a new battery.

The drone 220 is a quadcopter comprising rotors 222 allowing the drone to fly, legs 224 allowing the drone to stand on the ground or on the robot 210, a battery 226 for supplying power to the rotors and surveillance equipment of the drone 220. The relatively small battery 226 can be charged when the drone stands on the robot 210. The legs 222 are adapted to stand on top of the robot 210 appropriately to allow the charging of the battery 226 through the robot's charging station 216.

Figure 18A:
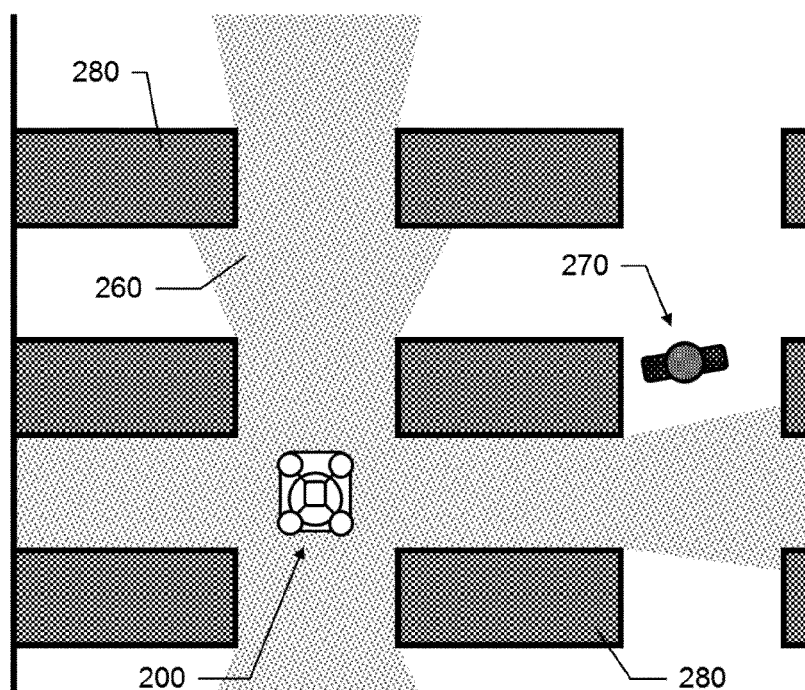
FIGS. 18a-b illustrate a patrol of the system of FIGS. 17a-b in a warehouse.
Figure 18B:
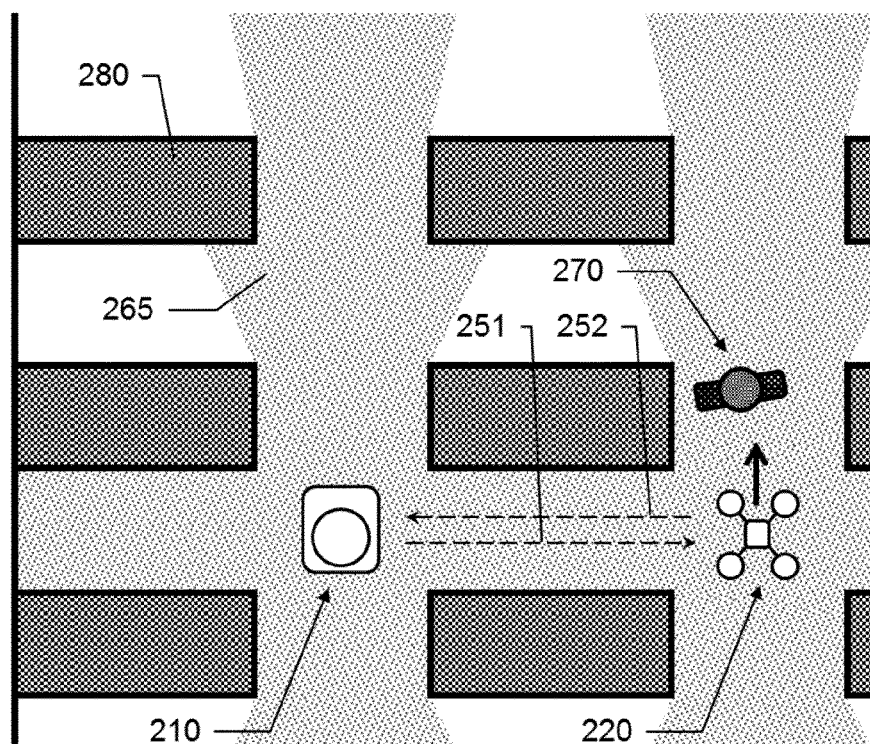

FIGS. 18*a* and 18*b* illustrate a joint patrolling of the two parts of the system 200. A warehouse with a multitude of shelves 280 is depicted in a top view. In FIG. 18*a*, the system 200 is patrolling autonomously through the warehouse, the system's cameras having a field of view 260 that is blocked by the shelves 280 so that an intruder 270 is able to hide behind a shelf 280.

In FIG. 18*b*, both the robot 210 and the drone 220 patrol the warehouse, continuously exchanging data 251, 252. Together, the robot 210 and the drone 220 have an extended field of view 265, allowing detecting the intruder 270.

The drone 220 has the advantage to be able to fly at different altitudes thus passing obstacles that block the way of the earthbound robot 210. Here, the drone 220 could therefore also fly above the shelves, e.g. reducing the time to cross the warehouse diagonally.

Having detected the (suspected) intruder 270, the robot 210 can autonomously receive the task to advance the person and demand identification, e.g. by means of a voice output. The robot can comprise an ID card reader and/or face recognition software for identifying the person. The system 200 may also comprise a user interface, e.g. for entering a PIN code for identification.

Instead of a quadcopter or other multirotor helicopter the UAV 220 can also be adapted as an airship using lifting gases such as helium or hydrogen for buoyancy. This can be useful especially for outdoor use. Also a UAV 220 using a combination of rotors and lifting gas for buoyancy is possible. If the UAV 220 uses a lifting gas, the UGV 210 may optionally be equipped with a gas tank comprising compressed filling gas and a refilling station that is adapted for refilling the lifting gas of the UAV 220 when it is landed on the UGV 210.

Figure 19A:
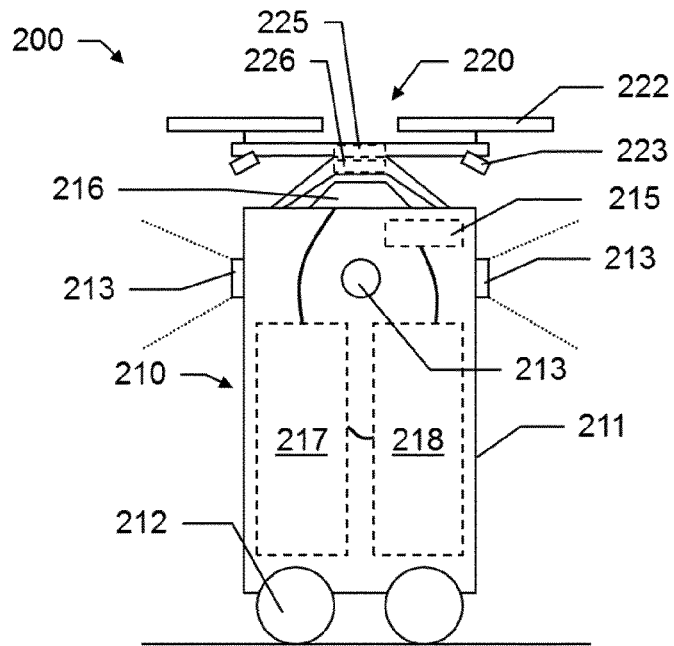
Figure 19B:
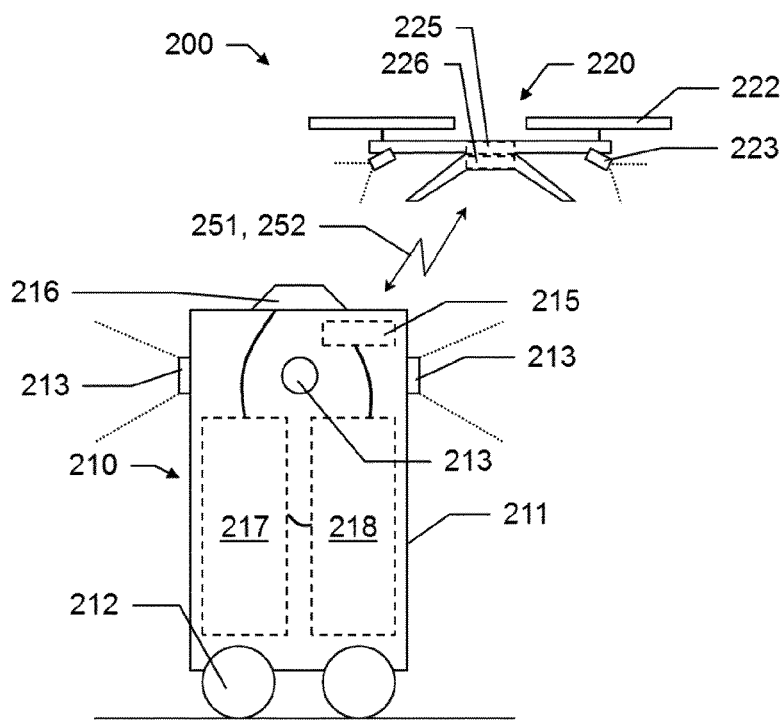

In FIGS. 19*a* and 19*b*, a second exemplary embodiment of a combined ground-aerial sensor platform system 200 is depicted.

The system 200 comprises an unmanned ground vehicle (UGV) 210 and an unmanned aerial vehicle (UAV) 220. The UAV 220 can land on top of the UGV's housing 211, where a charging station 216 is provided that is adapted to load a battery 226 of the UAV 220 when it is landed.

In one embodiment, the UGV and UAV may comprise a landing system comprising a light emitter and a camera wherein the landing system is adapted to guide the UAV 220 to a designated landing station on the UGV 210. A generic landing system for landing a UAV on a fixed landing station is disclosed in US 2016/0259333 A1.

The UGV 210, inside of its housing 211, comprises a battery 217 that provides the energy to the charging station 216 for charging the UAV's battery 226 and to the other electric components of the UGV 210. These comprise a computing unit 218 with a processor and a data storage, motors for driving the wheels 212 of the UGV, sensors such as cameras 213, and a communication unit 215 for wirelessly exchanging data with a corresponding communication unit 225 of the UAV 220. Further sensors can comprise e.g. a LIDAR scanner, infrared cameras, microphones or motion detectors.

The computing unit 218 is adapted to receive and evaluate sensor data from sensors of the UGV, in particular from the cameras 213 and to control functions of the UGV 210, particularly based on the evaluation of the sensor data. Controlling the UGV comprises controlling the motors of the wheels 212 to move the UGV through the environment.

In particular, the computing unit 218 can be adapted to perform a simultaneous localization and mapping (SLAM) functionality based on the sensor data while moving through the environment.

The UAV 220 comprises a relatively small battery 226 that can be charged when the UAV 220 stands on the UGV 210. This battery 226 provides electric energy for the components of the UAV 220. These components comprise the motors driving the rotors 222, sensors such as cameras 223 and the UAV's communication unit 225.

The cameras 223 and other sensors of the UAV 220 generate data 252 that is provided wirelessly to the computing unit 218 of the UGV 210 via the communication units 215, 225 of the UAV 220 and the UGV 210. The sensor data from the UAV's sensors is stored and evaluated by the computing unit 228 and can be used to control the UAV 220 in real time by generating control data 251 that is sent to the UAV's communication unit 225.

Alternatively, the communication units 215, 225 of the UAV 220 and the UGV 210 may be connected by means of a cable (not shown here). A solution for connecting a tethered UAV to a ground station is disclosed in US 2016/0185464 A1. With such a connection, which may comprise one or more plugs, the UAV can be provided with electricity from a battery of the UGV, and data 251, 252 can be exchanged between the UGV and the UAV. It is also possible to connect more than one UAV to one UGV. In this case, preferably, the UAV are controlled taking into account the positions of the more than one cable in order to prevent these from eventually becoming entangled. A solution for determining a position of the cable of a single UAV is disclosed in US 2017/0147007 A1.

In FIG. 19*c* the UGV 210 and the UAV 220 both comprise a radio communication module 219, 229. These modules are adapted to establish a data link to a remote command center to send sensor data and to receive commands from a central computer or a human operator at the remote command center. The data link can be wireless, i.e. a radio connection that can be established e.g. by means of a WiFi network or a mobile phone network.

Alternatively or additionally, a communication module can be provided that allows a tethered communication with the remote command center. Sockets need to be provided in the environment with which the communication module can establish a connection. A location of the sockets can be stored in the computing unit's data storage. Also, the computing unit 218 may be adapted to detect sockets based on sensor data, particularly in images taken by the cameras 213, 223 of the system. The UGV 210 and/or the UAV 220 may then be positionable relative to the socket in such a way that a plug connected of the communication unit can be plugged autonomously into the socket to exchange data with the remote command center.

Likewise, the system 200 can be adapted to connect with power outlets to recharge the battery 217 of the UGV 210. A location of conventional power outlets can be stored in the computing unit's data storage. Also, the computing unit 218 may be adapted to detect power outlets based on sensor data, particularly in images taken by the cameras 213, 223 of the system. The UGV 210 may then be positionable relative to the socket in such a way that a plug connected to the UGV's battery 217 can be plugged autonomously into the power outlet to charge the battery 217.

For connecting with a data socket or a power outlet, the UGV 210 may comprise a robot arm (not shown here). This robot arm can be operable by the computing unit 217 based on evaluated sensor data, e.g. images taken by the cameras 213, 223. The arm can either comprise the plug or be able to guide a plug of the UGV 210 to the socket or outlet.

The arm might be useable also for other purposes, e.g. manipulating or picking up objects in the environment. This may comprise moving obstacles blocking the way or opening and closing doors or windows to allow the UGV 210 and/or UAV 220 to move on. Also switches can be used, e.g. for turning the light in a room on or off or for operating automatic doors.

The arm might also be used for rescuing a disabled UAV 220 (that e.g. has crashed or run out of power) and positioning it on the charging station 216 of the UGV 210 or transporting it to a service station for repair.

FIG. 20 shows a third exemplary embodiment of a combined ground-aerial sensor platform system patrolling in a two-storey building. As the UGV-robots are unable to overcome the stairs between the first and second floors, the system comprises two UGVs, wherein a first UGV 210a patrols in the first floor and a second UGV 210b patrols in the second floor. As the drone-UAV 220 is able to overcome the stairs, only a single UAV is needed. The UAV 220 can patrol the stairs, the first floor and the second floor and can be guided by both UGVs 210a,b and land on both UGVs 210a,b for recharging its battery. Also, a memory unit of the UAV 220 can be used for exchanging sensor and/or command data between the two UGVs 210a,b in the different parts of the building.

Figure 21:
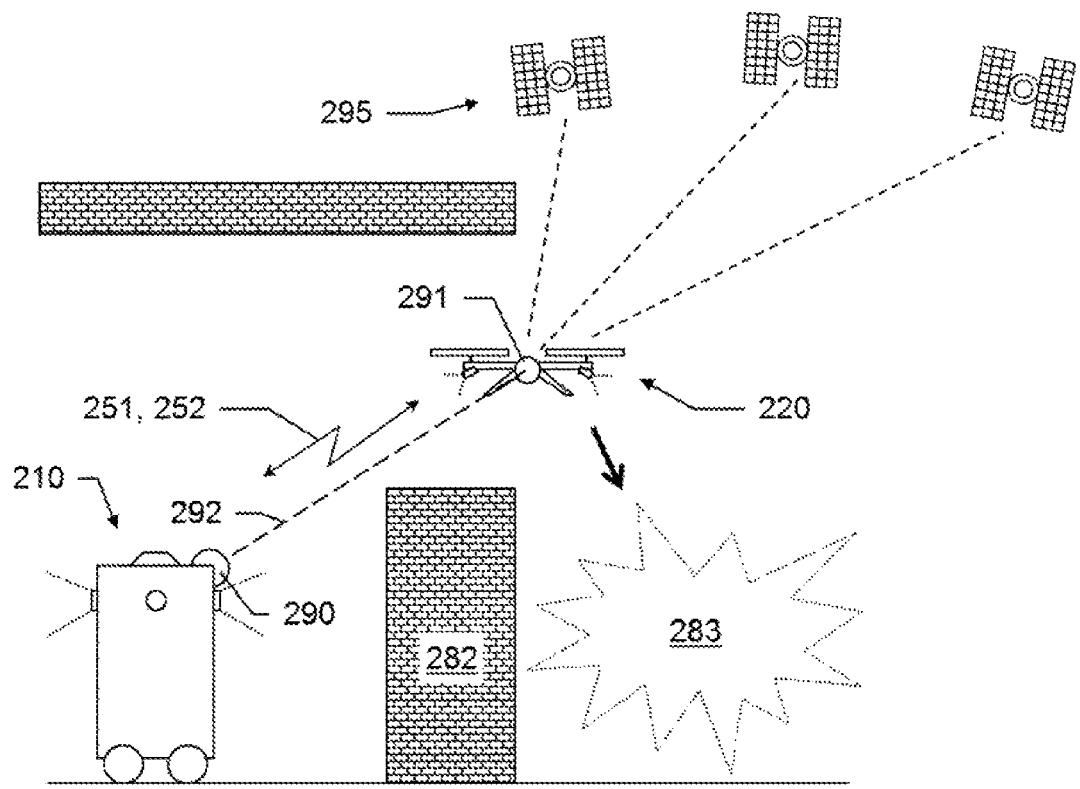
FIG. 21 shows a fourth exemplary embodiment of a combined ground-aerial sensor platform system.

FIG. 21 shows a fourth exemplary embodiment of a combined ground-aerial sensor platform system 200. The UAV 220 is able to conquer obstacles (e.g. the wall 282) and take images of locations 283 that the UGV 210 cannot reach. Sensor data 252 comprising image data of the image of the hidden location 283 can be sent to the UGV 210 for evaluation.

In the shown embodiment, the UGV 210 comprises a laser tracker 290 that is adapted to emit a laser beam 292 onto a retroreflector 291 of the UAV 220 in order to determine the UAV's relative position. Additionally or alternatively, a tracking functionality based on camera images can also be provided.

If the environment is unknown, the UAV 220 can fly ahead of the UGV 210 and provide sensor data 252 for generating a map for path planning of the UGV 210.

Both, the UGV 210 and the UAV 220 are equipped with a GNSS sensor to determine a position using a global navigation satellite system (GNSS) 295 such as for instance GPS. To save electric energy in the UAV 210 (having only a small battery), the UAV's GNSS sensor optionally may be only activated if the UGV's GNSS sensor has no GNSS signal.

Likewise, the UGV 210 and the UAV 220 may be equipped with a radio connection to a command center to report abnormal or conspicuous incidents or to receive updated instructions via a wireless data link (see FIG. 19b). To save electric energy in the UAV 210, the radio connection optionally may be only activated if the UGV's radio connection has no signal. The radio connection for instance can be established over a WiFi or a cellular/mobile phone network.

Figures 22A, 22B:
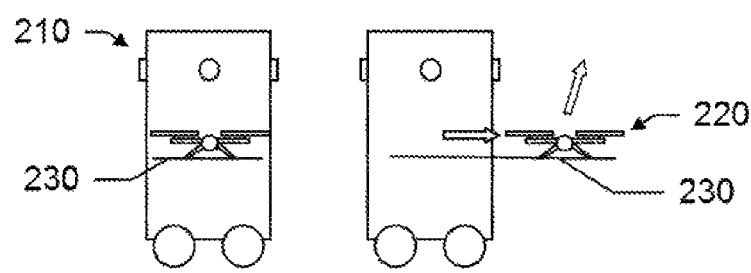
FIGS. 22a-b show a fifth exemplary embodiment of a combined ground-aerial sensor platform system.

In FIGS. 22a,b and 23a,b two further exemplary embodiments of a system are illustrated, wherein the UGV 210 is adapted to provide shelter for the UAV 220.

The UGV 210 of FIGS. 22a and 22b comprises an extendible drawer 230 on which the UAV 220 can land and from which the UAV 220 can take off when the drawer is deployed (FIG. 22b). When the drawer 230 is retracted into the housing 211 of the UGV 210, the UAV 220 on the drawer 230 is accommodated in a space inside the housing 211 providing protection from bad weather conditions such as precipitation or wind. A charging station or battery exchange station can be provided that allows charging or swapping a battery of the UAV 220 when it is positioned in this space.

Figures 23A, 23B:
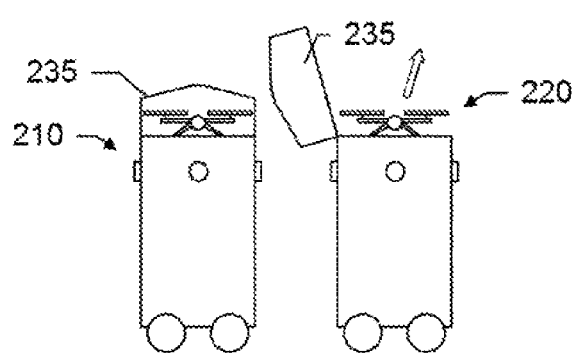
FIGS. 23a-b show a sixth exemplary embodiment of a combined ground-aerial sensor platform system.

The UGV 210 of FIGS. 23a and 23b comprises a cover 235 which is adapted to shelter the UAV 220 when it is landed on top of the UGV 210.

Figure 24:
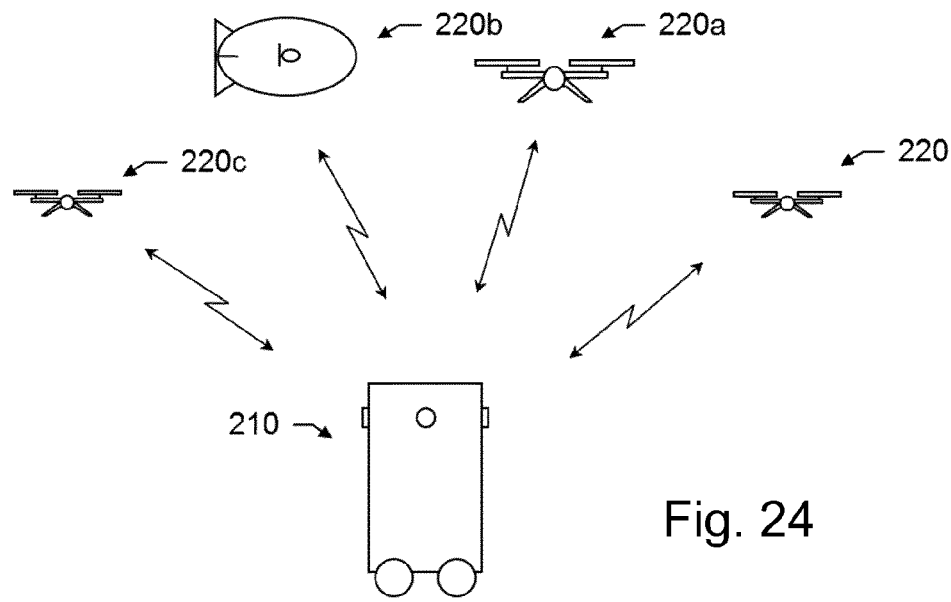
FIG. 24 an embodiment with a UGV and a plurality of UAV.

In FIG. 24, the system comprises a UGV 210 and a plurality of UAV 220, 220a, 220b, 220c. The UAV are all connected to the UGV 210, and the UGV is adapted to receive and evaluate sensor data from all of the UAV, preferably in a combined holistic analytics approach. The UAV can be of the same type or differ in size and kind, as well as with respect to the installed sensor systems. The four UAV that are depicted in FIG. 24 by way of example comprise two small quadcopters 220, 220c, one larger quadcopter 220a and an airship 220b. The larger quadcopter 220a can carry more or heavier sensors than the small quadcopters 220, 220c. For instance, the small quadcopters 220, 220c can be equipped with a simple camera arrangement, whereas the larger quadcopter 220a can have a camera with a superior optics and resolution, and additionally an IR camera or a laser scanner. The airship 220b needs less electric energy for holding a position than the quadcopters and may be used in the open e.g. for providing an overview camera image of the surveillance area from a high position.

The UGV 210 may control the UAV 220, 220a, 220b, 220c, either directly, based on the received sensor data or by sending commands for a certain behaviour, e.g. moving to a certain position and taking images or other sensor data of a certain object.

Figure 25:
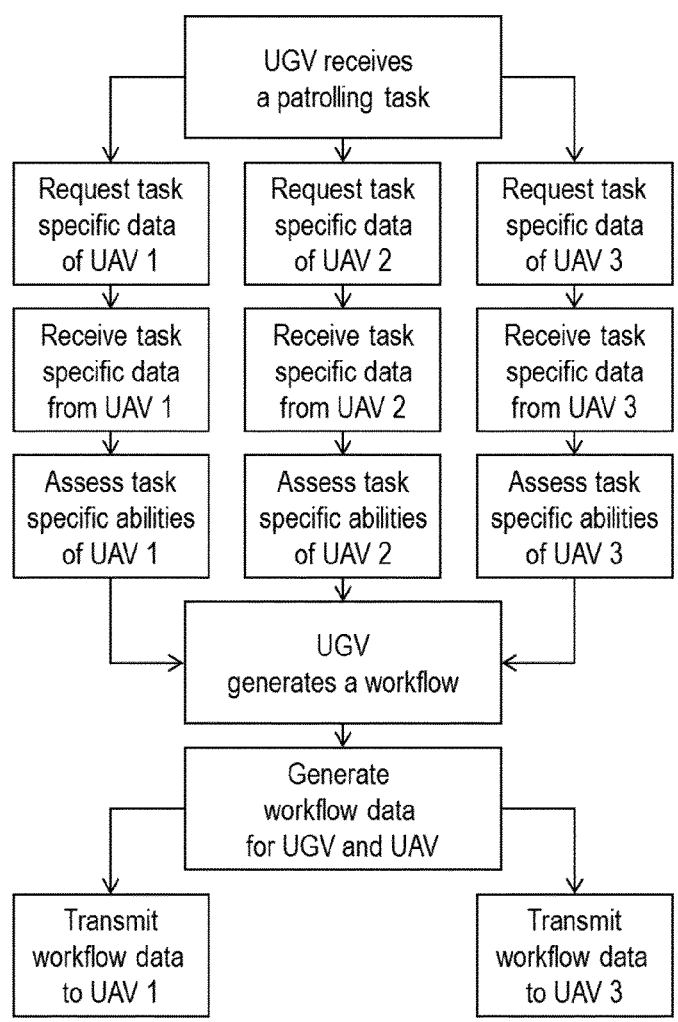
FIG. 25 an example of a workflow generation of a UGV.

The UGV 210 may also be adapted to generate a workflow including itself and one or more of the UAV 220, 220a, 220b, 220c to jointly perform a patrolling task in the area of surveillance. One example of such a workflow generation is illustrated by the flowchart of FIG. 25.

In a first step, the UGV receives a task to patrol a surveillance area, e.g. from a remote control center or directly by a user input at the UGV. The task may comprise further details about the patrolling task, e.g. whether certain sensors should be used or what actions should be performed in case a certain defined event such as an anomaly is detected.

The UAV of the system are self-describing. The UGV requests task specific data of a plurality of UAV (and optionally other UGV) that are available, i.e. within communication range. This task specific data comprises information about properties of the UAV the may be relevant for the task. For instance, task specific data may comprise information about the kind of propulsion, installed sensor components, overall dimensions, a battery status etc.

In this example there are three UAV 1, 2 and 3 available, so that the method comprises three steps that can be performed basically simultaneously: requesting task specific data of the first UAV, of the second UAV and the third UAV. Subsequently, the requested task specific data of UAV 1, 2 and 3 is received by the UGV, and task-specific abilities of the three UAV are assessed by the device. Having assessed the abilities of the three UAV, a workflow can be generated by the computing unit of the UGV. Workflow data for each UAV involved in the workflow is generated in and subsequently transmitted to the involved UAV. In the shown example, as a result of the ability assessments, the generated workflow only involves the UGV and two of the three UAV, wherefore only these two need to receive the respective workflow data to perform their part of the task.

In an alternative embodiment, the workflow is generated on an external device, and the UGV is treated like the three UAV of the depicted embodiment. In particular, the external device is situated at or connected to a command center to which the system of UGV and UAV is connected via a wireless data link.

Especially if the UGV and the UAV are not all from the same manufacturer, the devices can have incompatible software standards that normally prevent them from working together. To solve this problem, software agents can be provided at the single devices that translate data that is transmitted between the UGV and the UAV to the respective machine language. The software agents can be installed directly on a computing device of the UGV and UAV, or—especially if installing directly is not possible—be installed on a module that is connectable to the UGV or UAV. Suitable software solutions are known in the art and disclosed, for instance, in EP 3 156 898 A1.

Workflow generation methods based thereon are disclosed in EP 18155182.1. The orchestration of the workflow can be performed on one of the devices—advantageously the device having the most powerful computing unit. Normally, the UGV has the most powerful computing unit and will thus serve as orchestrator. In this case, for generating a workflow, the task specific data of each UAV is requested from a software agent that is installed on or connected to the UAV, and the workflow data is provided to the UAV via the software agent that works as an interpreter. Alternatively, the orchestration can be performed on an external calculation device, e.g. situated at or connected to a command center to which the system of UGV and UAV is connected via a wireless data link. In this case, for generating a workflow, the task specific data of each UGV and UAV is requested from a software agent that is installed on or connected to the UGV or UAV, and the workflow data is provided to the UGV and UAV via the software agent that works as an interpreter.

FIGS. 26 to 29 relate to a security monitoring system comprising a state detector, a state filter and a feedback functionality.

Figure 26:
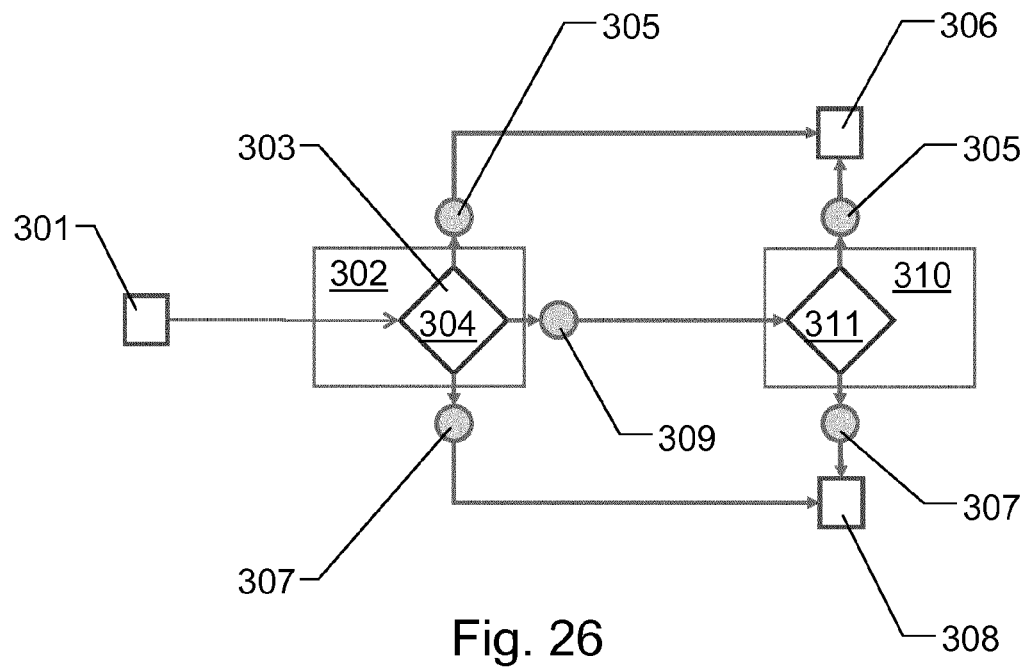
FIG. 26 schematically depicts a generic security monitoring system.

FIG. 26 schematically depicts a generic security monitoring system without feedback functionality.

A state 301 is detected by a state detector associated with one or a plurality of surveying sensors (not shown). By way of example, multiple surveillance sensors, e.g. such as person and anomaly detectors, may be arranged and linked together into a surveying group such that the group is configured to monitor a particular area of the facility and to detect an event associated to that particular area. Alternatively, or in addition, a state detection algorithm, i.e. a common event detector associated to all of the surveillance sensors of the monitoring site, may be stored on a local computing unit 302 and be configured to process surveying data associated to the monitoring site.

Incoming states 301 are then classified by a local state filter 303, e.g. wherein the state filter 303 provides an initial assignment 304 of the state 301 into three classes: "critical state" 305, e.g. automatically raising an alert 306, "uncritical state" 307, e.g. raising no automatic action 308, and "uncertain state" 309, wherein an operator 310 needs to be queried to classify 311 the state.

Alternatively, "critical states" are also forwarded to an operator for confirmation before an alert is raised.

By way of example, the state filter 303 may be based on a normality-anomaly classification model in an n-dimensional state-space wherein a state is represented by an n-dimensional state-vector, in particular wherein a respective class is represented by a section of the n-dimensional state-space.

In case of an uncertain state, the operator 310 classifies 311 the state as either critical 305, and, for example, raises an alert 306 such as calling the police or the fire brigade, or the operator 310 classifies the state as uncritical 307, wherein no action 308 is performed.

Alternatively, or in addition (not shown), an operator may as well review the initial assignment 304 into the classes "critical state" 305 and "uncritical state" 307 and reassign initially classified events into different classes based on his experience and/or certain new regularities characteristic to the monitoring site.

Figure 27:
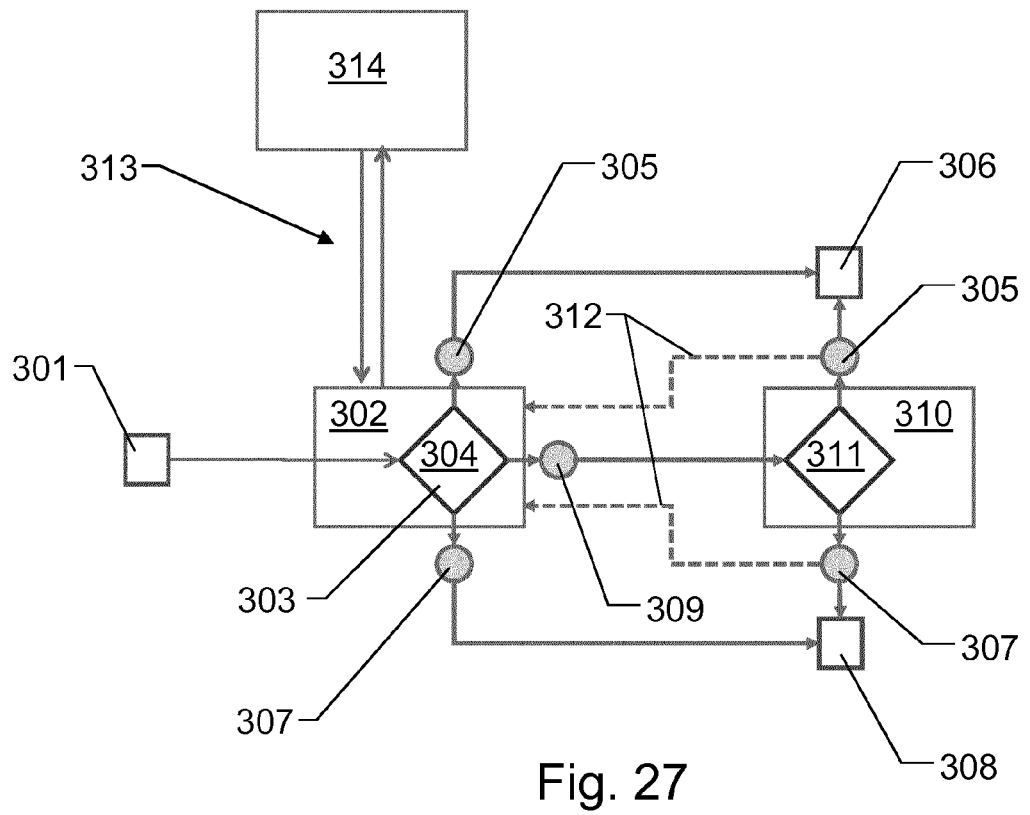
FIG. 27 schematically depicts a first embodiment of the security monitoring system having a feedback and training functionality.

FIG. 27 schematically depicts a security monitoring system, i.e. having a feedback and training functionality.

A feedback loop 312 is introduced, wherein the labeling 311 of uncertain states 309 and/or the reassigning of initially assigned states by an operator 310 are fed back to the state filter 303, as in a typical active learning setting.

In particular, labelling 311 and reassigning of events may occur explicitly, e.g. based on a manual operator input specifically addressed to label states or change assignments, or implicitly, e.g. wherein an operator directly raises an alarm or executes a certain action, i.e. without explicitly addressing an assignment of a state to a certain class.

The feedback information such as the operator labelling and reassigning of states, is processed by a training functionality, e.g. stored on the local computing unit 302 or on a dedicated computer or server (not shown).

By way of example, the state filter 303 may be trained by a machine learning algorithm. Machine learning provides a very efficient "learning approach" for pattern recognition as compared to rule-based programming and can deal with tasks of large complexity, make use of implicit or explicit user feedback, and thus is highly adaptive.

Furthermore, the described monitoring system locally installed on a particular monitoring site may be part of an extended network of many of such local monitoring systems running on a plurality of different monitoring sites, each local security monitoring system bi-directionally sharing 313 its update information with a global model 314, e.g. a global state detection algorithm/a global state classification model, which may be stored on a central server unit or on one of the local computing units.

Thus, the initial local detection and classification model may have been derived from a global model 314, which contains knowledge about critical states and is a quintessence of all local models. Furthermore, during operation time of the locally installed system, the global model 314, e.g. comprising a global state filter model, may be automatically queried in case a is unknown to the local model, before the operator is prompted to make a decision, or the operator of a locally installed monitoring system may manually query the global model 314.

Figure 28:
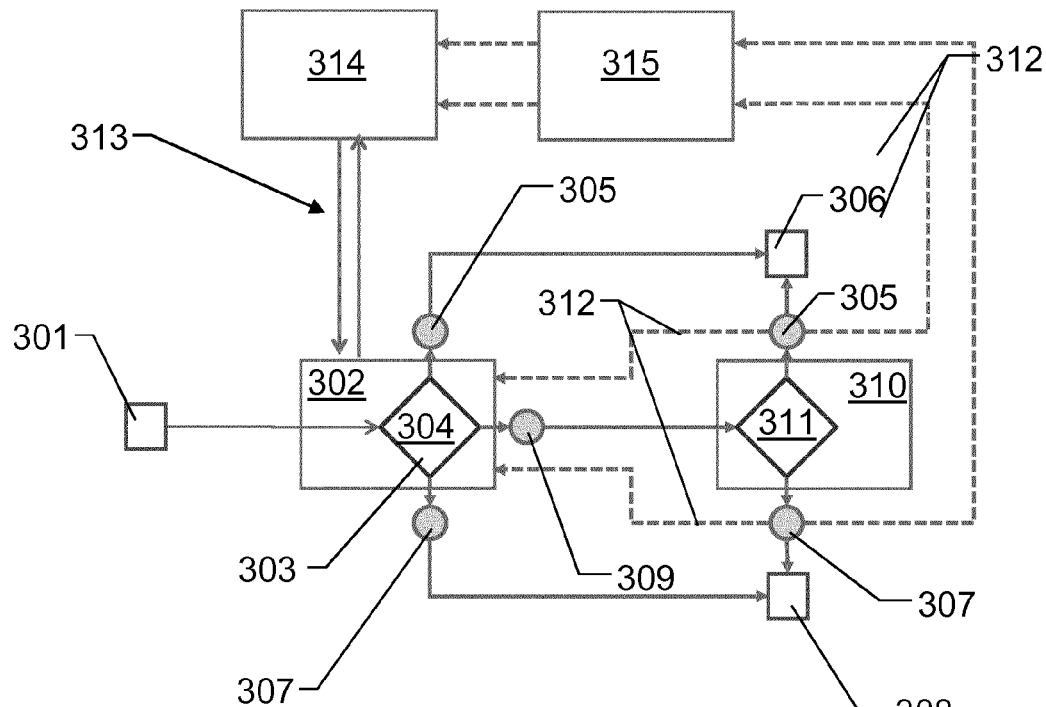
FIG. 28 schematically depicts a second embodiment of the inventive security monitoring system, wherein the feedback loop includes a common classification model.

FIG. 28 schematically depicts a further embodiment of the inventive security monitoring system, wherein the feedback loop 312 comprises not only the local state filter 303 as in FIG. 2, but is extended to include a global classifier as well, e.g. in order to automatically provide update information for a global classification model 314.

Since some local states are only locally relevant, e.g. because different monitoring sites may have different locally defined regularities or workflows which may consider specific access plans and restriction plans for human workers, different danger zones, varying environmental conditions on the site as well as varying site topologies, the global updates for critical states can optionally be regulated through an update manager 315.

Thus, locally relevant special cases as well as globally relevant learning steps are considered to provide an improved monitoring system that allows for more versatile and more robust monitoring and alarming schemes, particularly wherein false alarms are reduced and only increasingly relevant alerts are pointed to an operator's attention.

Figure 29:
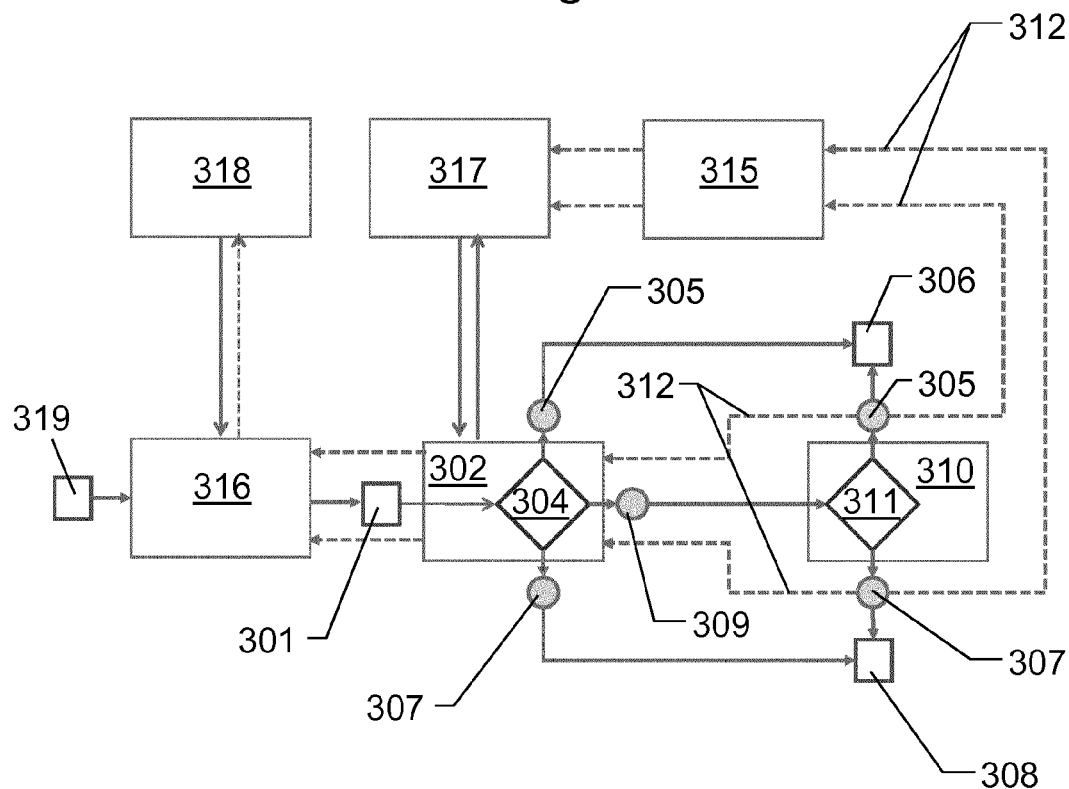
FIG. 29 schematically depicts a third embodiment of the inventive security monitoring system, wherein an event detector is updated in the same feedback loop as used for training the event filter.

FIG. 29 schematically depicts a further embodiment of the inventive security monitoring system, wherein a state detector 316 is updated in the same feedback loop 312 as used for training the state filter 303, e.g. by inferring the label—e.g. "open door", "person", "intruder", etc.—from the operator's decision to label a state as critical or not.

Furthermore, similar to the initialization and upgrading of local state filters 303 and/or a global state filter 317, a global state detection model 318, which is a quintessence of local state detectors 316, may serve to initialize new local state detection algorithms and models to analyse surveillance data 319. Thus, also state detectors 316 are improved over time and local detection models profit from operator feedback at other monitoring sites.

FIGS. 30 to 36*b* relate to an automated surveillance system comprising combined multiple surveillance-sensors.

In the following, without loss of generality, aspects are described taking the person detection task as the use case. FIG. 30 illustrates the particular case of a spatial contextual model of a warehouse as an example of a portion of a building 3 which has to be guarded. In the shown image, there are several regions 90,91,92,93 are highlighted in the image.

For example, a top region 90 is indicated by the overlaid dot matrix. This top region 90 can in this example be ignored by all of the detectors as it is very unlikely to find a potential intruder there. This knowledge can contribute to an acceleration of an automated detection and/or classification task by reducing the size of the search region. By excluding this top region 90, also potential false positives in this area can be avoided. A masking of this top region 90 could be obtained through different techniques. For example, it can be obtained comprising a manual definition by a human operator, e.g. in an initialization and/or commissioning phase. In another, more automated example, a ground plane estimation can be used to determine the floor of the warehouse 3 and based on this information and in knowledge of a typical person height, by identifying the door in the background as reference, etc. any region 90 above this height can be configured to be at least partially ignored in a detection and/or classification of persons in the warehouse 5.

Another example comprises an at least partial learning of this top-region 90 based on data from the surveillance equipment in the warehouse 3. Such learning can comprise letting the detectors and/or classifiers for one, more or all modalities run for a while, in particular during regular and/or simulated use of the warehouse 3, e.g. while staff and/or actors are walking around the warehouse at different times of day, with lights on vs. off, etc. to generate training data. The learning system can then detect and/or classify that there in this top-region 90 nothing, in particular no person, is detected and/or classified for the whole time. Optionally, such an automatically learned result can be provided at least once to an operator, in order to confirm or adapt the top-region 90. In such an adapting, e.g. false detections and/or classifications can be removed or corrected, like those caused by simply false detections, reflections, a box of mannequins on a shelf, etc.

Some or all of the regions 90, 91, 92, 93 shown in this example can be learned thanks to training data. The training data can e.g. be collected with a person standing or walking around the facility 3 at different locations, in different conditions (e.g. with lights turned on/off) wherein the position of the person can be annotated in the training frames, either manually or preferably at least partially by an automatic classification of the person to be a person. As mentions such occurs specifically in the regions 91, 92 and 93. In another embodiment, one or more persons in the warehouse 3 can also at least partially be modeled or simulated in order to automatically generate synthetic training data. Such can e.g. be accomplished by a 3D-model of the warehouse 5 an or by augmenting images of an empty warehouse by images of one or more persons, in particular wherein a plurality of options, persons, poses, illuminations, etc. is automatically synthesized.

According to this aspect, based on such training data, the best combination of classifiers and/or detectors is learned. In particular, the learning is done for each setting, (i.e. for each location like indoor vs. outdoor, first warehouse vs. second warehouse, first view and second view of the same warehouse, etc.), for each environmental setting (i.e. for each time of day, weather condition, etc.), and/or for each given scene (i.e. region in pixel coordinates). Such a best combination that results from the learning of classifiers and/or detectors can therein be either hierarchical or parallel or a combination of those. This step can therein in particular be embodied not to learn the actual detector and/or classifier for the person or object itself, but to learn a combination which works out best, when a certain context or environmental condition applies.

For instance, in the example of the warehouse 3 in FIG. 30, RGB-pictures might be better suited to detect persons in a medium to far distance from the sensor, e.g. as indicated by region 1 91. On the other hand, depth will be a better modality to detect persons within the range of its depth-sensor, i.e. typically a few meters away, as indicated by Region2 92. Globally, infrared will probably be very discriminant to find persons in the warehouse 3, especially in total darkness. Nevertheless—especially in winter—regions with heat sources, like the indicated Region3 93 with a radiator, could potentially create a lot of phantom detections by an IR-detector. In this Region3 93, other modalities, like point clouds, or visual-pictures can take over while IR-detections can be substantially ignored. These specificities mentioned above need not to be manually coded for this specific warehouse 5 site, but those are machine learned by an artificial intelligence unit. As those specificities are reflected in a machine learned computation entity, theses specificities will likely be implemented in form which is not directly human accessible. Although for illustrational purpose the descriptions herein are worded in a human graspable, logical flow, the actual implementation of a best combination will likely be implemented at more abstract level in a machine learned artificial intelligence system.

FIG. 31*a* to FIG. 31*c* are showing different surveillance sensor modalities (in each row) of different Regions1-3 from above (in different columns). FIG. 31*a* shows Region3 at top in an IR-image modality, in which the hot radiator is bright. A detection of a person in vicinity of the hot radiator based on such a thermal image tends to be very error prone or even impossible, respectively a very specific detection and/or classifying approach would be required which severely deviates from an approach in other regions without such a heat source. The evaluability of this modality in this Region3 93 can in particular also be depend on whether the radiator is actually in use, e.g. dependent on the season or on another time information, on the power state of the heating system, and/or on the indoor and/or outdoor temperature, or another actual contextual information for the site in question.

In the middle of this column, a visual-image of Region3 93 is shown, e.g. an RGB-image from a visual surveillance camera. In case of sufficient illumination, a machine learned detector and/or classifier for detecting and/or classifying persons can be detected. Therefore, an evaluation of this modality can depend on the contextual information of an illumination state, e.g. derived by day/night information, information on the switching state of the electrical light in this area, an illumination sensor, etc. In a special embodiment the contextual information of the illumination state can also be derived from a digital picture by the surveillance camera itself, in which a brightness and/or contrast level can be derived. In a specific embodiment, the contextual information can also provide a preference weighting of different machine learned detection and/or classification attempt. For example, in darkness, a classifier specifically trained on the detection of persons with flashlights will be precedented, whereas in case of illumination, a classifier specifically trained on the detection of persons illumined environments will be precedented.

At the bottom, a depth-image is illustrated, which works for the distance of Region 3, but can have accuracy drawbacks when its depth-camera is working based on IR-radiation. Therefore, again especially in the context of a heated radiator as discussed above, such a detection will in general not be favored, as it can result in poor data, falls alarms, etc. Such contextual information can be derived as discussed with respect to the IR-image modality, in an embodiment e.g. also from an intensity information in the IR-image shown at the top. Again, in a specific embodiment, also specific clusters of a classifier for the detection of persons which were learned by the evaluation unit for the range-image can be weighted differently in the detection, based on the contextual information.

According to this aspect a machine learning system based on training data which comprises and classifies the contextual information can learn above described aspects. Accordingly, it is not needed manually hard-code all the above described contextual dependencies, but those are machine learned based on according training data. Specifically, this here shown example of an embodiment has learned a context based segmentation based on a spatial context (e.g. Region1-3 and top region), on an illumination context (e.g. lights on/off, day/night) and on a thermal context (e.g. winter/summer, heating on/off). The machine learning system can therein provide the basic framework for learning such, actual functions, thresholds, etc. are substantially machine learned and not purely hand-coded by a human programmer. This allows e.g. flexible adaptation to different environments and complex systems, while keeping the system easy to manage, adapt and supervise.

FIG. 31b shows the same as describe above for Region1. As there is not radiator, the top IR-image works well for detection. In a sufficient lightning context, also the middle visual image detection works well, e.g. as described above. The range-image at the bottom instead, is not working well, as in particular the dotted, indicated area is out of range for the depth-camera, which will result in no—or at least no valuable—information for the security system. In the context of this region 1, it will thereby be learned to at least substantially omit the depth modality, as the training revealed not reasonable data form the depth modality in this region 1. For example, in fact the size and/or shape of the indicated region 1 can be learned based on the training data, as being defined to establish the context of the region, in which a depth modality will not provide reasonable results and which therefore will not have to be evaluated (which saves computation power and sensing time) or which at least will be considered in the overall surveillance which a lower weighting than the other modalities.

FIG. 31c shows yet the same for Region2. In this region all of the three exemplary modalities illustrated by top, middle and bottom image are found to provide detection data, wherein the system learns that in this spatial context of Region2 data from all the modalities are evaluates substantially equally. Nevertheless, the system also learned from the training data that there is other contextual information, like the illumination context, in which the middle visual image modality will only be applied when there is sufficient light, respectively only context specific clusters of a classifier for detection suspicious or potentially critical persons/objects are applied which were specifically trained in this context, while at least substantially omitting clusters trained in another context (like the discussed person with torch in the dark vs. person with rich texture in light).

Above is just an exemplary embodiment according to this aspect, in which a machine learning of an automated surveillance system is provided with a context information comprised in the training data, in particular—but not mandatory—a supervised machine learning. Thereby, the system learns a best combination (or selection) of the different modalities which will be applied in a specific context.

Figure 32:
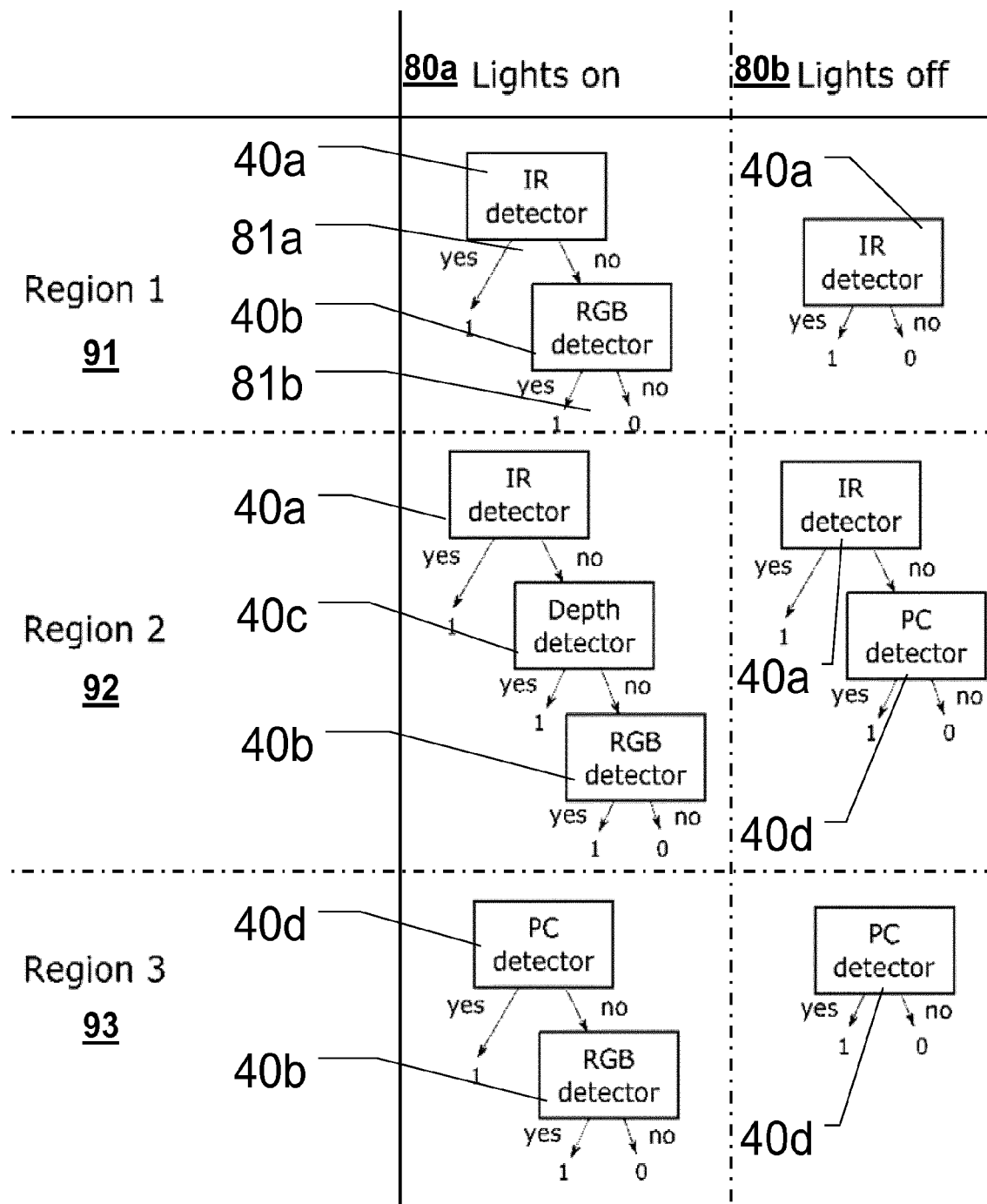
FIG. 32 shows a first example of a context based machine learning result or structure for a surveillance system.

For example, such a best combination can be illustrated to be a hierarchical, tree-like structure. FIG. 32 shows examples of such a structure for different spatial and environmental (lighting) contexts 80a/80b. Specifically shown are examples of hierarchical models learned in different contexts. In the example illustrated is a spatial context (91, 92, 93) from top to bottom, which learns a usage of different models for different image Regions1-3 mentioned before. Also illustrated is an environmental context from left to right, which reflects a lighting context, as lights on 80a vs. lights off 80b. Note that instead of single trees, also ensemble of trees, or forests could be used for each context.

The shown tree structures are self-explanatory. For example, for Region1 91, in the case the lights are turned off 80b, RGB information by sensor 40b resp. the RGB-modality 81b will most likely be useless, and it is probable that the learned models will favor the infrared modality 81a using IR sensor 40a. Optionally and her not shown, despite a complete omission of information from a visual camera, there could be a specific visual detector, specifically trained on the detection of flashlights, but probably not one trained on regular person detection. On the other hand, the system will probably also learn that in the infrared modality 81a, there are constant detections in Region3 93, even when the training data does not contain any annotations for persons there—whereby no valuable surveillance detections are achieved. Another her not shown context would be a possible machine learned finding that such is in particular given, when the outside temperature is low and/or the heating system is actually activated. In latter case, e.g. night and winter, the system might learn that depth images 40c (or point clouds 40d) are the best modality for the detection task in the context of this Region3 93 and in the described environmental context of a cold night.

In a parallel structure, weighted contributions from each modality are evaluated, wherein the weights will be learned for each context. FIG. 33 illustrates an example of such an architecture in which a multimodal fusion algorithm—also called information filter 83—is tuned using training data. Specifically shown is an example of a weighted parallel model for sensor fusion. The weights 82a, 82b, 82c, 82d for the different modalities 40a, 40b, 40c, 40d of the surveillance system are dependent on the context and are learned from training data. In this simple example, there are weight-factors $W_{IR}$ 82a for an infrared detector 40a, $W_{RGB}$ 82b for a visual camera 40b, $W_D$ 82c for a depth image detector 40c and $W_{PC}$ 82d for a point cloud detector 40d—which detectors are combined in an information filter 83, which in this example results in a binary decision 81 of 1 or 0, which reflects whether a security alert is raised or not.

The weight-factors $W_{IR}$, $W_{RGB}$, $W_D$ and $W_{PC}$ are therein not learned as fixed constants, but a being dependent on a contextual variable or vector. The context can therein be derived from the detectors for the modality themselves, in cross combination of those and/or based on auxiliary contextual information or sensors, like a thermostat, a state of a heating system, state of the electrical light system, an ambient indoor and/or outdoor light sensor, etc.

For example, a picture from an RGB-camera can be numerically evaluated for its brightness, contrast, etc. and it can be trained that e.g. in case of low brightness or low contrast the weight factor $W_{RGB}$ will be low—as a self-contained context—while e.g. the weight factor $W_{IR}$ and/or $W_D$ will be dominating—as a cross-combination of context. In fact, the evaluated for its brightness, contrast, etc. can in fact not be explicitly pre-programmed as such but can be machine learned from training data, directly learned on those picture-attributes and/or indirectly e.g. due to the fact that confidence level of a detector and/or classifier will be low on dark or low contrast pictures.

In another example, additionally and/or exclusively, the external context of an On- or Off-state of a heating system or a value from an outside temperature sensor can be comprised in the training dataset of the $W_{IR}$ weight factor to be applied to the IR-modality in Region3 93.

By a machine learning based on this training data, the model can for instance learn that in Region1 91, when the lights are turned on, the weight of the RGB modality $W_{RGB}$ should prevail over the weight $W_D$ of the depth modality, etc.

In other words, one of the main contributions of this aspect can be described is a context-adaptive model for a person and/or object detection in an automated surveillance system. It makes use of training data and machine learning techniques, wherein the proposed algorithms will learn contexts, like e.g. spatiotemporal segments or clusters, in which contexts various types of detectors using different modalities are best suited. In particular, an optimal combination of these detectors, like e.g. in hierarchical, parallel or other structures, can be learned automatically from data for each of the extracted contexts.

FIG. 34a illustrates an example with a bird-eyes view floor plan of warehouse 3, in which an autonomous surveillance system 43 is patrolling in the corridors in-between the warehouse shelves. This surveillance robot 43 is configured with at least a visual RGB-camera and an IR-camera.

FIG. 34b shows an example of a visual picture taken by the RGB-camera in direction of the arrow during a night time paroling. One can probably assume that it depicts the intruder 65 in the warehouse 3, but as it is nighttime, the picture is of very low brightness and contrast, wherefore in particular an automated detector and/or classificatory would—if at all—find the person in the image with a very low level of confidence, probably too low to raise an alarm, as it could be as well not a person but some random item in the warehouse 3.

FIG. 34c shows an example of a, IR-picture taken by the IR-camera in direction of the arrow during the night time paroling. Therein, the intruder 65 is represented and hence a state detected more clearly that in the visual picture of FIG. 34b, in particular with much more contrast to the environment. An automatic detector and/or classifier trained on the detection and/or classifying of persons will be capable of finding the intruder in the IR-picture 40a, probably with a high level of confidence, which will be sufficient to classify as "critical" and raise a security alarm or to trigger any other security event. In particular, when the high confidence of the IR-detection and/or classification substantially matches with the low confidence of the RGB-detection (FIG. 34b) and/or classification, as it can be identified e.g. by the information filter 83 or the structure of FIG. 32 or some combination of such approaches. According to this aspect, the context of night time, which e.g. can be derived from a clock, from a sensor 42a,b, from the RGB-picture itself, etc. which were trained based on according training data which comprised information about this context.

Figure 35A:
FIG. 35a and FIG. 35b illustrate first examples of real word surveillance data in different modalities.

In FIG. 35a, an example of a captured image from an RGB-surveillance camera in a warehouse at night. Due to low light conditions, the image is noisy and there is hardly any color information.

Figure 35B:

In FIG. 35b, an example of a captured image from an IR-surveillance camera at the same warehouse and at the same time is shown. In contrast to the Multi-Megapixel resolution of FIG. 35a, the resolution of the IR-image sensor is lower.

In an embodiment, various sensors for recording multiple modalities can all be integrated into the same sensor device. In another embodiment, the various sensors can be comprised grouped into one or multiple standalone devices. The positions of all or of a subset of those sensors, in particular within a specific sensor group, can therein be fixed with respect to each other and do not change over time. For example, an imaging 3D scanner device (like a BLK360) can comprise color and infrared sensors as well as a laser scanner in single device (or unit or sensor-group). Many of the sensors therein are embodying a specific spatial reference of their sensing capabilities, like a spatial reference frame of a view of camera, an acoustic reference base of a microphone array, a spatial reference frame of a range camera or of a laser scanner, etc.

Therefore, according to an aspect, each of those sensor can be calibrated with respect to a device coordinate system or to a device-group coordinate system—which can optionally also be spatially referenced to a global coordinate system such as the room, building or geographical coordinates. By such a calibration, sensed data of a state can be a matched across multiple modalities e.g. with an inherent transformation of the sensing from the different sensors to a common coordinate system. For example, such a calibration can be established based on extrinsic and intrinsic calibration parameters or geometric transformations from one sensor image coordinate system to the image coordinate system of any other sensor of the setup. In other words, e.g. a projecting of pixel information which was recorded by two or more different sensors, to a pixel-aligned common image reference frame can be established thereby, in particular also across different resolutions and/or modalities.

Figure 36A:
FIG. 36a and FIG. 36b illustrate second examples of real word surveillance data in different modalities.

In the example of FIG. 36a, a nighttime captured image from an RGB-surveillance camera at another location in the warehouse is shown, e.g. captured by a mobile surveillance bot which is patrolling the warehouse or which was automatically ordered to this location due to unusual nighttime noise detected in this section of the building. Besides the fact that the shown scene is likely an anomaly, the shown RGB-image does not comprise much valuable information. There is only some blinding light and some thereof resulting lens-flare visible, whereof not much helpful information for further classifying this potential security state can be gained.

In addition to the RGB-surveillance camera, the mobile surveillance bot is also equipped with an infrared camera or thermal imager, which is arranged right below the RGB-camera. Each camera has a separate objective lens arranged side by side and accordingly a different field of view and point of view, but also sensors with different pixel-resolutions.

Figure 36B:
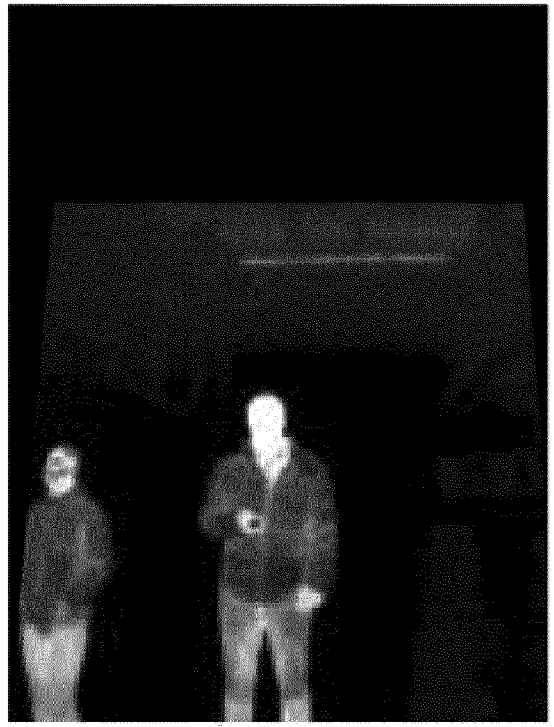

In the example of FIG. 36b, a view of the infrared camera is shown. At least one of the camera images 36a and 36b is provided to a computation unit configured for image processing. This computation unit established a virtual transformation of at least one of the images to establish a substantial pixel-correspondence of the two images from the different cameras, such that after processing, an item in the resulting images will be preferably pixel-accurate at the same location in both images. In an advanced embodiment, the computation unit can therein be configured to derive a four channel image, comprising the three R-G-B-channels from the first RGB-camera as well as the IR-channel from the IR-camera in a single image or dataset having a single frame of reference for all the four channels. This approach can accordingly be extended to other modalities and/or more than four channels into the same image, e.g. by including an additional depth-channel (like from a range camera or a laser scanner), including a spatial sound image information mapped to an 2D image, etc.

For example, in an embodiment, a surveillance-device can be established which provides a 5-channel image or video information, comprising two dimensional pixel-arrays of Red-, Green- and Blue-channels from a camera, plus a fourth IR-channel comprising a two dimensional pixel-array from a IR-camera, plus a fifth depth-channel pixel-array comprising range information from a range camera with its range mapped to intensity information of the picture. According to this aspect, all of the three modalities (image, IR and depth) are therein mapped to a single 5-channel-image or dataset, preferably mapped in such a way that the modalities are combined in such a way that the pixels of each of those arrays spatially corresponds to the pixels of the other arrays. Such four-, five or more channel images can then be used as datasets for the machine learning discussed here in this document. By utilizing such multi-modal four or more channels of spatially already matched data, the machine learning results in multi-modal detection and/or classification can be improved, e.g. as the interdependencies of the modalities will be implicitly given in the training and application data (in form of real word data and/or synthetically rendered artificial data). In particular, such can enable to use the same approaches, algorithms and artificial intelligence structures which are already well established in the art of image processing, but also other modalities than plain RGB-images.

In an example of an embodiment, a visual image can be captured in or transformed to a well-known HSV- (Hue, Saturation,Value) representation or to a HSL (hue, saturation, lightness) representation, instead of an RGB-representation. Therein, the saturation value can be mostly omitted, as it does in general not comprise much valuable information in the present case of a surveillance application, in particular as night time. The saturation channel can therein e.g. be replaced or substituted by a distance channels from laser scanner or range camera, resulting in three channel HDV (Hue Distance Value) image. In another embodiment the saturation could also be replaced by an IR-channel or by another modality. As discussed before, such is preferably done with a pixel-accurate matching of the distance and the image information by an according transformation of one or both information. Such a HDV-image can therein e.g. be processed in a similar or even in a same way as an ordinary HSV or RGB image in the machine learning, evaluation, artificial intelligence systems. According to this aspect, a surveillance application can gain improved detection results by using HVD-images instead of HSV- or RGB-images. Further the amount of data can be reduced as only three channels are required instead of four.

FIGS. 37a to 43b relate to a surveillance system with a machine learned detector and/or classifier.

Figure 37A:
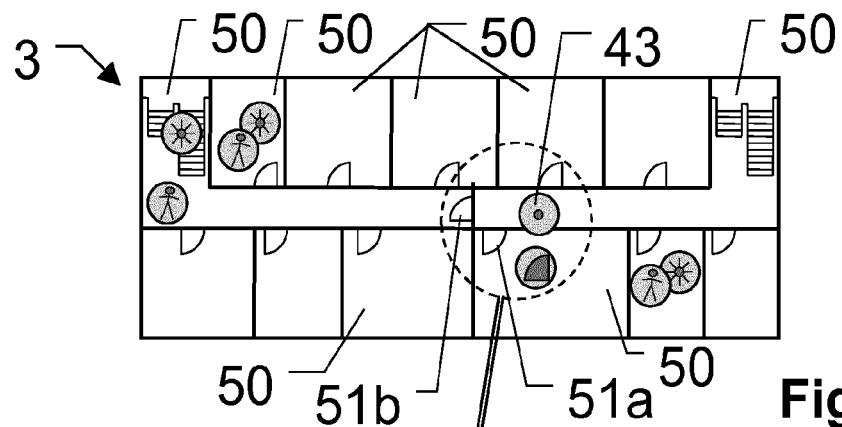
FIGS. 37a-b show an exemplary embodiment of a floor plan of a site or building to be surveyed.

FIG. 37a shows an example of a portion of a building 3 which has to be guarded, using a surveillance robot 43. The here shown main building parts 50 are mainly rooms, to which doors 51,51a,51b (as examples of building elements) are leading, which doors have to be closed during night time.

Figure 37B:
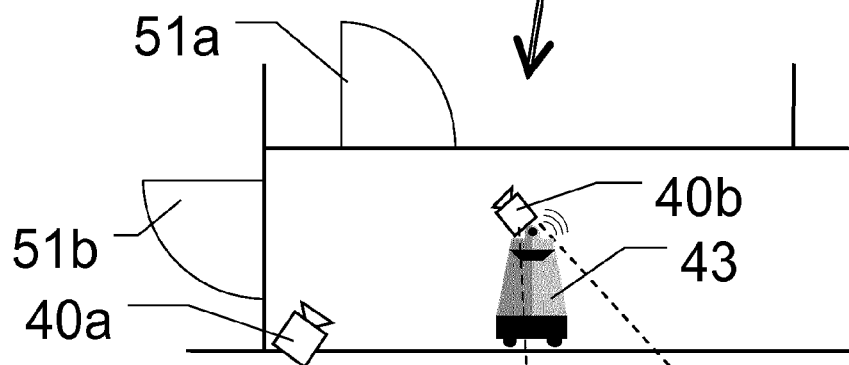

In FIG. 37b there is the marked subsection of FIG. 37a shown, in which there is an example of a mobile surveillance robot 43 comprising a camera 40b as well as a fixed (but probably tiltable and/or turnable by a motor) surveillance camera 40a. In practical embodiments either one or both of those surveillance devices can be present. By observing the corridor, it is intended to automatically detect and classify security threats. In this example in particular the doors are inspected.

Figures 38A, 38B, 38C:
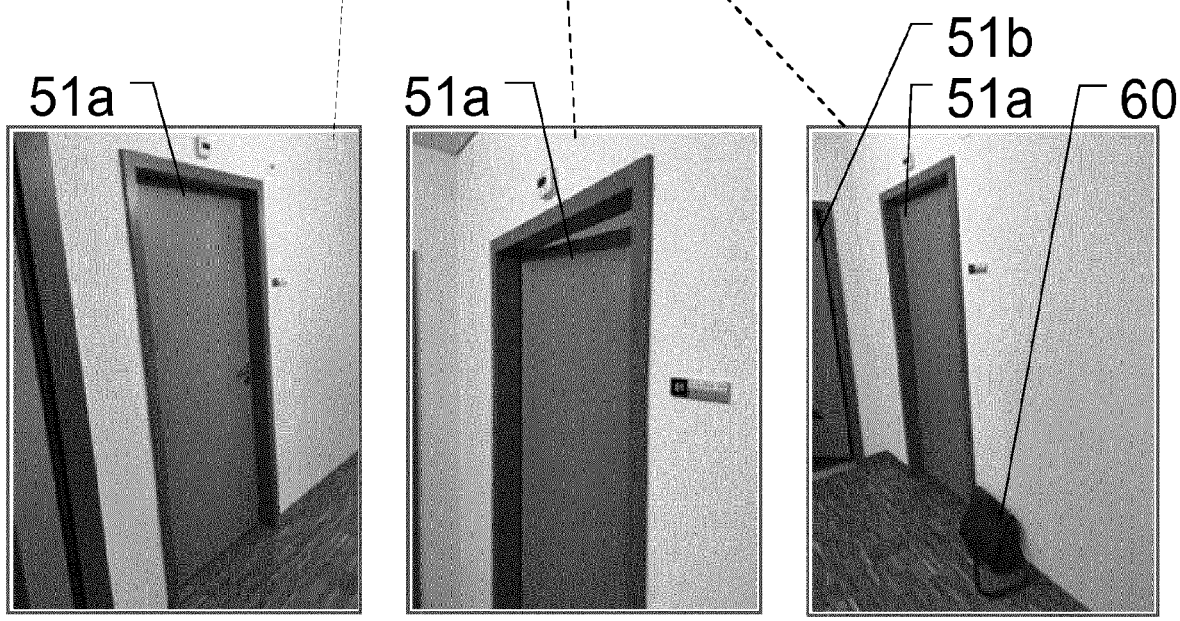
FIGS. 38a-c illustrate an example of real word images from a building or property under surveillance.

FIG. 38a shows an example of a picture as it could be taken by the camera 40a, showing the door 51b in a closed state as desired and normal state, in particular at nighttime.

FIG. 38b shows an example of a picture as it could be taken by the camera 40b, showing the door 51a in a partially open state which is abnormal and a potential security event to be detected and categorized as a potentially critical state by the surveillance system.

FIG. 38c shows another example of a picture as it could be taken by the camera 40b, showing the door 51a in a normal state. But still, there is an obstacle 60 beside door 51a at the floor—which is abnormal and a potential security event to be detected and categorized as such by the surveillance system. According to this aspect, the detected state of an obstacle 60 being present can be classified to just be a common laptop-bag 60, which got forgotten by a known worker. The system can therein automatically evaluate that this bag 60 at the present location is not qualifying for a risky security alert, but can for example only produce a low level security warning or a simple log-entry. In another embodiment, such evaluation could be programmed or trained to be classified differently, e.g. at public places where unattended luggage could be used for a bomb attack, or e.g. if the location of the bag 60 is at an escape route which has to be kept clear or e.g. the bag 60 is detected at a location where such a bag 60 is not likely to be forgotten, e.g. dangling from the ceiling, etc. But in this example of a picture the fire-door 51b at the left is shown open, which event, once detected and classified as resulting in a critical state, needs further inspection and corrective action to be initiated.

As mentioned the present disclosure can establish such a detection and/or classification of security states by an artificial intelligence system, which has been trained to find and identify such states in data from one or multiple sensors of the surveillance system comprising devices like 40a, 43, etc.

In particular, machine learning approaches can be established, specifically comprising a classifier and/or a detector of pre-trained aspects. In many embodiments, visual or visualizable sensor data like RGB-images, depth-images, IR-images, etc. are used as sensors, although the presently discussed aspect is also applicable on any other surveillance sensor data information. For example, the image content can be represented in a vector space, e.g. as a Fisher Vector (FV) or vector of locally aggregated descriptors (VLAD) and classified using various classification techniques like Support Vector Machines, decision trees, gradient boosted trees, random forests, neural networks, including deep learning approaches like convolutional neural networks, as well as various instance-based techniques like k-nearest-neighbors, US 2015/0178383, US 2017/0185872, US 2017/0169313. In order to detect and/or localize objects in a larger scene variants of region proposing methods can be used, e.g. Sliding Window/Shapes, R-CNN variants, semantic segmentation based techniques, etc. In both object detection and recognition additional modalities like thermal images and especially depth images can be used directly, e.g. Sliding Shapes, or as additional image channel.

As said elsewhere, such systems require training data, preferably annotated or tagged with meta information describing the content of the training data, in order to teach the system. According to the disclosure, such meta information can comprise information of a basic class of an item reflected in the sensor data, such as e.g. a door or a bag as a class for a classification, but can also comprise sub-classes and other meta information, like a specific type, size, color of a bag up to information on physical constrains that are common for such a bag, like lying on the floor or at a chair or table, carried by a person, etc. Those meta information can be learned as well during the training phase, e.g. in a kind of supervised learning, wherein the meta information is used is used as a basis to derive supervising information. In other embodiments discussed elsewhere, also semi-supervised or unsupervised learning approaches can be used, in particular also combinations of unsupervised, semi-supervised and/or supervised learning approaches for different machine learned aspects in the surveillance system can be used—e.g. dependent on whether of data and/or algorithms for the supervising are available for a certain aspect or not.

The detected real world object can therein e.g. be classified to be a certain object, to be within one or more certain object-classes and/or to comply or comprise other object-specific properties and/or object associated meta information. For example, such automatic detecting and classifying can be done by a computation unit or processor which comprises a detector and/or classifier, to which a digital real world picture from a camera is provided. On basis of this information algorithms can be applied (e.g. a person detection algorithm, etc.) and thereof a specific state can be detected, like a person is present, a door is open, etc.

In combination with one or more of the herein presented aspects, this aspect aims at improving the ability of generalization in an automated decision making process in a surveillance system. The embodiment involves augmenting a training set for such an automated decision making, e.g. embodied as a neural network, by synthetically created or synthetically augmented training data.

Besides the mere possibility of training states and scenarios which cannot be re-enacted with reasonable effort, such synthetic data can comprise the additional advantage that once the generating function is implemented, an arbitrary number of samples can be generated on this basis. The synthetic samples can then be used to prepare a decision maker, in particularly also alongside with real data samples.

Another great advantage is that it is simpler to provide corresponding meta information related to each training data in an at least partially synthetically generated approach. While in case of training a system based on real world images a human operator often has to classify the training data manually, like defining what this data actually shows, if this data is normal or abnormal, if there are certain restrictions to be applied, etc. In at least partially synthetically generated training data, also this classifying and/or tagging of the data can be automated, as it is clear from the model from which the data is generated what is shown in the current data instance that is preferably automatically derived from the model—at least for large groups of the synthetically generated data.

For example, given an application where the task is to determine if something is normal (for example a security door is closed at night) or abnormal (security door open), the expected distribution of training samples captured in a real world environment is generally shifted towards the normal case (of closed doors). Collecting samples of the abnormal case can be tied to enormous effort, as for example the installation must be changed in various ways to reflect a reasonable plurality of different abnormal situations that could occur practically. For especially critical or high-risk applications in high security areas (i.e. prisons, military areas, nuclear power plants, etc.) the collection of even a few abnormal data samples can be unduly risky or even impossible. However, especially in such applications, a successful detection of those events is highly desirable—even though such data can not be practically observed during the training procedure—at least not in a reasonable percentage in the distribution of the different training samples which were taken.

In contrast thereto, synthetic samples according to this aspect can be freely generated in various realizations of the abnormal state to help the decision maker, automatic state detection or criticality-classification means with its decision. For example, such a synthetic generation of virtual samples allows generating an equal amount of training data for the abnormal state of security events as for those of the normal state.

Task-specific synthetic data which was virtually generated, e.g. by a numerical rendering of images or other data from a computer model, has not only the advantage that data that is difficult to obtain can be synthetically generated, but also the advantage that the data collection effort is substantially constant with respect to the desired number of samples. The common prior art way of collecting data is to go to the object in question and record it extensively, in particular from different points of view, in different object states with different illuminations, with partial obstructions, etc. The amount of data that is created thereby is directly related to the time spent for recording and the effort taken to modify the scene to reflect different object states.

This is vastly different for synthetically created data according to this aspect. Effort must once be put into creating the generating function, model, parameter modification strategy, etc. However, once this is accomplished, arbitrary amounts of data samples for the training—abnormal as well as normal—can be automatically generated without additional manual effort. For example, a high-performance computing or server-system can establish such training data generation substantially unattended. Such can in particular be useful in transfer-learning approaches.

In the following, a number of use cases are introduced at the example of an autonomous security patrol robot as discussed herein—but this aspect is not only applicable to mobile units but also to stationary equipment. The first use case is anomaly detection for high risk applications. Consider the task of surveillance of a warehouse. An autonomous security agent is taking a predefined route and reports states or anomalies along the way. The route can e.g. be a predefined patrolling route or a route automatically derived by the security agent learned from training data (e.g. with the goal of covering all of the warehouse or at least the potentially critical building elements like doors, windows, etc.) and/or can be event driven based on anomalies detected from other sensors, or even a mostly random path derived by an autonomous navigation unit. In this case, examples of anomalies can be doors or windows that are open but should be closed, persons that are not supposed to be there or items that are misplaced (i.e. a box blocking a corridor), etc. To accurately detect any of those anomalies by an automatic system, a large amount of data for each of the different sub-tasks (person, door or misplaced item detection) is necessary in as many variations and combinations as possible to have reasonable diversity in the training data.

Figure 39A:
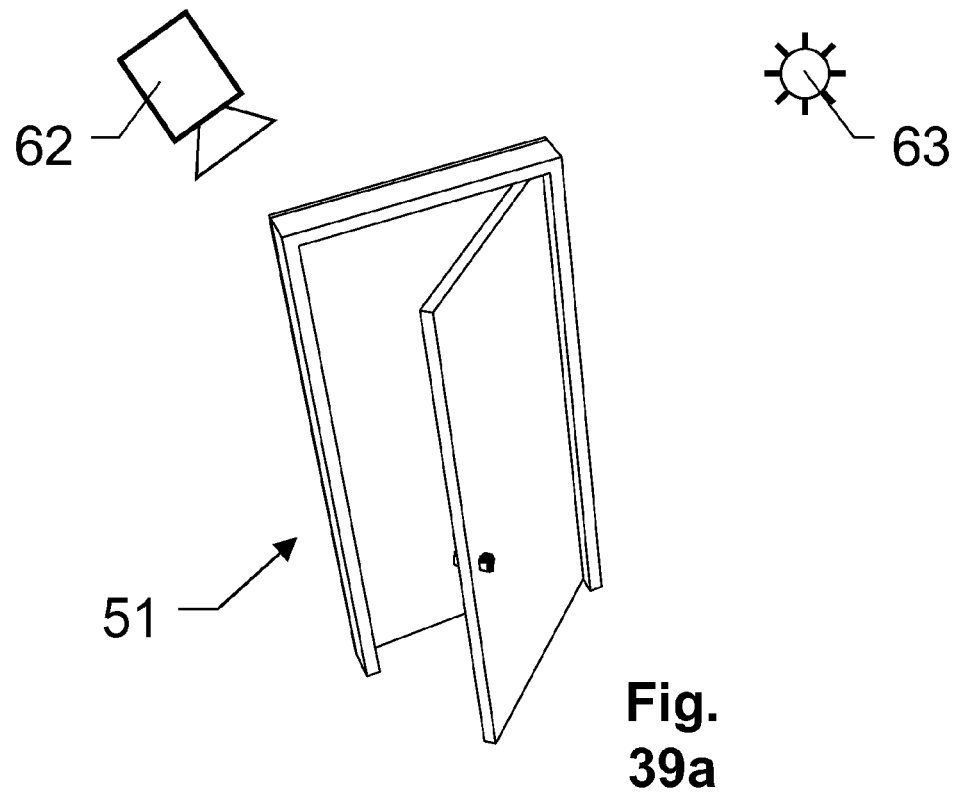
FIGS. 39a-b show an example of a 3d-model and virtual rendering by example of a door.
Figure 39B:
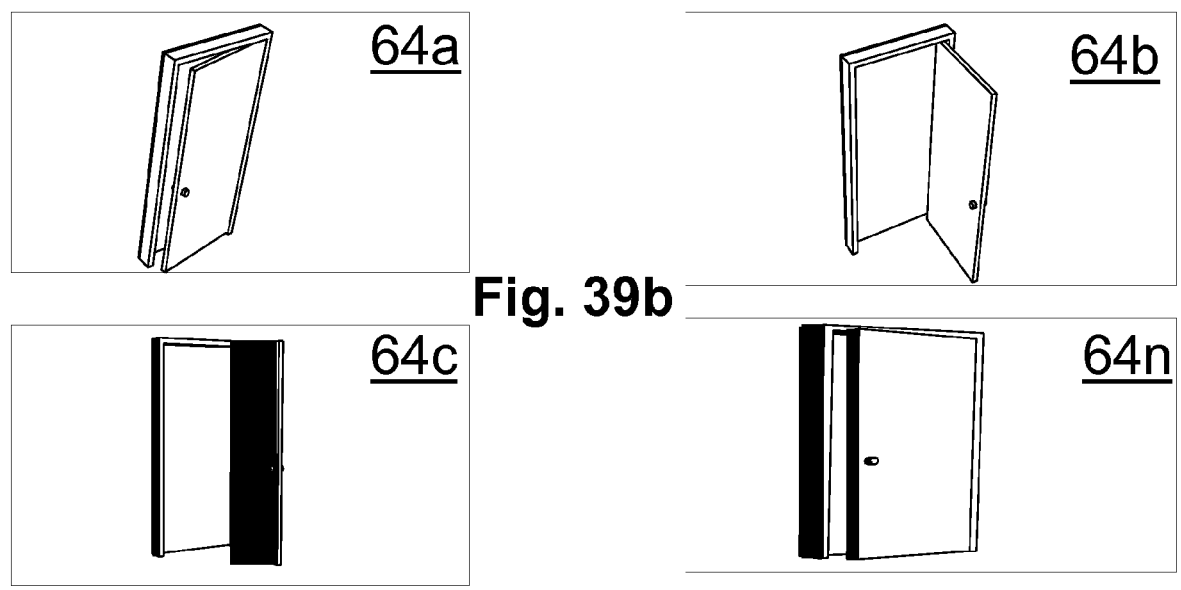

The inventive aspect of an at least partially synthetic creation of data samples can bring advantages over a mere manual on-site recording. For example, as shown in FIG. 3a, the representation of the acquisition object in such a synthetic model, like a digital 3D-model of the object on a computer, can be changed and modified as desired. Specifically shown is the example of a digital 3D-model of a door, e.g. represented in a CAD-software. For the illustrative example of using visual camera pictures of the surveillance system for the detection and classification, the digital 3D-model can be numerically rendered by a computation unit to synthetically generate a plurality of artificial images of the door 51 as training data, e.g. as shown in FIG. 39b.

In the generation of the training data, there are many parameters which can be varied, such as the point of view 62 and/or the illumination 63. Thereby, a whole series of virtual or synthetic training data can be synthesized, reflecting the door 51 in many conditions as they can also practically occur in camera images. Besides a variation of e.g. viewpoint, light and shadows, also the object itself can be modified in its parameters, e.g. in its opening stage, in its material, in its color, in its size, in its proportion. All, or at least most of this can be done automatically in a substantially unattended workflow by a computation unit. Thereby, as said, not only the synthetic training data alone can be automatically generated, but the training data can also automatically be enhanced by automatically generating meta data indicating the content of each of the training data, which can then be used for a classification of each of the training data or to train a specific of those aspects reflected in this meta data. For example, the numerically rendered images 64a, 64b, 64c to 64n reflect some examples of different variants of the 3D-model of the door 51 shown above. A computation system can generate thousands and more of such training data items which are according to this aspect used to train the security system. For example, to automatically evaluate the real world camera images of FIG. 1a, FIG. 2b or FIG. 2c by a system, which has been trained on the virtual training data as shown in FIG. 3b. The computation system can therein not only generate static scenes but also sequences or scenarios of security related courses of events to be detected and/or classified.

Doors 51, especially critical ones, can be modeled as open or ajar and virtually recorded from many different viewpoints without having to risk to actually physically opening the real door. This synthetic generation can also help to overcome a bias in the distribution of taken real world data samples towards the normal closed state. As the anomalies of an unclosed door are very rare in the real world, it can be expected that a real world data acquisition will only result in very few samples (unless substantially more effort is put into manually creating such an anomaly with a higher abundance than it would naturally occur). For synthetic data however, the distribution can be arbitrarily set as desired to achieve a well-trained classifier and/or detector.

In another example of an embodiment, a case is considered in which the surveillance robot is equipped with more than one different surveillance sensors as discussed herein, in particular for example an RGB camera and a depth sensor. Such multi-modal detection systems commonly use information from each available sensor and combine or integrate this data to create more informed decisions than when considering only a single sensor. However, the multi-modal system first has to learn how to interpret the—sometimes even contradicting—information from those different sensors. The proper interpretation has therein to be inferred from the gathered data. To prevent an over-fitting in the learning process, additional data can be helpful in many embodiments in order to achieve more realistic and robust results. For example, also additional data that is not directly valuable and used to train the classifiers and/or detectors in the direction of the actually intended purpose, such a noise, disturbances, etc. can be subjoined in the training data, e.g. at random. Thereby, the classifiers and/or detectors can be tuned to a more realistic read-out mechanism of the actually available sensors in real world, also tackling potential deficits, deviations and failures of the real world sensors. Such additional data can be derived from the real world sensors and/or can be simulated. Synthetic data creation according to this aspect can be a helpful tool for such scenarios, in which multi-modal input data is needed in large quantities. Furthermore, in such a synthetic data creation, the configuration and calibration of the sensors with respect to each other can be freely set and also varied if required.

In the example of the door state detection in the exemplary warehouse setting from above, with an RGB and depth sensor configuration, the aspect can be embodied as follows. In a 3d modeling software, the environment of the warehouse can be created with the desired monitored object comprised as a virtual model of the door. A therefore provided scripting mechanism can be configured to provide the ability to procedurally change the appearance of the object in question. This can include for example a visual appearance due to material properties (i.e. metal surfaces, wood or plastic), lighting configurations, point of view and frustum of the sensors which are used to capture the warehouse scene. On this basis, physically correct materials can be applied in creating photo-realistic render images. For example, an RGB channel and a depth of the scene can be inferred from the model using ray tracing to create data analogously to what a depth sensor captures. Such depth images can be derived as real world pictures by a surveying or metrology instrument, e.g. by using a RIM-camera, a laser scanner, a structured light scanner, a stereo imaging unit, a SLAM evaluation, etc. For the training, such depth images can also be rendered from a virtual digital 3D-model by known approaches, similar to the rendering of 2D images already described. In particular, the present embodiments can be worked with a combination of 2D and/or 3D pictures and images, for a completion of information for the automatic detecting and/or classifying. Another option for such 3D information would be the use of synthetically generated point cloud data, either directly or to derive a depth image thereof. Optionally, there can also be artificial noise added to one or several of the sensors. For the depth sensors for example, a usable range can be artificially defined with a random noise which is simulated and added beyond this range—which noise even can be determined in a suitable distribution as demanded. The synthetic data that is created in this way reflects all the variations that were encoded, in suitable and definable quantities, and can thereby yield a more robust classifier after training than achievable by pure real world training.

The same method principle can be generalized to other modalities and sensor data as well. For example, data from an IR-camera-sensor can be synthetically generated in a similar manner by giving humans a different textural appearance based on simulated body temperature and thereby virtually generating thermal images 66 of intruders 65 in factory hall 3 by a mobile surveillance unit 43 as indicated in the floor plan of FIG. 40*a*, etc. Therein, e.g. different clothing can be modeled accordingly to absorb some of the simulated body heat, to give rise to plausible data samples, which can be used for the training. For example, FIG. 40*b* shows an embodiment of a virtual, synthetically generated IR-image of a person which was numerically rendered according to digital model indicated in FIG. 40*a* by a computation unit. According to the disclosure, a plurality of such synthetically generated IR-image 66 can be generated on this basis by varying the lighting, the pose, the person, the clothing, the environment, the point of view, etc. in the digital model, wherein this varying is preferably done automatically by the computation unit, for example according to subroutine-scripts. Such additional information can e.g. be represented in the picture and/or image in form of an additional "channel", which is also considered in the detecting and classifying—like an additional depth (D), temperature (T), IR (I), UV (V), etc. channel besides e.g. the Red/Green/Blue (RGB), Hue/Saturation/Value (HSV), Hue/Saturation/Lightness (HSL) or Hue/Saturation/Intensity (HSI) channels of a visible image or picture. An automatic detector and/or classifier trained on such synthetically generated IR-images 66 can then detect and/or classify an intruder with a high level of confidence.

In another specific embodiment or in a combination with the previously described approach, there is a direct training of the detector and/or the classifier based on the digital 3D-model itself—without explicitly rendering images and providing those rendered images as training resource. For example, the 3D-model itself (e.g. in form of CAD-DATA, point cloud data, mesh data, etc.) is feed as training input. As an example, a vector representation of an image can be approximated directly from the 3D model or its processed representation for instance a voxel grid. Another possibility is a technique using a feature predictor that, with defined perspective and lighting description, utilizes local geometry and material information to predict subsets of features. What is more, the similar technique can be used to augment already a present representation of an image content to e.g. properly model noise of the process or simulate the observed object in deferent contexts. For such an approach, in particular a deep-learning approach can be used, e.g. comprising a neural network. For example, in training such a neural network, the first hidden layers could be directly activated from the 3d-model and create a response that would be expected from a real image of this object. In the on-site classification of real world data, those first layers are replaced by one or more layers that are based on the real world image. For example, a connection between the new layers and the old network can be fine-tuned using a combination of synthetic 3d model and real world image data.

Another example of an embodiment of the method according to this aspect as illustrated in the floor plan of a site 3 in FIG. 41 is an object monitoring from different, mounted sensors, such as e.g. surveillance cameras 40*a*,40*b*, 40*c*. Therein, each camera 40*a*,40*b*,40*c* can only observe a limited (and sometimes even fixed) portion of the whole site, property, building, element or object to be covered by the surveillance. For example, by suitable automatic detectors and/or classifiers for persons, each of such cameras 40*a*, 40*b*,40*c* can create a partial profile for each person that walks through the camera's field of view. In combination, such a system comprising multiple cameras 40*a*,40*b*,40*c* can automatically track, derive and analyze a trajectory 67*a*,67*b*, 67*c* for each person, preferably wherein the person is also classified to be a certain person or belonging to a certain class or to certain classes of persons. Based on such a trajectory 67*a*,67*b*,67*c*, a common behavior of the person can be automatically extracted and/or learned by an artificial intelligence system. Besides spatial and/or image information, such an approach can in particular also comprise a time information in the training data. Such is also referred to as a synthetically generated scene or sequence which can be used as training data for a detector and/or classifier in a surveillance system.

For example, a normal trajectory 67*a* always starts at the entrance door of the building and continues to the person's office, then by trajectory 67*b* to the coffee room, the restroom or another office and back to the own office. Later on, the building is left again through the main entrance door as shown on trajectory 67*a*.

In such a scenario, natural constraints prevent unrealistic trajectories 67*c* from appearing, such as being seen in the second floor without having used the stairs or the elevator. An automatic decision maker or classifier can then analyze the trajectories and detect if those are normal or abnormal, classify them to be critical or not, and—if necessary—decide to trigger some action.

However, because sensor failures can occur, or simply by occlusions which are preventing a person from being detected, many of the trajectories can be incomplete—like in the shown example, where there is no camera at the stairway. For a decision making system to decide if a partially observed trajectory is normal or abnormal, a large set of labeled data is needed, for example to utilize a supervised machine learning approach. Also in this embodiment, the synthetic data according to this aspect can be applied to gain advantages, in particular in view of an automating not only of the detection and classifying, but also of an automation of the training of the therefore used detection and classifying units.

First, a virtual scenario like described above, can easily be created and simulated by a synthetic modeling and optionally also by sampling plausible trajectories from real world observations. Sensor failures, partial obstructions, etc. can therein be incorporated naturally by omitting some parts of the sampled trajectory in the modeling. Besides those normal scenarios, there can also be abnormal scenarios derived from the simulation which comprises anomalies, e.g. trajectories 67*c* of potential intruders or the like. For example, such abnormal constellations can be generated by deliberately disabling some natural constraint in the model. Such can comprise things like simulating a camera view of a trajectory 67*c* which picks up a person in the second floor, without the person having passed the main door—because he entered the building through a window. The automatic state detection system is thereby able to pre-learn the thereof resulting characteristics in the surveillance data, which make up abnormal trajectories 67, before such a critical state ever happened, which e.g. allows a supervised classifier to specifically learn to classify and/or detect such states. This can involve transfer learning, but according to the present disclosure can also synthetically generate virtual sensor data from a digital model to be used as training data that is tailor made to the actual site.

For example, another embodiment of such a state pattern or sequence of events at an office location, which can be synthetically generated from the virtual model can comprise the events of: an "open door" event, a "turn on light" state and a "turn on PC" event. In the context of morning or daytime such a simulated state pattern is machine learned as being normal. At night time, such might be rather rare, but it can also be noncritical in view of someone working overtime or the like. But e.g. the sequence from above without the "turn on light" event, is also uncritical at daytime, but at nighttime such can be machine learned as a critical state, since it will likely be a burglar to steal data.

In other words, in an embodiment not a state itself can be considered critical or not, but a state which comprises multiple detections (and optionally also context data) can be defined to be classified as critical. Optionally it can also be trained to automatically trigger a certain action and/or which action is adequate for a certain critical state. Detecting an anomaly only means that there is a significant deviation in the sensed data that diverts from regular data, but such does not necessarily imply that such is critical in the present context, wherefore a classification of a whole state is established.

In the state detection, a specific state is detected in the sensed surveying data (like in an image or video stream) based on applying an algorithm—like a state of a person being present—e.g. by a person detection algorithm, a state that a door is open—e.g. by a camera or by a door switch, etc.

Based on the combination of one or more states, a classification of a state for being critical or non-critical can be established, but such in many cases also depends on contextual data as well, such as the location in the building, the time, the floor, etc. In case the state is critical an action, e.g. call the police or the fire brigade, etc. has to be performed. Such action can either be initiated automatically by the system or after some confirmation by an operator working in a central security company. A non-critical state can be ignored, but can anyway be logged to a surveillance storage system, e.g. in form of state information, actual images of the state and its classification, date, time, etc. Such log-data can for example be used to fine-tune the detection and/or classification algorithm that was learned.

As another example a state "Open-window in room 03 (ground floor)", the state "Door of room 15 opened", but no state "Light switched on in room 15", at 3:15 a.m. can be artificially generated according to the present aspect, and the thereof resulting state can be trained to a classifier to be a critical state which requires an action, as it indicates and intruder.

An example of a non-critical state could be sequence of a person is entering the building through the main entrance (open-door state—door 01), walking to the office door, opening the office door (open-door state—door 12, about 23 sec. after door 01), turns on the light (power-on event, about 2 sec. after door 13), walks to the desktop, turns on the PC (power-on event, about 10 sec. after light on), etc.

Besides or alternatively to raw surveillance sensor data, also these patterns of events can be generated synthetically or simulated, e.g. manually or based on an automatic process. Manually means that a person is performing a defined procedure (opening a door, turning the light on, at certain times of the day, etc.), which resulting state pattern is then captured and labelled, e.g. as uncritical state. Therein also semi-automatic modifications of the procedure in a defined variable or environmental condition can be automated to derive greater variability in the training data. But also an automatic process of synthesizing state patterns implemented, e.g. based on a rule-based system, based on expert knowledge, an expert system, etc.

According to the disclosure, for example a rule-based expert system can simulate such states synthetically in order to generate virtual training data for training. In the evaluation of real world data while monitoring the security of a building, the events like "turn on light" or "turn on PC" can be derived directly from the physical devices (e.g. in a smart-home environment, by log-files from the PC, by a server or a network, etc.). Alternatively, such real world data can also be derived indirectly, e.g. by monitoring power consumption at the mains supply (etc.) and automatically detecting change-events in the electrical power consumption that is caused by the light and/or computer. For example, power-on events can be detected in readings from a central power meter that measures the power consumption in the entire building, of a floor or by means of power sensors for a room, a socket, etc.

Optionally such a monitoring of the power consumption, etc. can comprise an automatic identification of a (potential) cause of a specific variation in the power consumption, which can also be machine learned based on real and/or virtual training data to establish an automatic detection and preferably also classification of such a variation.

In some common embodiments of this aspect, the machine learning can be referred to by the term "supervised learning"—as the 3D-model comprises or is linked to the meta-data that can be used as supervising information (e.g. a defining of a class of a synthesized object to be learned for identification or classification and/or a location or bounding box of a synthesized object for its detection, etc.). In many embodiments, the present disclosure can make use of a traditional machine learning approaches (in the context of so called "shallow learning")—in particular e.g. random forest, support vector machine, as there are pre-defined features, descriptors, labeling and/or feature vectors, preferably defined together with the numerically rendered learning source as meta information—in particular in an automatic way.

Other embodiments can at least partially implement so called "deep learning" approaches, generative adversarial networks (GANs) or other artificial neural networks (ANNs), etc.

Artificial training data generation can be implemented on a computation system, either at a mostly real world level, by actually simulating renderings of according camera images as training data derived from a digital 3D model of the site 5, but also at an abstract level, like by simulating abstracted trajectories within the floor plan which are trained for a detector and/or classifier working on (also at least partial) persons trajectories 67 as derived from another detector and/or classifier configured to detect persons and to derive such trajectories 67 for each person and keeping track of the number and in and out of persons at the site—in other words an embodiment of the system being trained on abstracted trajectories and not on camera views.

Applied to the example of FIG. 41, such a monitoring of an office complex is illustrated, in which exemplary trajectories 67*a*,67*b*,67*c* of people moving between rooms are shown. The person, who has caused the dashed trajectory 67*a* entered the building through the main door 68 before going to his/her office. The same person then visited another room along 67*b*. The person who caused the dash-dotted trajectory 67*c* was not observed entering the building through the main entrance 68. This person could be a potential intruder that made his/her way in through a window 69. A classifier trained as described above is configured to identify such a state and to automatically raise a therefore specific alarm or action.

Yet another exemplary embodiment to illustrating this aspect is a synthetic manipulation of positive normal examples of a training dataset to also include anomalies, wherein the training dataset can be a real world dataset or a synthetically generated dataset as well as a combination of those. Such can e.g. comprise a person detection, in which the real world or simulated person images are automatically altered in such a way as to at least partially occlude the face or the body of a person, as it might be the case with an intruder wearing a mask. By automatically varying the amount and way the training data is disturbed, the robustness of the resulting classifier can be enhanced and/or undesirable overtraining can be avoided.

For example, as shown in FIG. 42, the potential security state of a broken window 71*b* is shown—as it could be caused by a burglar. For the training, of a detector and/or classificatory for such a state it is not reasonable to physically break windows at a building just to get training data images to learn this state for an automatic detection unit 43.

This embodiment can not only be learned based on visual images of the shattered window, but alternatively or additionally also be learned based on a thermographic image 66*b*, e.g. as there will be a temperature change by hot (or cold) air through the hole in the window. Such thermal images can also be applied to not completely closed doors or windows as those will regularly result in a draft of air having a different temperature, which can be visualized in a thermal image. According to this aspect such thermal training images can be trained based on a simulated model, which easily allows a simulation of a wide range and combination of inside and outside temperatures, which could hardly be reflected by capturing real world thermal images—or which would require a long-time capturing during many seasons. According to this aspect, visual and/or thermal images of broken windows are artificially generated, e.g. numerically rendered or augmented to real world images. Therein, wide range of such visual and/or thermal images with parameters for different environmental conditions (such as illuminations, colors, textures, glass-types, . . . ) can be generated without much effort. Those virtually generated or augmented images are then used for training a detection and/or classification unit, e.g. in a supervised learning approach. The resulting detector and/or classifier can then be loaded by the surveillance system, which is thereby configured to detect and/or classify such security events based on real world pictures taken by an automatic building or property surveillance system—which had been specifically trained on the virtually generated visual (or thermal) appearance of such events. In another example, not a specific window 71*a* is trained but the general aspect of broken glass, in a generalized wide range, using virtually generated training data comprising broken glass in many different variants. Thereby for example, also the broken glass in the door 51 can be automatically detected and classified as such, and it can also be trained that such a broken glass in general relates to a state that has to be indicted to a security and/or service personnel and that such state when occurring at nighttime is to be classified critical and requires an action to be triggered.

As shown in FIG. 43*a*, the generation of synthetic training data can in one of the possible embodiments be established by combining multiple virtual objects, preferably in a plurality of different combinations, with the virtual objects themselves varied, under different illumination conditions, with deliberately introduced disturbances, etc. For example, there can be one or more backgrounds 70*r*, either as a 3D-model or as a 2D image, in particular a picture of the specific site on which the security system will be installed. Those backgrounds can also be varied, e.g. by simulating day and night, etc. The figure also shows disturbances 70*f*, for example grass growing in front of the building. In this example, there is also a person 70*p*.

In FIG. 43*b*, two examples of a synthetically generated (rendered) training images according to this aspect are shown. The upper image 64*n* shows a normal example which is tagged as normal or uncritical and for which no alarm should be raised. There is a foreground 70*f*, a background of the building 70*r* to be surveyed and sky as well as a person 70*p*. As the person 70*p* is modeled to be on its way on the regular pathway to the building 70*r*, such a rendering is trained to be a normal state. Accordingly, this rendering can be reproduced with the person 70*p* at different locations, with different persons 70*p*, by day and night, etc.

In the lower image 64*n* the synthesis was based on the same objects, but the person 70*p* is trying to climb the building and break into the building through a window. Such is trained to be a high class critical security state, requiring immediate action.

In other words, an embodiment can be described by establishing a synthetically pre-trained detector and/or classifier, which is established by deriving a plurality of numerical renderings from a 2D- and/or 3D-model and feeding those renderings as training resource for a supervised learning of the classifier and/or detector. The renderings can therein comprise at least one object of interest to be trained, preferably embedded in a virtually generated realistic environment, in particular from a plurality of different views and/or different lighting conditions and/or environmental conditions. Thereby a generic classifier and/or detector is trained on virtual information.

In an optional further stage of this aspect, such a generic classifier and/or detector can additionally be post-trained by real world pictures. Such can not only be done in an initial training phase, but also or alternatively in the field use of the classifier and/or detector. For example, the real world pictures on which the detector and/or classifier is applied can be used as additional training resource to enhance the detector and/or classifier, e.g. to improve its real world success rate, in particular using real world pictures in which a state is detected and/or a critical state is classified. Such real world information can in particular be advantageous, as there is often feedback of a user or an operator available, which confirms or corrects the result of the automatic detector and/or classifier that is applied to this real world picture. Such feedback can be used as metadata and classification information for the learning and for establishing a refinement of the learning of the previously learned detector, classifier or artificial intelligence system. The real world picture actually comprises typical on-site environmental conditions, wherefore such data can be highly valuable for refining the generic training based on numerically rendered information towards a specific detector and/or classifier for the actual environment and/or task—whereby its reliability can be improved.

Although the invention is illustrated above, partly with reference to some preferred embodiments, it must be understood that numerous modifications and combinations of different features of the embodiments can be made. All of these modifications lie within the scope of the appended claims.

LIST OF REFERENCES

1—facility surveillance system
2—central computing unit
3—facility (model)
4—surveillance sensors
5—building elements
6—state derivation means
7—classification model
8$a,b,a',b'$—state pattern classes
9$a,b,c,c',c''$—state pattern
10—connections
11—neigborhood relation
12—topological or logical building representation
13—start probabilities
14—interconnection probabilities
15—emission probabilities
16—Hidden Markov Model
17—input layer
18—hidden layer
19—output layer
20—neural network
21$a,b$—weights between layer units of neural network
22, 23, 24—layer units of neural network
25,25$a,b,c$—classification (sub) models
26$a$—surveillance data
26$b,c,d$—surveillance or database data
27$a,b$—states
28,28$a,b$—classification result
29$a,b,c$—surveillance images
30—classification model
31—classified state pattern
40$a,b,c,d$,41,42$a,b$—surveillance sensors
43—mobile surveillance robot
50,50$a,b,c$,51$a,b,c,d$,52$a,b$—facility elements
53,60—bag, obstacle
62—point of view
63—illumination
64$a,b,c$ to $n$—rendered images
65—intruder
66, 66$b$—IR-/thermographic image
67$a,b,c$—trajectories
68—main entrance
69—window
70—arrow
70$f,p,r,t$—image elements
71$a,b$—windows
80$a,b$—environmental contexts
81$a,b$—modalities
82$a,b,c,d$—modality weights
83—multimodal fusion algorithm
90,91,92,93—contextual information (regions)
100—surveillance robot
100$a,b,c$—robot parts
101—central computer
102—facility
103—surveillance system
104—surveillance sensor
105—box
106,107,108—doors
108$a$—surveillance data
109—arrow
110,111—surveillance sensors
112,113—surveillance method steps
114—state
115—state ambiguity/uncertainty
116,117,117$p$,117$e$,118—surveillance method steps
119—field of view
120—triggered action
121—door frame
122—measurement signal
123—door leaf
124—field of view
125,126—arrows
127—nozzle
128—paint
129—UV-light
130—arrow indicating action
131—perturbing object
150,151,152,153—facility rooms 160—opening
200—ground-aerial sensor surveillance system
210,210$a$,210$b$—unmanned ground vehicles (UGV)
211—UGV housing
212—UGV wheels
213—UGV sensors
214—UGV bulge
215—UGV data exchange module
216—UGV charging station
217—UGV battery
218—UGV computing unit
219—UGV radio communication module
220,220$a,b,c$—unmanned aerial vehicle (UAV)
222—UAV rotors
223—UAV sensors
224—UAV legs
225—UAV data exchange module
226—UAV battery
228—UAV computing unit
229—UAV radio communication module
230—UGV extendible drawer
235—cover
251,252—data exchange
260,265—field of view
270—intruder
280—shelves
282—wall
283—location
290—laser tracker
291—retroreflector
292—laser beam
295—GNSS
301—state
302—computing unit
303—state filter
304—initial assignment
305—critical state class
306—alert
307—uncritical state class
308—no automatic action
309—uncertain state class
310—operator
311—feedback information
312—feedback loop
313—bidirectional sharing 314—global model
315—update manager
316—state detector
317—global state filter
318—global detection model
319—surveillance data
D,D',D"—degree of deviation
Fa,b,c,Ra,b,c,S—elements of the Hidden Markov Model 16
P10,P20—surveillance data acquisition positions

What is claimed is:

1. A surveillance system for surveillance of a facility, the surveillance system comprising:
a mobile surveillance robot having a body, a drive system for moving of the body, and an action controller for controlling actions of the robot, the actions comprising the moving of the body or acquisition of surveillance data by the mobile surveillance robot,
the surveillance system further comprising:
at least a first surveillance sensor designed to acquire first surveillance data of at least one object of the facility,
a state detector configured to detect at least one state associated with the object based on the first surveillance data,
wherein the state detector is configured to:
notice a state ambiguity of the state which indicates an uncertainty of a state detection,
trigger an action of the mobile surveillance robot by the action controller in case a state ambiguity is noticed, the triggered action adapted to generate state verification information about the object, the state verification information being suitable to verify or falsify the detected state and therewith resolve the state ambiguity, and
resolve the state ambiguity considering the state verification information.

2. The surveillance system according to claim 1, wherein the state detector is further configured to plan the action to be triggered such that the action is optimized with respect to the generation of verification information.

3. The surveillance system according to claim 2, wherein the triggered action comprises acquisition of second surveillance data of the object by the surveillance robot.

4. The surveillance system according to claim 1, wherein the triggered action comprises acquisition of second surveillance data of the object by the surveillance robot.

5. The surveillance system according to claim 4, wherein the triggered action comprises change of acquisition position or direction such that the acquisition of the second surveillance data is performed with at least a second acquisition position or direction different to a first acquisition position or direction of acquisition of surveillance data.

6. The surveillance system according to claim 5, wherein the state detector provides a correlation map correlating state ambiguity with acquisition position or direction, wherein:
the correlation map is based on a defined criterion representing the state or
the correlation map is established by machine learning or the
correlation map comprises best acquisition positions or directions for a plurality of detectable states.

7. The surveillance system according to claim 6, wherein the surveillance system comprises at least a second surveillance sensor and:
the state detector is configured to determine with which surveillance sensor the second surveillance data is to be acquired such that the second surveillance is optimised with respect to generation of state verification information or
the first and the second surveillance sensors are sensors of different sort.

8. The surveillance system according to claim 4, wherein the surveillance system comprises at least a second surveillance sensor and:
the state detector is configured to determine with which surveillance sensor the second surveillance data is to be acquired such that the second surveillance is optimised with respect to generation of state verification information or
the first and the second surveillance sensors are sensors of different sort.

9. The surveillance system according to claim 8, wherein the triggered action comprises interaction of the surveillance robot with the object.

10. The surveillance system according to claim 1, wherein the triggered action comprises interaction of the surveillance robot with the object.

11. The surveillance system according to claim 10, wherein the interaction with the object comprises at least one of:
tactile contact,
application of material onto the object,
output of an acoustic or optic signal directed at the object.

12. The surveillance system according to claim 11, wherein the state detector provides a correlation map correlating state ambiguity with interaction position or direction, wherein:
the correlation map is based on a defined criterion representing the state or
the correlation map is established by machine learning or the
correlation map comprises best interaction positions or directions for a plurality of detectable states.

13. The surveillance system according to claim 10, wherein the state detector provides a correlation map correlating state ambiguity with interaction position or direction, wherein:
the correlation map is based on a defined criterion representing the state or
the correlation map is established by machine learning or the
correlation map comprises best interaction positions or directions for a plurality of detectable states.

14. The surveillance system according to claim 13, wherein the interaction is based on a Markov model of states.

15. The surveillance system according to claim 10, wherein the interaction is based on a Markov model of states.

16. The surveillance system according to claim 1, wherein the triggered action is retrieval of data about the object, wherein the data is:
third surveillance data of a third surveillance sensor of the surveillance system, the third surveillance sensor not being part of the surveillance robot, or
stored in a database of the surveillance system.

17. The surveillance system according to claim 1, wherein the surveillance robot is an unmanned ground vehicle (UGV).

18. The surveillance system according to claim 1, wherein the first surveillance sensor comprises at least one of:
camera,
microphone, RIM-camera,
laser scanner,
LIDAR,
RADAR,
motion detector, or
radiometer.

19. A surveillance method adapted for a facility surveillance system comprising at least a first surveillance sensor and a mobile surveillance robot, the method comprising the steps of:
acquiring of first survey data with the first surveillance sensor of an object of the facility,
detecting at least one state associated with the object based on the surveillance data,
noticing a state ambiguity of the state which indicates an uncertainty of a state detection,
triggering an action of the surveillance robot in case a state ambiguity is noticed, wherein the action comprises moving of the mobile surveillance robot or acquisition of surveillance data by the mobile surveillance robot and is adapted to generate state verification information about the object, the state verification information being suitable to verify or falsify the detected state and therewith resolve the state ambiguity, and
resolving the state ambiguity based on the state verification information.

20. A computer programme product comprising programme code which is stored on a non-transient machine-readable medium, comprising a programme code segment, and having computer-executable instructions for performing, when run on a central computing unit of a surveillance system, the steps of the method according to claim 19.

* * * * *